(12) United States Patent
Yamanaka et al.

(10) Patent No.: US 10,369,866 B2
(45) Date of Patent: Aug. 6, 2019

(54) THERMAL MANAGEMENT SYSTEM FOR VEHICLE

(71) Applicant: DENSO CORPORATION, Kariya, Aichi-pref. (JP)

(72) Inventors: Takashi Yamanaka, Kariya (JP); Yasumitsu Omi, Kariya (JP); Norihiko Enomoto, Kariya (JP); Yoshiki Katoh, Kariya (JP); Koji Miura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 302 days.

(21) Appl. No.: 15/110,820

(22) PCT Filed: Nov. 17, 2014

(86) PCT No.: PCT/JP2014/005753
§ 371 (c)(1),
(2) Date: Jul. 11, 2016

(87) PCT Pub. No.: WO2015/107582
PCT Pub. Date: Jul. 23, 2015

(65) Prior Publication Data
US 2016/0332505 A1    Nov. 17, 2016

(30) Foreign Application Priority Data

Jan. 14, 2014  (JP) ................................ 2014-003912

(51) Int. Cl.
*B60H 1/03* (2006.01)
*B60H 1/00* (2006.01)
(Continued)

(52) U.S. Cl.
CPC ............. *B60H 1/03* (2013.01); *B60H 1/0075* (2013.01); *B60H 1/00278* (2013.01);
(Continued)

(58) Field of Classification Search
CPC ........ B60H 1/02; B60H 1/03; B60H 1/00278; B60H 1/00385; B60H 1/00428;
(Continued)

(56) References Cited

U.S. PATENT DOCUMENTS

2004/0079096 A1   4/2004 Itoh et al.
2011/0120146 A1*  5/2011 Ota .................... B60H 1/00885
                                                        62/3.3
(Continued)

FOREIGN PATENT DOCUMENTS

JP    2004142646 A    5/2004
JP    2004249814 A    9/2004
(Continued)

Primary Examiner — Joel M Attey
(74) Attorney, Agent, or Firm — Harness, Dickey & Pierce, P.L.C.

(57) ABSTRACT

A vehicle thermal management system includes a switching portion that switches between a state in which a heat medium circulates through a heat-medium cooling heat exchanger and a state in which the heat medium circulates through a heat-medium heating heat exchanger with respect to each of an engine heat-transfer portion and a heat-generating device, a flow-rate adjustment portion that adjusts the flow rate of the heat medium for each of a heat-medium outside-air heat exchanger and the engine heat-transfer portion, an air-conditioning requesting portion that makes a cooling request for an air cooling heat exchanger to cool the ventilation air as well as a heating request for an air heating heat exchanger to heat the ventilation air, and a controller that controls an operation of at least one of the switching portion, a compressor, and the flow-rate adjustment portion based on presence/absence of the cooling request and presence/absence of the heating request from the air-conditioning requesting portion.

6 Claims, 28 Drawing Sheets

(51) Int. Cl.
*B60H 1/32* (2006.01)
*B60H 1/14* (2006.01)
*B60L 1/00* (2006.01)
*B60L 3/00* (2019.01)
*B60K 6/22* (2007.10)
*B60H 1/22* (2006.01)
*B60H 1/02* (2006.01)
*B60K 11/02* (2006.01)

(52) U.S. Cl.
CPC ..... *B60H 1/00385* (2013.01); *B60H 1/00428* (2013.01); *B60H 1/00785* (2013.01); *B60H 1/00807* (2013.01); *B60H 1/00899* (2013.01); *B60H 1/143* (2013.01); *B60H 1/3213* (2013.01); *B60L 1/003* (2013.01); *B60L 3/0023* (2013.01); *B60H 1/02* (2013.01); *B60H 1/22* (2013.01); *B60H 1/321* (2013.01); *B60H 2001/00307* (2013.01); *B60H 2001/00928* (2013.01); *B60H 2001/00949* (2013.01); *B60H 2001/00957* (2013.01); *B60H 2001/325* (2013.01); *B60H 2001/3245* (2013.01); *B60H 2001/3255* (2013.01); *B60K 6/22* (2013.01); *B60K 11/02* (2013.01); *B60L 2240/36* (2013.01); *B60L 2270/46* (2013.01)

(58) Field of Classification Search
CPC ............ B60H 1/00807; B60H 1/00899; B60H 1/143; B60H 1/3213; B60H 1/22; B60H 1/00785; B60H 1/321; B60H 2001/00307; B60H 2001/00928; B60H 2001/00949; B60H 2001/00957; B60K 6/22
USPC .......................................................... 165/202
See application file for complete search history.

(56) References Cited

U.S. PATENT DOCUMENTS

| | | | |
|---|---|---|---|
| 2012/0174602 A1* | 7/2012 | Olivier | B60H 1/004 62/79 |
| 2012/0227428 A1 | 9/2012 | Yokoo et al. | |
| 2014/0190196 A1* | 7/2014 | Okuda | F24F 1/24 62/259.2 |
| 2015/0101789 A1 | 4/2015 | Enomoto et al. | |

FOREIGN PATENT DOCUMENTS

| | | |
|---|---|---|
| JP | 2011183868 A | 9/2011 |
| JP | 2012187938 A | 10/2012 |
| JP | 2013500903 A | 1/2013 |
| JP | 2013180723 A | 9/2013 |
| JP | 2014000948 A | 1/2014 |

* cited by examiner

FIG. 6  ENGINE-WASTE-HEAT DIRECT-USE DEHUMIDIFICATION AIR-HEATING MODE

FIG. 8   DEVICE-WASTE-HEAT DIRECT-USE DEHUMIDIFICATION AIR-HEATING MODE

FIG. 10   OUTSIDE-AIR HEAT-ABSORPTION HEAT PUMP DEHUMIDIFICATION AIR-HEATING MODE

FIG. 12  ENGINE-HEAT-ABSORPTION HEAT PUMP DEHUMIDIFICATION AIR-HEATING MODE

FIG. 16  ENGINE-WASTE-HEAT DIRECT-USE AIR-HEATING MODE

FIG. 18  OUTSIDE-AIR HEAT-ABSORPTION HEAT PUMP AIR-HEATING MODE

FIG. 19 ENGINE-HEAT-ABSORPTION HEAT PUMP AIR-HEATING MODE

FIG. 22  ENGINE-WASTE-HEAT DIRECT-USE HIGH-TEMPERATURE-COOLANT DEFROSTING MODE

FIG. 24  ENGINE-WASTE-HEAT INDIRECT-USE DEFROSTING MODE

FIG. 25  ENGINE-WASTE-HEAT DIRECT-USE LOW-TEMPERATURE-COOLANT DEFROSTING MODE

THERMAL MANAGEMENT SYSTEM FOR VEHICLE

CROSS REFERENCE TO RELATED APPLICATIONS

This application is a U.S. National Phase Application under 35 U.S.C. 371 of International Application No. PCT/JP2014/005753 filed on Nov. 17, 2014 and published in Japanese as WO 2015/107582 A1 on Jul. 23, 2015. This application is based on and claims the benefit of priority from Japanese Patent Application No. 2014-003912 filed on Jan. 14, 2014. The entire disclosures of all of the above applications are incorporated herein by reference.

FIELD OF THE INVENTION

The present disclosure relates to a thermal management system for a vehicle.

BACKGROUND ART

Conventionally, electric vehicles, such as electric automobiles and hybrid vehicles, are individually equipped with cooling circuits for various temperature ranges, which include, in addition to a circuit for engine cooling in a high-temperature range (approximately 100° C.), a circuit for cooling an inverter and a motor generator in an intermediate-temperature range (approximately 60° C.) and a circuit for cooling a battery pack in a low-temperature range (40° C.).

In this way, various cooling circuits are mounted on the vehicle, which can cause matters, such as a complicated configuration of the cooling circuits, or deterioration in mountability.

In electric vehicles or hybrid vehicles, when the vehicle interior is intended to be heated using waste heat from an engine or a power-train device as a heat source, the amount of heat is often insufficient, failing to adequately heat the interior.

As a countermeasure, vehicles with mounted heat pump cycles have also been developed. This technique can use the heat pump cycle to absorb heat from the outside air, thereby heating the vehicle interior. Such a technique, however, dissipates waste heat from the engine or power train device into the outside air without using the waste heat for heating, and thus has a problem of inefficient use of heat.

Patent Document 1 discloses a thermal controller for a vehicle that can switch and circulate the coolants for two systems in the motor generator and the inverter.

PRIOR ART LIST

Patent Documents

Patent Document 1: JP 2013-180723A

SUMMARY OF INVENTION

The present applicant has proposed in Japanese Patent Application No. 2012-118357 (hereinafter referred to as a prior-application example), a thermal management system for a vehicle that effectively utilizes the heat by switching and circulating the coolants for the two systems through a number of devices.

In the prior-application example, heat can be managed totally in the motor generator, inverter, battery, air conditioning for the vehicle interior, and the like.

The technique in the prior-application example includes a switching valve for switching the flows of coolants for the two systems with respect to a number of devices, two pumps for individually circulating the coolants for the two systems, and a refrigeration cycle for cooling a heat medium in one system while heating a heat medium in the other system.

The switching valve can be switched among five operation modes: a waste-heat-recovery air-heating mode, an outside-air heat-absorption heat pump air-heating mode, a first defrosting mode, a second defrosting mode, and a heat-storage-body heat-absorption heat pump air-heating mode.

However, the technique in the prior-application example has problems of degradation in the quick response and comfort of the air conditioning of the vehicle interior as well as the deterioration of the power consumption efficiency and cycle efficiency of the refrigeration cycle if it does not appropriately control the switching of the operation mode, the capacity of the refrigeration cycle, and the flow rate of coolant in the usage environment.

In view of the foregoing matter, it is an object of the present disclosure to appropriately control a thermal management system for a vehicle.

A thermal management system for a vehicle according to a first aspect of the present disclosure includes: a first pump and a second pump that draw and discharge a heat medium; a compressor that draws and discharges a refrigerant; a heat-medium heating heat exchanger that exchanges heat between the refrigerant discharged from the compressor and the heat medium drawn into and discharged from the second pump, to heat the heat medium; a decompression device that decompresses and expands the refrigerant flowing out of the heat-medium heating heat exchanger; a heat-medium cooling heat exchanger that exchanges heat between the refrigerant decompressed and expanded by the decompression device and the heat medium drawn into and discharged from the first pump, to cool the heat medium; a heat-medium outside-air heat exchanger that exchanges heat between the heat medium and outside air; an air cooling heat exchanger that exchanges sensible heat between the heat medium cooled by the heat-medium cooling heat exchanger and ventilation air blowing to a vehicle interior, to cool the ventilation air; an air heating heat exchanger that exchanges sensible heat between the heat medium heated by the heat-medium heating heat exchanger and ventilation air blowing into the vehicle interior, to heat the ventilation air; an engine heat-transfer portion that transfers heat between an engine and the heat medium; a heat transfer unit having a flow path through which the heat medium circulates, the heat transfer unit being adapted to transfer heat with the heat medium; a switching portion that switches between a state in which the heat medium circulates through the heat-medium cooling heat exchanger and a state in which the heat medium circulates through the heat-medium heating heat exchanger with respect to each of the heat-medium outside-air heat exchanger, the engine heat-transfer portion, and the heat transfer unit; a flow-rate adjustment portion that adjusts a flow rate of the heat medium with respect to each of the heat-medium outside-air heat exchanger and the engine heat-transfer portion; an air-conditioning requesting portion that makes a cooling request for the air cooling heat exchanger to cool the ventilation air, and a heating request for the air heating heat exchanger to heat the ventilation air; and a controller that controls an operation of at least one of the switching portion, the compressor, and the flow-rate adjustment portion based on presence or absence of the cooling request and presence or absence of the heating request from the air-conditioning requesting portion.

Thus, the thermal management system for a vehicle can be appropriately controlled with respect to the cooling request and heating request of the ventilation air.

A thermal management system for a vehicle according to a second aspect of the present disclosure includes: a first pump and a second pump that draw and discharge a heat medium; a compressor that draws and discharges a refrigerant; a heat-medium heating heat exchanger that exchanges heat between the refrigerant discharged from the compressor and the heat medium drawn into and discharged from the second pump, to heat the heat medium; a decompression device that decompresses and expands the refrigerant flowing out of the heat-medium heating heat exchanger; a heat-medium cooling heat exchanger that exchanges heat between the refrigerant decompressed and expanded by the decompression device and the heat medium drawn into and discharged from the first pump, to cool the heat medium; a heat-medium outside-air heat exchanger that exchanges heat between the heat medium and outside air; an air cooling heat exchanger that exchanges sensible heat between the heat medium cooled by the heat-medium cooling heat exchanger and ventilation air into a vehicle interior, to cool the ventilation air; an air heating heat exchanger that exchanges sensible heat between the heat medium heated by the heat-medium heating heat exchanger and ventilation air into the vehicle interior, to heat the ventilation air; an engine heat-transfer portion that transfers heat between an engine and the heat medium; a heat transfer unit having a flow path through which the heat medium circulates, the heat transfer unit being adapted to transfer heat with the heat medium; a switching portion that switches between a state in which the heat medium circulates through the heat-medium cooling heat exchanger and a state in which the heat medium circulates through the heat-medium heating heat exchanger with respect to each of the heat-medium outside-air heat exchanger, the engine heat-transfer portion, and the heat transfer unit; a flow-rate adjustment portion that adjusts a flow rate of the heat medium with respect to each of the heat-medium outside-air heat exchanger and the engine heat-transfer portion; and a controller that controls an operation of at least one of the switching portion, the compressor, and the flow-rate adjustment portion based on at least one of a temperature of the engine heat medium, a temperature of the heat medium flowing to the air cooling heat exchanger, and a temperature of the heat medium flowing to the air heating heat exchanger.

Thus, the thermal management system for a vehicle can be appropriately controlled based on at least one of the temperature of the engine heat medium, the temperature of the heat medium flowing to the air cooling heat exchanger, the temperature of the heat medium flowing to the air heating heat exchanger.

A thermal management system for a vehicle according to a third aspect of the present disclosure includes: a first pump and a second pump that draw and discharge a heat medium; a compressor that draws and discharges a refrigerant; a heat-medium heating heat exchanger that exchanges heat between the refrigerant discharged from the compressor and the heat medium drawn into and discharged from the second pump, to heat the heat medium; a decompression device that decompresses and expands the refrigerant flowing out of the heat-medium heating heat exchanger; a heat-medium cooling heat exchanger that exchanges heat between the refrigerant decompressed and expanded by the decompression device and the heat medium drawn into and discharged from the first pump, to cool the heat medium; a heat-medium outside-air heat exchanger that exchanges heat between the heat medium and outside air; an air cooling heat exchanger that exchanges sensible heat between the heat medium cooled by the heat-medium cooling heat exchanger and ventilation air into a vehicle interior, to cool the ventilation air; an air heating heat exchanger that exchanges sensible heat between the heat medium heated by the heat-medium heating heat exchanger and ventilation air into the vehicle interior, to heat the ventilation air; an engine heat-transfer portion that transfers heat between an engine and the heat medium; a heat transfer unit having a flow path through which the heat medium circulates, the heat transfer unit being adapted to transfer heat with the heat medium; a switching portion that switches between a state in which the heat medium circulates through the heat-medium cooling heat exchanger and a state in which the heat medium circulates through the heat-medium heating heat exchanger with respect to each of the heat-medium outside-air heat exchanger, the engine heat-transfer portion, and the heat transfer unit; a flow-rate adjustment portion that adjusts a flow rate of the heat medium with respect to each of the heat-medium outside-air heat exchanger and the engine heat-transfer portion; an air-conditioning requesting portion that makes a cooling request for the air cooling heat exchanger to cool the ventilation air; and a controller that controls an operation of at least one of the switching portion, the compressor, and the flow-rate adjustment portion based on a temperature of the engine heat medium and presence or absence of the cooling request from the air-conditioning requesting portion when defrosting is required for the heat-medium outside-air heat exchanger.

Thus, the thermal management system for a vehicle can be appropriately controlled based on the temperature of the engine heat medium and the presence or absence of the cooling request from the air-conditioning requesting portion when the defrosting is required for the heat-medium outside-air heat exchanger.

DESCRIPTION OF EMBODIMENTS

Figure 1:
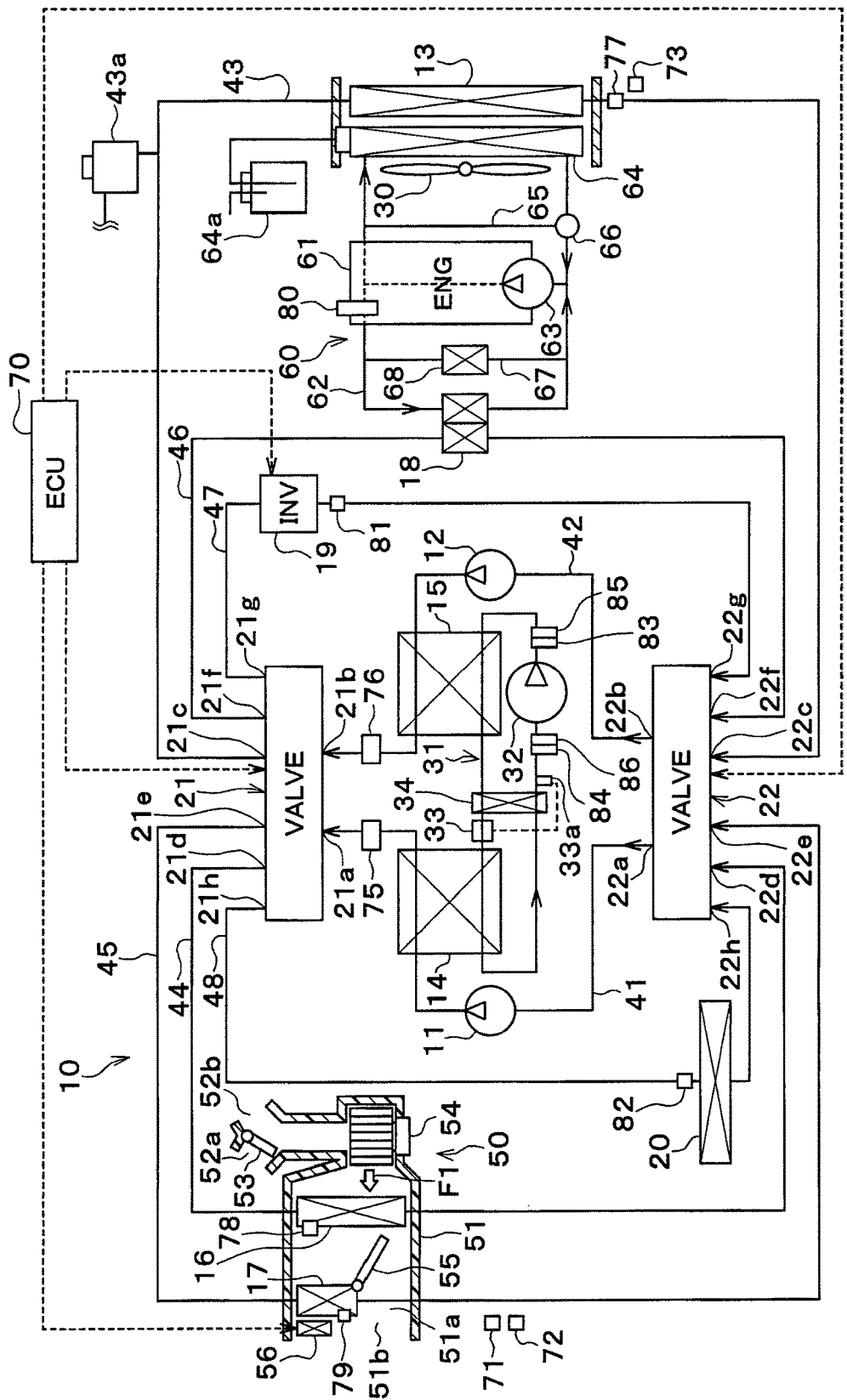
FIG. 1 is an entire configuration diagram of a vehicle thermal management system according to a first embodiment.

In the following, embodiments will be described with reference to the accompanying drawings. Note that in the respective embodiments below, the same or equivalent parts are indicated by the same reference characters throughout the figures.

First Embodiment

A vehicle thermal management system 10 shown in FIG. 1 is used to adjust various devices mounted on a vehicle or an interior of the vehicle to an appropriate temperature. In this embodiment, the thermal management system 10 is applied to a hybrid vehicle that can obtain the driving force for traveling from both an engine (internal combustion engine) and an electric motor for traveling.

The hybrid car of this embodiment is configured as a plug-in hybrid car that can charge the battery (vehicle-mounted battery) mounted on the vehicle with power supplied from an external power source (commercial power source) during stopping of the vehicle. For example, a lithium ion battery can be used as the battery.

The driving force output from the engine is used not only to cause the vehicle to travel, but also to operate a power generator. The power generated by the power generator and the power supplied from the external power source can be stored in the battery. The power stored in the battery is supplied not only to the traveling electric motor, but also to various vehicle-mounted devices, including electric components included in the thermal management system 10.

As shown in FIG. 1, the thermal management system 10 includes a first pump 11, a second pump 12, a radiator 13, a coolant cooler 14, a coolant heater 15, a cooler core 16, a heater core 17, a coolant-to-coolant heat exchanger 18, an inverter 19, a battery-temperature-adjustment heat exchanger 20, a first switching valve 21, and a second switching valve 22.

Each of the first pump 11 and the second pump 12 is an electric pump for drawing and discharging the coolant (heat medium). The coolant is a fluid as the heat medium. In this embodiment, a liquid containing at least ethylene glycol, dimethylpolysiloxane, or a nanofluid, or an antifreezing solution is used as the coolant.

The radiator 13, the coolant cooler 14, the coolant heater 15, the cooler core 16, the heater core 17, the coolant-to-coolant heat exchanger 18, the inverter 19, and the battery-temperature-adjustment heat exchanger 20 are coolant circulation devices (heat-medium circulation devices) through which the coolant circulates.

The radiator 13 is a coolant outside-air heat exchanger (heat-medium outside-air heat exchanger) that exchanges heat (exchanges sensible heat) between the coolant and the vehicle exterior air (hereinafter referred to as the outside air). The coolant at a temperature equal to or higher than the outside air temperature is allowed to flow through the radiator 13, thereby enabling heat dissipation from the coolant into the outside air. The coolant at a temperature equal to or lower than the outside air temperature is allowed to flow through the radiator 13, thereby enabling heat absorption from the outside air into the coolant. In other words, the radiator 13 can exhibit the function of a radiator that dissipates heat from the coolant into the outside air, as well as the function of a heat absorbing device that absorbs heat from the outside air into the coolant.

The radiator 13 is a heat transfer device that has a flow path through which the coolant circulates and transfers heat with the coolant having its temperature adjusted by the coolant cooler 14 or coolant heater 15.

An exterior blower 30 is an electric blower (outside-air blower) that blows the outside air to the radiator 13. The radiator 13 and the exterior blower 30 are disposed at the forefront of the vehicle. Thus, traveling air can hit the radiator 13 during traveling of the vehicle.

Each of the coolant cooler 14 and the coolant heater 15 is a coolant-temperature adjustment heat exchanger (heat-medium temperature adjustment heat exchanger) that adjusts the temperature of coolant by exchanging heat with coolant. The coolant cooler 14 is a coolant-cooling heat exchanger (heat-medium cooling heat exchanger) that cools the coolant. The coolant heater 15 is a coolant-heating heat exchanger (heat-medium heating heat exchanger) that heats the coolant.

The coolant cooler 14 is a low-pressure side heat exchanger (heat-medium heat absorbing device) that absorbs heat in the low-pressure side refrigerant from the coolant by exchanging heat between the coolant and a low-pressure refrigerant in a refrigeration cycle 31. The coolant cooler 14 serves as an evaporator in the refrigeration cycle 31.

The refrigeration cycle 31 is a vapor-compression refrigerator that includes a compressor 32, the coolant heater 15, an expansion valve 33, the coolant cooler 14, and an internal heat exchanger 34. The refrigeration cycle 31 of this embodiment forms a subcritical refrigeration cycle in which a high-pressure side refrigerant pressure does not exceed the critical pressure of the refrigerant, using a fluorocarbon refrigerant as the refrigerant.

The compressor 32 is an electric compressor driven by power supplied from the battery. The compressor 32 draws and compresses the refrigerant in the refrigeration cycle 31 to discharge the compressed refrigerant therefrom.

The coolant heater 15 is a condenser that condenses (changes a latent heat of) a high-pressure side refrigerant by exchanging heat between the high-pressure side refrigerant discharged from the compressor 32 and the coolant.

The expansion valve 33 is a decompression device that decompresses and expands a liquid-phase refrigerant flowing out of the coolant heater 15. The expansion valve 33 is a thermal expansion valve that has a temperature sensor 24a for detecting the superheat degree of the refrigerant on the outlet side of the coolant heater 15 based on the temperature and pressure of the refrigerant on the outlet side of the coolant heater 15. The expansion valve 33 is adapted to adjust a throttle passage area by a mechanical mechanism such that the superheat degree of the refrigerant on the outlet side of the coolant heater 15 is within a predetermined range.

The coolant cooler 14 is the evaporator that evaporates (changes latent heat of) a low-pressure refrigerant by exchanging heat between the coolant and the low-pressure refrigerant decompressed and expanded by the expansion valve 33. The gas-phase refrigerant evaporated at the coolant cooler 14 is drawn into and compressed by the compressor 32.

The internal heat exchanger 34 is a heat exchanger that exchanges heat between the refrigerant flowing out of the coolant heater 15 and the refrigerant flowing out of the coolant cooler 14.

The refrigeration cycle 31 is a coolant cooling-heating portion (heat-medium cooling-heating portion) that has the coolant cooler 14 for cooling the coolant and the coolant heater 15 for heating the coolant. In other words, the refrigeration cycle 31 serves as a low-temperature coolant generator (low-temperature heat-medium generator) that generates a low-temperature coolant at the coolant cooler 14, and also as a high-temperature coolant generator (high-temperature heat-medium generator) that generates a high-temperature coolant at the coolant heater 15.

The radiator 13 serves to cool the coolant by the outside air, while the coolant cooler 14 serves to cool the coolant by the low-pressure refrigerant in the refrigeration cycle 31. Thus, the temperature of the coolant cooled by the coolant cooler 14 can be made lower than that of the coolant cooled by the radiator 13. Specifically, the radiator 13 cannot cool the coolant to a temperature lower than that of the outside air, whereas the coolant cooler 14 can cool the coolant to a temperature lower than that of the outside air.

The cooler core 16 and the heater core 17 are heat-medium air heat exchangers that exchange heat between the coolant having its temperature adjusted by the coolant cooler 14 and the coolant heater 15, and ventilation air to be blown into the vehicle interior, thereby adjusting the temperature of the ventilation air.

The cooler core 16 is an air cooling heat exchanger that cools ventilation air into the vehicle interior by exchanging heat (exchanging sensible heat) between the coolant and the ventilation air into the vehicle interior. The heater core 17 is an air heating heat exchanger that heats ventilation air into the vehicle interior by exchanging heat (exchanging sensible heat) between the coolant and the ventilation air into the vehicle interior.

The coolant-to-coolant heat exchanger 18, the inverter 19, and the battery-temperature-adjustment heat exchanger 20 are heat transfer devices (temperature-adjustment target devices) that have flow paths for circulation of the coolant and transfer heat with the coolant.

The coolant-to-coolant heat exchanger 18 is a heat exchanger (heat-medium-to-heat-medium heat exchanger) that exchanges heat between the coolant in the vehicle thermal management system 10 (the coolant circulating by the first pump 11 or second pump 12) and the coolant (engine heat medium) in an engine cooling circuit 60.

The coolant-to-coolant heat exchanger 18 constitutes an engine heat transfer portion that transfers heat between an engine 61 and the coolant circulating by the first pump 11 or second pump 12.

The inverter 19 is a power converter that converts a direct-current (DC) power supplied from the battery into an alternating-current (AC) voltage to output the AC voltage to the traveling electric motor. The inverter 19 is a heat generator that generates heat during its operation. The coolant flow path in the inverter 19 serves as a device heat transfer portion that transfers heat between the heat generator and the coolant.

The battery-temperature-adjustment heat exchanger 20 is a heat exchanger (heat-medium air heat exchanger) disposed in a ventilation-air route to the battery and adapted to exchange heat between the ventilation air and the coolant. The battery-temperature-adjustment heat exchanger 20 constitutes a battery heat transfer portion that transfers heat between the battery and the coolant.

The first pump 11 is disposed in a first-pump flow path 41. The coolant cooler 14 is disposed on the discharge side of the first pump 11 in the first-pump flow path 41.

The second pump 12 is disposed in a second-pump flow path 42. The coolant heater 15 is disposed on the discharge side of the second pump 12 in the second-pump flow path 42.

The radiator 13 is disposed in a radiator flow path 43. The cooler core 16 is disposed in a cooler-core flow path 44. The heater core 17 is disposed in a heater-core flow path 45.

The coolant-to-coolant heat exchanger 18 is disposed in a coolant-to-cooler heat exchanger flow path 46. The inverter 19 is disposed in an inverter flow path 47. The battery-temperature-adjustment heat exchanger 20 is disposed in a battery-heat-exchange flow path 48.

A reserve tank 43a is connected to the radiator flow path 43. The reserve tank 43a is an air release container (heat medium reservoir) for storing the coolant therein. Thus, the pressure at the liquid surface of the coolant stored in the reserve tank 43a becomes atmospheric pressure.

The reserve tank 43a may be configured such that the pressure at the liquid surface of the coolant stored therein becomes a predetermined pressure (pressure different from the atmospheric pressure).

Excessive coolant is stored in the reserve tank 43a, which can suppress the decrease in liquid amount of the coolant circulating through the respective flow paths. The reserve tank 43a has a function of separating the air bubbles contained in the coolant, into gas and liquid.

The first-pump flow path 41, the second-pump flow path 42, the radiator flow path 43, the cooler-core flow path 44, the heater-core flow path 45, the coolant-to-coolant heat exchanger flow path 46, the inverter flow path 47, and the battery-heat-exchange flow path 48 are connected to the first switching valve 21 and the second switching valve 22. Each of the first and second switching valves 21 and 22 is a switching device that switches the flow of the coolant (coolant circulation state).

The first switching valve 21 has a first inlet 21a and a second inlet 21b as inlets for the coolant, a first outlet 21c, a second outlet 21d, a third outlet 21e, a fourth outlet 21f, a fifth outlet 21g, and a sixth outlet 21h as outlets for the coolant.

The second switching valve 22 has a first outlet 22a and a second outlet 22b as outlets for the coolant, and a first inlet 22c, a second inlet 22d, a third inlet 22e, a fourth inlet 22f, a fifth inlet 22g, and a sixth inlet 22h as inlets for the coolant.

The first inlet 21a of the first switching valve 21 is connected to one end of the first-pump flow path 41. In other words, the first inlet 21a of the first switching valve 21 is connected to the coolant outlet side of the coolant cooler 14.

The second inlet 21b of the first switching valve 21 is connected to one end of the second-pump flow path 42. In other words, the second inlet 21b of the first switching valve 21 is connected to the coolant outlet side of the coolant heater 15.

The first outlet 21c of the first switching valve 21 is connected to one end of the radiator flow path 43. In other words, the first outlet 21c of the first switching valve 21 is connected to the coolant inlet side of the radiator 13.

The second outlet 21d of the first switching valve 21 is connected to one end of the cooler-core flow path 44. In other words, the second outlet 21d of the first switching valve 21 is connected to the coolant inlet side of the cooler core 16.

The third outlet 21e of the first switching valve 21 is connected to one end of the heater-core flow path 45. In other words, the third outlet 21e of the first switching valve 21 is connected to the coolant inlet side of the heater core 17.

The fourth outlet 21f of the first switching valve 21 is connected to one end of the coolant-to-coolant heat exchanger flow path 46. In other words, the fourth outlet 21f of the first switching valve 21 is connected to the coolant inlet side of the coolant-to-coolant heat exchanger 18.

The fifth outlet 21g of the first switching valve 21 is connected to one end of the inverter flow path 47. In other words, the fifth outlet 21g of the first switching valve 21 is connected to the coolant inlet side of the inverter 19.

The sixth outlet 21h of the first switching valve 21 is connected to one end of the battery-heat-exchange flow path 48. In other words, the sixth outlet 21h of the first switching valve 21 is connected to the coolant inlet side of the battery-temperature-adjustment heat exchanger 20.

The first outlet 22a of the second switching valve 22 is connected to the other end of the first-pump flow path 41. In other words, the first outlet 22a of the second switching valve 22 is connected to the coolant suction side of the first pump 11.

The second outlet 22b of the second switching valve 22 is connected to the other end of the second-pump flow path 42. In other words, the second outlet 22b of the second switching valve 22 is connected to the coolant suction side of the second pump 12.

The first inlet 22c of the second switching valve 22 is connected to the other end of the radiator flow path 43. In other words, the first inlet 22c of the second switching valve 22 is connected to the coolant outlet side of the radiator 13.

The second inlet 22d of the second switching valve 22 is connected to the other end of the cooler-core flow path 44. In other words, the second inlet 22d of the second switching valve 22 is connected to the coolant outlet side of the cooler core 16.

The third inlet 22e of the second switching valve 22 is connected to the other end of the heater-core flow path 45. In other words, the third inlet 22e of the second switching valve 22 is connected to the coolant outlet side of the heater core 17.

The fourth inlet 22f of the second switching valve 22 is connected to the other end of the coolant-to-coolant heat exchanger flow path 46. In other words, the fourth inlet 22f of the second switching valve 22 is connected to the coolant outlet side of the coolant-to-coolant heat exchanger 18.

The fifth inlet 22g of the second switching valve 22 is connected to the other end of the inverter flow path 47. In other words, the fifth inlet 22g of the second switching valve 22 is connected to the coolant outlet side of the inverter 19.

The sixth inlet 22h of the second switching valve 22 is connected to the other end of the battery-heat-exchange flow path 48. In other words, the sixth inlet 22h of the second switching valve 22 is connected to the coolant outlet side of the battery-temperature-adjustment heat exchanger 20.

The first switching valve 21 and the second switching valve 22 can be configured to arbitrarily or selectively switch the communication state between each inlet and outlet.

Specifically, the first switching valve 21 switches among a state in which the coolant discharged from the first pump 11 flows, a state in which the coolant discharged from the second pump 12 flows, and a state in which the coolant discharged from the first pump 11 and the coolant discharged from the second pump 12 do not flow, with respect to each of the radiator 13, the cooler core 16, the heater core 17, the coolant-to-coolant heat exchanger 18, the inverter 19, and the battery-temperature-adjustment heat exchanger 20.

The second switching valve 22 switches among a state in which the coolant flows out to the first pump 11, a state in which the coolant flows out to the second pump 12, and a state in which the coolant flows out to neither the first pump 11 nor the second pump 12, with respect to each of the radiator 13, the cooler core 16, the heater core 17, the coolant-to-coolant heat exchanger 18, the inverter 19, and the battery-temperature-adjustment heat exchanger 20.

The first switching valve 21 and the second switching valve 22 are capable of adjusting their valve opening degrees. In this way, the first and second switching valves 21 and 22 can adjust the flow rates at which the coolant flows through the radiator 13, the cooler core 16, the heater core 17, the coolant-to-coolant heat exchanger 18, the inverter 19, and the battery-temperature-adjustment heat exchanger 20.

That is, the first switching valve 21 and the second switching valve 22 are flow-rate adjustment portions that adjust the flow rate of the coolant for each of the radiator 13, the cooler core 16, the heater core 17, the coolant-to-coolant heat exchanger 18, the inverter 19, and the battery-temperature-adjustment heat exchanger 20.

The first switching valve 21 is capable of mixing the coolant discharged from the first pump 11 and the coolant discharged from the second pump 12 at any flow-rate ratio, thereby allowing the mixed coolant to flow into the radiator 13, the cooler core 16, the heater core 17, the coolant-to-coolant heat exchanger 18, the inverter 19, and the battery-temperature-adjustment heat exchanger 20.

That is, the first switching valve 21 serves as a flow-rate ratio adjustment portion for adjusting the flow-rate ratio of the coolant cooled by the coolant cooler 14 to that heated by the coolant heater 15 with respect to each of the radiator 13, the cooler core 16, the heater core 17, the coolant-to-coolant heat exchanger 18, the inverter 19, and the battery-temperature-adjustment heat exchanger 20.

The cooler core 16 and the heater core 17 are accommodated in a casing 51 of an interior air-conditioning unit 50 in the vehicle air conditioner.

The casing 51 forms an air passage for the ventilation air to be blown into the vehicle interior. The casing 51 is formed of resin (for example, polypropylene) with some elasticity and excellent strength. An inside/outside air switching case 52 is disposed at the most upstream side of air flow in the casing 51. The inside/outside air switching case 52 is an inside/outside air introduction portion that switches between the inside air (air in a vehicle compartment) and the outside air (air outside the vehicle compartment) to introduce the switched air.

The inside/outside air switching case 52 has an inside-air suction port 52*a* for introducing the inside air into the casing 51, and an outside-air suction port 52*b* for introducing the outside air into the casing 51. An inside/outside air switching door 53 is disposed inside the inside/outside air switching case 52.

The inside/outside air switching door 53 serves as an air-volume ratio changing portion that changes the ratio of the volume of inside air to that of outside air to be introduced into the casing 51. Specifically, the inside/outside air switching door 53 continuously adjusts the opening areas of the inside-air suction port 52*a* and the outside-air suction port 52*b*, thereby changing the ratio of the volume of the inside air to that of the outside air. The inside/outside air switching door 53 is driven by an electric actuator (not shown).

An interior blower (blower) 54 is disposed on the air-flow downstream side of the inside/outside air switching case 52. The interior blower 54 blows air (inside air and outside air) drawn via the inside/outside air switching case 52, into the vehicle interior. The interior blower 54 is an electric blower that includes a centrifugal multiblade fan (sirocco fan) to be driven by an electric motor.

The cooler core 16, the heater core 17, and an auxiliary heater 56 are disposed on the downstream side of the air flow of the interior blower 54 in the casing 51. The auxiliary heater 56 is a PTC heater (electric heater) that has a PTC element (positive thermistor) and is adapted to heat the air by generating heat though supply of the electric power to the PTC element.

A heater-core bypass passage 51*a* is formed at the air-flow downstream side part of the cooler core 16 within the casing 51. The heater-core bypass passage 51*a* is an air passage that allows the air passing through the cooler core 16 to flow without passing through the heater core 17 or the auxiliary heater 56.

An air mix door 55 is disposed between the cooler core 16 and the heater core 17 within the casing 51.

The air mix door 55 serves as an air-volume ratio adjustment portion that adjusts the ratio of the volume of the air flowing into the heater core 17 and the auxiliary heater 56 to that of the air flowing into the heater-core bypass passage 51*a*. The air mix door 55 is, for example, a revolving plate-shaped door, a slidable door, or the like, and driven by an electric actuator (not shown).

The temperature of blowout air to be blown into the vehicle interior is changed by the ratio of the volume of the air passing through the heater core 17 and the auxiliary heater 56 to that of the air passing through the heater-core bypass passage 51*a*. Thus, the air mix door 55 serves as a temperature adjustment portion adapted to adjust the temperature of the blowout air to be blown into the vehicle interior.

An air outlet 51*b* for blowing the ventilation air into the vehicle interior as a space to be air-conditioned is disposed at the most downstream part of the air flow of the casing 51. Specifically, a defroster air outlet, a face air outlet, and a foot air outlet are provided as the air outlet 51*b*.

The defroster air outlet blows the conditioned air toward the inner surface of a windshield of the vehicle. The face air outlet blows the conditioned air toward the upper body of an occupant. The foot air outlet blows the conditioned air toward the feet of the occupant.

An air-outlet mode door (not shown) is disposed on the upstream side of the air flow in the air outlet 51*b*. The air-outlet mode door serves as an air-outlet mode switch for switching the air outlet mode. The air-outlet mode door is driven by an electric actuator (not shown).

The air outlet modes switched by the air-outlet mode door include, for example, a face mode, a bi-level mode, a foot mode, and a foot-defroster mode.

The face mode is an air outlet mode in which the face air outlet is fully opened to blow the air from the face air outlet toward the upper body of the occupant in the vehicle compartment. The bi-level mode is an air outlet mode in which both the face air outlet and foot air outlet are opened to blow air toward the upper body and feet of the occupant in the vehicle compartment.

The foot mode is an air outlet mode in which the foot air outlet is fully opened while the defroster air outlet is opened only by a small opening degree to blow the air mainly from the foot air outlet. The foot-defroster mode is an air outlet mode in which the foot air outlet and the defroster air outlet are opened by the substantially same degree to blow the air from both the foot air outlet and the defroster air outlet.

An engine cooling circuit 60 is a coolant circulation circuit for cooling the engine 61. The engine cooling circuit 60 includes a circulation flow path 62 for allowing the circulation of the coolant. The circulation flow path 62 is provided with the engine 61, an engine pump 63, an engine radiator 64, and the coolant-to-coolant heat exchanger 18.

The engine pump 63 is an electric pump that draws and discharges the coolant. The engine pump 63 may be a mechanical pump driven by a power output from the engine 61.

The engine radiator 64 is a heat-dissipation heat exchanger (heat-medium air heat exchanger) that dissipates heat from the coolant into the outside air by exchanging heat between the coolant and the outside air.

The circulation flow path 62 is connected to a radiator bypass flow path 65. The radiator bypass flow path 65 is a flow path through which the coolant flows while bypassing the engine radiator 64.

A thermostat 66 is disposed in a connection portion between the radiator bypass flow path 65 and the circulation flow path 62. The thermostat 66 is a coolant-temperature responsive valve that is constructed of a mechanical mechanism designed to open and close a coolant flow path by displacing a valve body using a thermo wax (temperature sensing member) with the changeable volume depending on its temperature.

Specifically, when the temperature of coolant exceeds a predetermined temperature (for example, 80° C. or higher), the thermostat 66 closes the radiator bypass flow path 65. When the temperature of coolant is lower than the predetermined temperature (for example, less than 80° C.), the thermostat 66 opens the radiator bypass flow path 65.

The circulation flow path 62 is connected to an engine-accessory flow path 67. The engine-accessory flow path 67 is a flow path in which the coolant flows in parallel with the coolant-to-coolant heat exchanger 18. Engine accessories 68 are disposed in the engine-accessory flow path 67. The engine accessories 68 include an oil heat exchanger, an exhaust gas recirculation (EGR) cooler, a throttle cooler, a turbo cooler, an engine-accessory motor, and the like. The oil heat exchanger is a heat exchanger that adjusts the temperature of oil by exchanging heat between the coolant and the engine oil or transmission oil.

The EGR cooler is a heat exchanger constituting an EGR (exhaust gas recirculation) device that recirculates part of exhaust gas from the engine onto the intake side to reduce pumping loss caused by a throttle valve. Specifically, the EGR cooler is the heat exchanger that exchanges heat between recirculated gas and the coolant to thereby adjust the temperature of the recirculated gas.

The throttle cooler is a water jacket provided within the throttle to cool the throttle valve.

The turbo cooler is a cooler that cools a turbo charger by exchanging heat between heat generated by the turbo charger and the coolant.

An engine auxiliary motor is a large-sized motor for rotating an engine belt even during stopping of the engine. The engine auxiliary motor is used to operate the compressor, water pump, or the like, which is driven by the engine belt, even when no driving force is available from the engine, or upon start-up of the engine.

An engine reserve tank 64a is coupled to the engine radiator 64. The structure and function of the engine reserve tank 64a are substantially the same as those of the above-mentioned reserve tank 43a.

Figure 2:
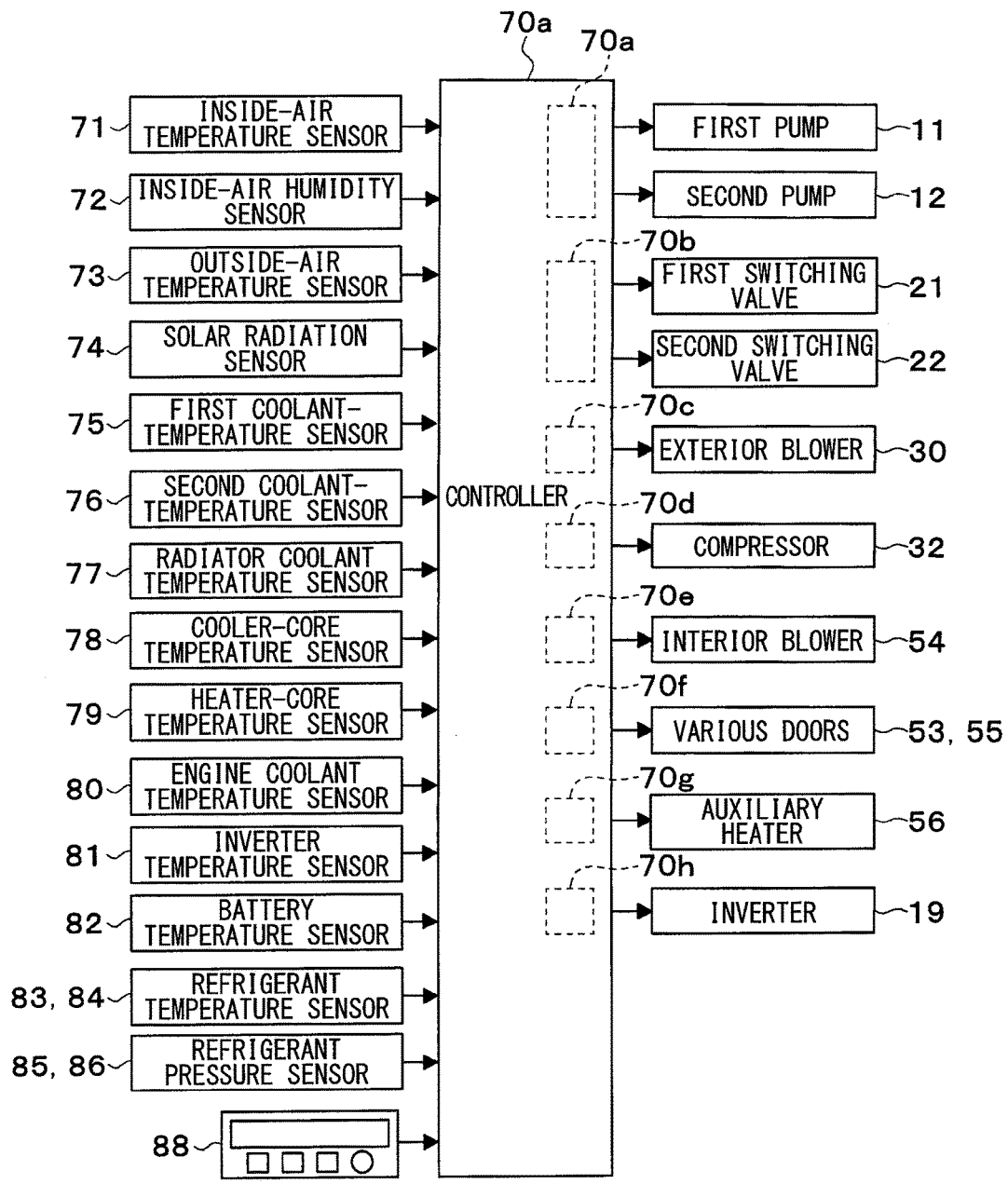
FIG. 2 is a block diagram showing an electric control unit in the vehicle thermal management system in the first embodiment.

Now, the electric control unit of the thermal management system 10 will be described with reference to FIG. 2. The controller 70 is configured of a known microcomputer, including CPU, ROM, and RAM, and a peripheral circuit thereof. The controller performs various computations and processing based on air-conditioning control programs stored in the ROM to thereby control the operations of various control target devices that are connected to its output side.

The control target devices to be controlled by the controller 70 include the first pump 11, the second pump 12, the first switching valve 21, the second switching valve 22, the exterior blower 30, the compressor 32, the interior blower 54, the electric actuators for driving various doors (inside/outside air switching door 53, air mix door 55, air-outlet mode door, and the like) disposed in the casing 51, and the inverter 19.

The controller 70 is integrally structured with control units for controlling various control target devices connected to the output side of the controller. A structure (hardware and software) adapted to control the operation of each of the control target devices serves as the control unit for controlling the operation of each of the control target devices.

In this embodiment, the structure (hardware and software) that controls the operations of the first pump 11 and the second pump 12 is configured as a pump control unit 70a in the controller 70. The pump controller 70a is a flow-rate control unit (heat-medium flow-rate adjustment portion) for controlling the flow rate of coolant flowing through the respective coolant-circulation devices.

In this embodiment, the structure (hardware and software) that controls the operations of the first switching valve 21 and the second switching valve 22 is configured as a switching valve control unit 70b in the controller 70. The switching valve control unit 70b is a flow-rate adjustment portion (heat-medium flow-rate adjustment portion) for adjusting the flow rates of the coolants flowing through the respective coolant-circulation devices.

In this embodiment, the structure (hardware and software) that controls the operation of the exterior blower 30 is configured as an exterior blower control unit 70c (outside-air blower control unit) in the controller 70. The exterior blower control unit 70c is a radiator adjustment portion (outside-air flow-rate adjustment portion) that controls the flow rate of outside air flowing through the radiator 13.

In this embodiment, the structure (hardware and software) that controls the operation of the compressor 32 is configured as a compressor control unit 70d in the controller 70. The compressor control unit 70d is a refrigerant flow-rate adjustment portion that controls the flow rate of refrigerant discharged from the compressor 32.

In this embodiment, the structure (hardware and software) that controls the operation of the interior blower 54 is configured as an interior blower control unit 70e in the controller 70. The interior blower 54 and the interior blower control unit 70e serve as an air-volume control unit for controlling the volume of ventilation air to be blown into the vehicle interior.

In this embodiment, the structure (hardware and software) that controls the operations of various doors disposed in the casing 51 (inside/outside air switching door 53, air mix door 55, air-outlet mode door, and the like) is configured as an air-conditioning switching control unit 70f in the controller 70. The air-conditioning switching control unit 70f may be separately provided from the controller 70.

The air mix door 55 and the air-conditioning switching control unit 70f serve as the air-volume ratio adjustment portion that adjusts the ratio of the volume of the ventilation air flowing through the heater core 17 to that of the ventilation air bypassing the heater core 17, in the ventilation air cooled by the cooler core 16.

The inside/outside air switching door 53 and the air-conditioning switching control unit 70f serve as an inside/outside air ratio adjustment portion that adjusts the ratio of the inside air to the outside air in the ventilation air to be blown into the vehicle interior.

In this embodiment, the structure (hardware and software) that controls the operation of the auxiliary heater 56 is configured as an auxiliary heater control unit 70g (electric heater control unit) in the controller 70.

In this embodiment, the structure (hardware and software) that controls the operation of the inverter 19 is configured as an inverter control unit 70h (heat generator control unit) in the controller 70.

The above-mentioned respective control units 70a, 70b, 70c, 70d, 70e, 70f, 70g, and 70h may be separately formed from the controller 70.

Detection signals from a group of sensors are input to the input side of the controller 70. The group of sensors includes an inside-air temperature sensor 71, an inside-air humidity sensor 72, an outside-air temperature sensor 73, a solar radiation sensor 74, a first coolant-temperature sensor 75, a second coolant-temperature sensor 76, a radiator coolant temperature sensor 77, a cooler-core temperature sensor 78, a heater-core temperature sensor 79, an engine coolant temperature sensor 80, an inverter temperature sensor 81, a battery temperature sensor 82, refrigerant temperature sensors 83 and 84, and refrigerant pressure sensors 85 and 86.

The inside-air temperature sensor 71 is a detection device (inside-air temperature detection device) that detects the temperature of inside air (or the temperature of air in the vehicle compartment). The inside-air humidity sensor 72 is a detection device (inside-air humidity detection device) that detects the humidity of the inside air.

The outside-air temperature sensor 73 is a detection device (outside-air temperature detection device) that detects the temperature of outside air (or the temperature of air outside the vehicle compartment). The solar radiation sensor 74 is a detection device (solar radiation amount detection device) that detects the amount of solar radiation in the vehicle interior.

The first coolant-temperature sensor 75 is a detection device (first heat-medium temperature detection device) that detects the temperature of the coolant flowing through the first-pump flow path 41 (for example, the temperature of the coolant drawn into the first pump 11).

The second coolant-temperature sensor 76 is a detection device (second heat-medium temperature detection device) that detects the temperature of the coolant flowing through the second-pump flow path 42 (for example, the temperature of the coolant drawn into the second pump 12).

The radiator coolant temperature sensor 77 is a detection device (device-side heat-medium temperature detection device) that detects the temperature of coolant flowing through the radiator flow path 43 (for example, the temperature of the coolant flowing out of the radiator 13).

The cooler-core temperature sensor 78 is a detection device (cooler-core temperature detection device) that detects the surface temperature of the cooler core 16. The cooler-core temperature sensor 78 is, for example, a fin thermistor for detecting the temperature of a heat exchange fin in the cooler core 16, a coolant-temperature sensor for detecting the temperature of the coolant flowing through the cooler core 16, or the like.

The heater-core temperature sensor 79 is a detection device (heater-core temperature detection device) that detects the surface temperature of the heater core 17. The heater-core temperature sensor 79 is, for example, a fin thermistor for detecting the temperature of a heat exchange fin in the heater core 17, a coolant-temperature sensor for detecting the temperature of the coolant flowing through the heater core 17, or the like.

The engine coolant temperature sensor 80 is a detection device (engine heat-medium temperature detection device) that detects the temperature of the coolant circulating through the engine cooling circuit 60 (for example, the temperature of the coolant flowing through the inside of the engine 61).

The inverter temperature sensor 81 is a detection device (device-side heat-medium temperature detection device) that detects the temperature of the coolant flowing through the inverter flow path 47 (for example, the temperature of the coolant flowing out of the inverter 19).

The battery temperature sensor 82 is a detection device (device-side heat-medium temperature detection device) that detects the temperature of the coolant flowing through the battery-heat-exchange flow path 48 (for example, the temperature of the coolant flowing into the battery-temperature-adjustment heat exchanger 20).

Refrigerant temperature sensors 83 and 84 are the discharge-side refrigerant temperature sensor 83 that detects the temperature of the refrigerant discharged from the compressor 32, and the suction-side refrigerant temperature sensor 84 that detects the temperature of the refrigerant drawn into the compressor 32, respectively.

Refrigerant pressure sensors 85 and 86 are the discharge-side refrigerant pressure sensor 85 that detects the pressure of the refrigerant discharged from the compressor 32, and the suction-side refrigerant pressure sensor 86 that detects the pressure of the refrigerant drawn into the compressor 32, respectively.

An operation panel 88 is provided with various air-conditioning operation switches. Operation signals from these operation switches are input to the input side of the controller 70. For example, the operation panel 88 is placed near the dashboard at the front of the vehicle compartment.

Various types of air-conditioning operation switches provided on the operation panel 88 include an air conditioner switch, an automatic switch, an air-volume setting switch for the interior blower 52, a vehicle-interior temperature setting switch, an air-conditioning stop switch, and the like.

The air conditioner switch is a switch for switching between operating and stopping (turning on and off) of air-cooling or dehumidification. The automatic switch is a switch for setting or resetting automatic control of the air conditioning. The vehicle-interior temperature setting switch is a target temperature setting portion for setting a target vehicle-interior temperature by the occupant's operation. The air-conditioning stop switch is a switch that stops the air conditioning.

Various air-conditioning operation switches provided on the operation panel 88 serve as air-conditioning requesting portions that make a cooling request for the cooler core 16 to cool the ventilation air, as well as a heating request for the heater core 17 to heat the ventilation air.

Figure 3:
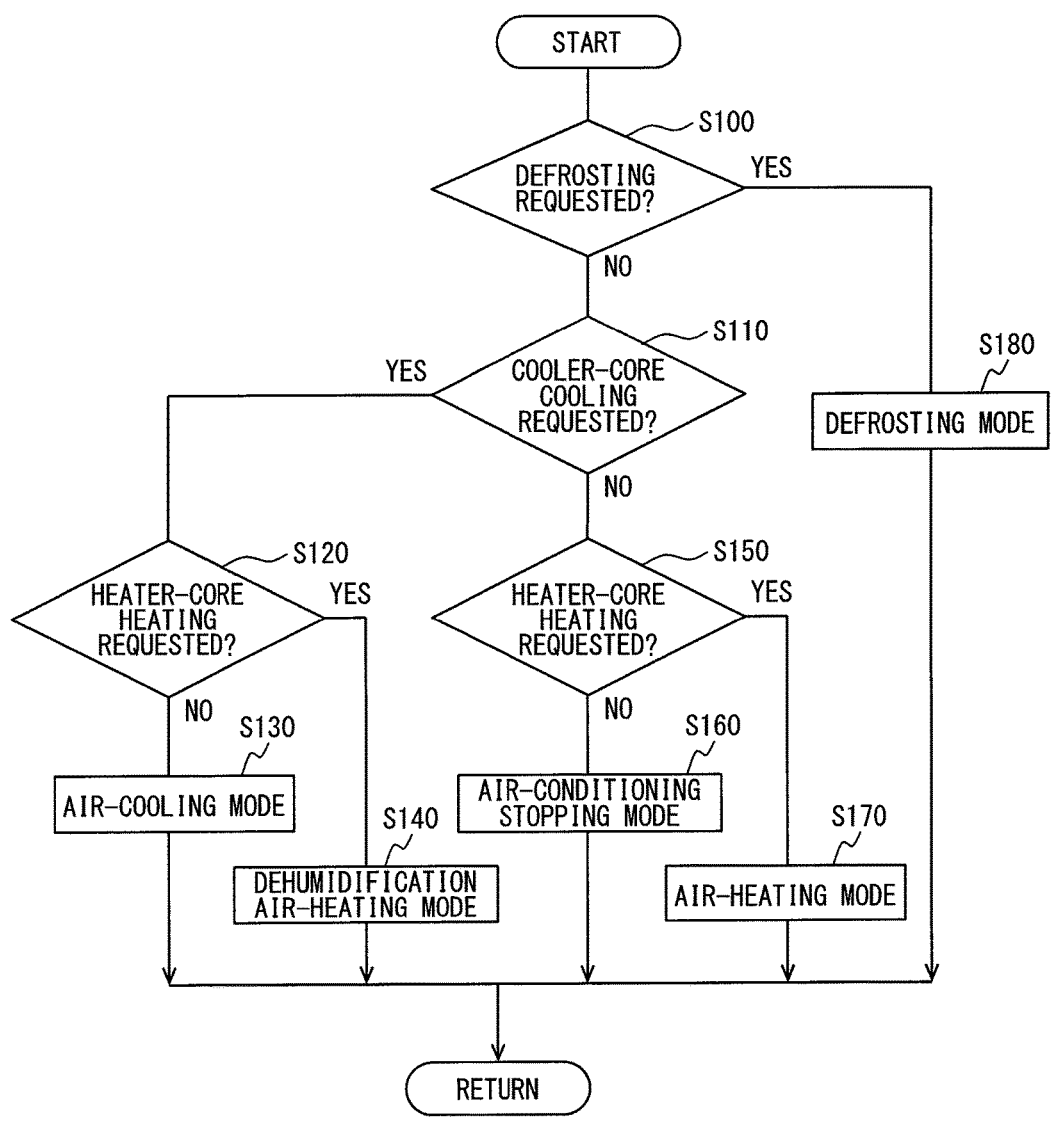
FIG. 3 is a flowchart showing control processing executed by a controller of the vehicle thermal management system in the first embodiment.

Next, the operation of the above-mentioned structure will be described. FIG. 3 is a flowchart showing control processing executed by the controller 70.

In step S100, it is determined whether or not there is a request (defrosting request) to remove frost attached to the radiator 13. For example, when a state of allowing the radiator 13 to have its surface temperature equal to or lower than a reference frost-formation temperature (e.g., −10° C.) continues for a predetermined time or more, the defrosting request is determined to be made. The surface temperature of the radiator 13 can be estimated from the coolant temperature detected by the radiator coolant temperature sensor 77.

When the defrosting request is determined not to be made, the operation proceeds to step S110. In step S110, it is determined whether there is a request for the cooler core 16 to cool the ventilation air into the vehicle interior (cooler-core cooling request). For example, when the air conditioner switch installed on the operation panel 88 is turned on by the occupant's operation, the cooler-core cooling request is determined to be made.

When the cooler-core cooling request is determined to be made, the operation proceeds to step S120. In step S120, it is determined whether there is a request for the heater core 17 to heat the ventilation air into the vehicle interior (heater-core heating request). For example, when a temperature of the ventilation air cooled by the cooler core 16 is lower than a target air outlet temperature TAO, the heater-core heating request is determined to be made. The temperature of the ventilation air cooled by the cooler core 16 can be estimated from the surface temperature of the cooler core detected by the cooler-core temperature sensor 78.

The target air outlet temperature TAO is calculated by the following formula F1. TAO=Kset×Tset−Kr×Tr−Kam×Tam−Ks×Ts+C . . . F1 where Tset is a vehicle-interior preset temperature set by the vehicle-interior temperature setting switch, and Tr is the temperature of inside air detected by the inside-air temperature sensor 71. Tam is the temperature of outside air detected by the outside-air temperature sensor 73. Ts is the amount of solar radiation detected by the solar radiation sensor 74. Kset, Kr, Kam, and Ks are control gains. C is a constant for correction.

When the heater-core heating request is determined not to be made, the operation proceeds to step S130, in which an air-cooling mode is executed. The air-cooling mode is an air-conditioning mode of cooling the ventilation air into the vehicle interior by the cooler core 16 to blow the cooled air into the vehicle interior.

On the other hand, when the heater-core heating request is determined to be made, the operation proceeds to step S140, in which a dehumidification air-heating mode is executed. The dehumidification air-heating mode is an air-conditioning mode of dehumidifying (cooling) the ventilation air into the vehicle interior by the cooler core 16, and then reheating the dehumidified air by the heater core 17 to blow the reheated air into the vehicle interior.

When the cooler-core cooling request is determined not to be made in step S110, the operation proceeds to step S150, in which it is determined whether there is a heater-core heating request or not. When the heater-core heating request is determined not to be made, the operation proceeds to step S160, in which an air-conditioning stopping mode is executed. In the air-conditioning stopping mode, the air-conditioning of the vehicle interior is stopped.

On the other hand, when the heater-core heating request is determined to be made, the operation proceeds to step S170, in which an air-heating mode is executed. The air-heating mode is an air-conditioning mode of heating the ventilation air into the vehicle interior by the heater core 17 to blow the heated air into the vehicle interior.

When the defrosting request is determined to be made in step S100, the operation proceeds to step S180, in which a defrosting mode is executed. The defrosting mode is an operation mode of melting frost attached onto the radiator 13 and removing it therefrom.

Figure 4:
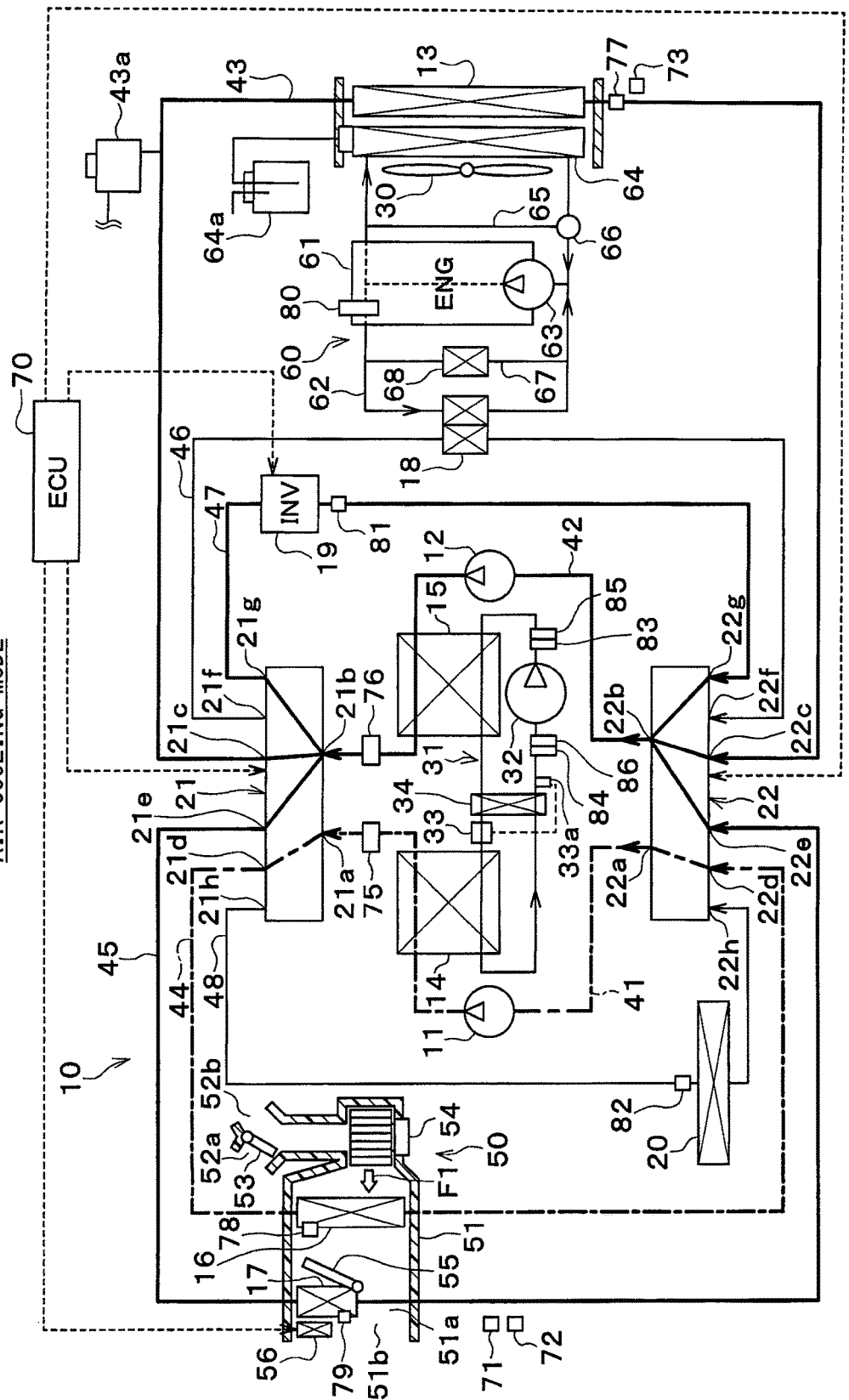
FIG. 4 is a diagram showing the flow of a coolant in an air-cooling mode of the first embodiment.

FIG. 4 shows the flow of the coolant in the air-cooling mode at step S130.

In the air-cooling mode, the controller 70 controls the operations of the first switching valve 21 and the second switching valve 22 such that the coolant cooler 14 and the cooler core 16 are connected together to form a low-temperature side coolant circuit, while the coolant heater 15, the radiator 13, the heater core 17, and the inverter 19 are connected together to form the high-temperature side coolant circuit.

In the low-temperature side coolant circuit, as indicated by a thick alternate long and short dash line of FIG. 4, the coolant cooled by the coolant cooler 14 is allowed to flow through the cooler core 16, whereby the ventilation air into the vehicle interior is cooled by the cooler core 16. In the high-temperature side coolant circuit, as indicated by a thick solid line of FIG. 4, the coolant heated by the coolant heater 15 and the inverter 19 is allowed to flow through the radiator 13, whereby the heat is dissipated from the coolant into the outside air at the radiator 13.

The low-temperature side coolant circuit needs to maintain the coolant temperature at 0° C. to 10° C. to meet the air-cooling request. The high-temperature side coolant circuit generally needs to reduce the coolant temperature to 65° C. or lower, taking into consideration the heat-resistant temperature of the inverter 19 and the like. To enhance the efficiency of the refrigeration cycle 31, the coolant temperature in the high-temperature side coolant circuit is preferably reduced to a low level.

Therefore, in the air-cooling mode, the controller 70 controls the following control for the low-temperature side coolant circuit, the refrigeration cycle 31, and the high-temperature side coolant circuit.

In the low-temperature side coolant circuit, the flow rate of the coolant that can transfer the necessary amount of heat is calculated based on a cooling capacity required for the cooler core 16, and a coolant discharge capacity (the number of revolutions) of the first pump 11 is controlled to attain the calculated flow rate of the coolant.

In the refrigeration cycle 31, the temperature of the coolant cooled by the coolant cooler 14 is adjusted such that the temperature of the coolant flowing through the cooler core 16 becomes a target temperature. Specifically, the refrigerant discharge capacity (the number of revolutions) of the compressor 32 is controlled. The temperature of the coolant flowing through the cooler core 16 can be estimated from the surface temperature of the cooler core detected by the cooler-core temperature sensor 78.

In the high-temperature side coolant circuit, the coolant discharge capacity (the number of revolutions) of the second pump 12 is controlled to allow the flow rate of the coolant required for respective heat-generating devices, such as the inverter 19, by taking into consideration valve opening degrees of the first and second switching valves 21 and 22 for the respective heat-generating devices.

The valve opening degrees on the radiator 13 side of the first and second switching valves 21 and 22 are fully opened, whereby the coolant temperature in the high-temperature side coolant circuit can be reduced as much as possible.

Since in the air-cooling mode, the waste heat from the engine 61 is not required, the engine cooling circuit 60 is separated from the low-temperature side coolant circuit and the high-temperature side coolant circuit. Specifically, the valve opening degrees on the coolant-to-coolant heat exchanger 18 side of the first and second switching valves 21 and 22 are completely closed, thus preventing the coolant from flowing to the coolant-to-coolant heat exchanger 18.

Under such control, the low-temperature coolant required for air-cooling can be created, and the refrigeration cycle 31 can be operated in an appropriate state to thereby enhance the air-cooling capacity and the cycle efficiency, which can improve the fuel efficiency of the vehicle while enhancing the comfort to the occupant.

Figure 5:
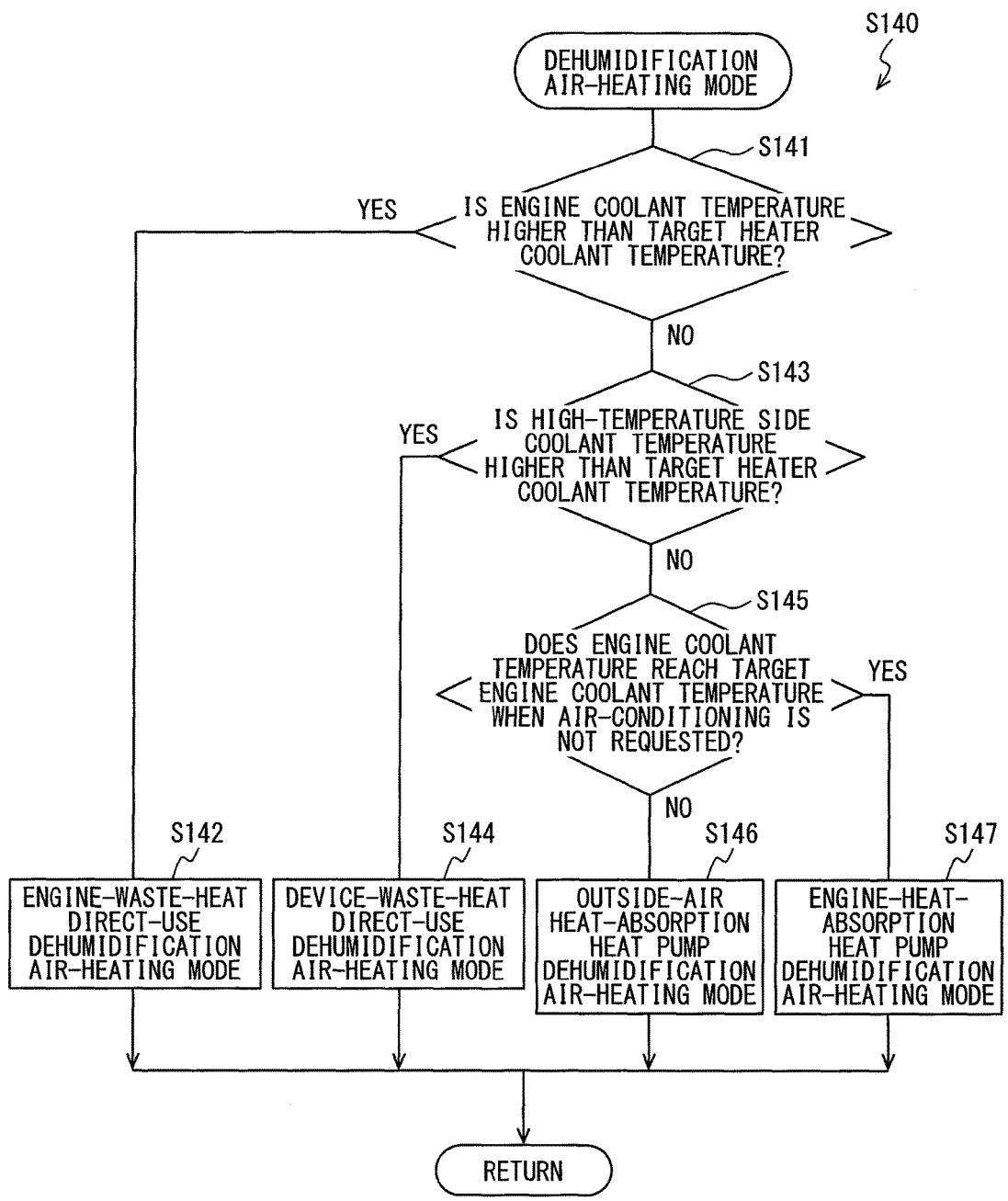
FIG. 5 is a flowchart showing the control processing in a dehumidification air-heating mode of the first embodiment.

FIG. 5 is a flowchart showing control processing in the dehumidification air-heating mode at step S140.

To dehumidify the ventilation air into the vehicle interior in the dehumidification air-heating mode, it is necessary to maintain the temperature of the coolant flowing to the cooler core 16 at 0° C. to 10° C. in the low-temperature side coolant circuit. Further, to sufficiently reheat the air cooled for dehumidification, it is also necessary to maintain the temperature of the coolant flowing to the heater core 17 at approximately 55° C. to 65° C. in the high-temperature side coolant circuit.

In terms of preventing the window fogging immediately after start-up of the operation, the wind glasses are required to be quickly warmed up with warm air. On the other hand, in terms of preventing the window fogging during driving over a long period of time, the vehicle interior is required to maintain its humidity at a low level.

Thus, in the dehumidification air-heating mode, the coolant temperature in the high-temperature side coolant circuit must reach the target temperature quickly. To this aim, the controller 70 performs the following control operation.

In step S141, it is determined whether or not a coolant temperature Twe (engine coolant temperature) of the engine cooling circuit 60 is higher than a target coolant temperature Twho (target heater coolant temperature) of the heater core 17. When the coolant temperature Twe of the engine cooling circuit 60 is determined to be higher than the target coolant temperature Twho of the heater core 17, the operation proceeds to step S142, in which an engine-waste-heat direct-use dehumidification air-heating mode is executed.

The engine-waste-heat direct-use dehumidification air-heating mode is an operation mode of creating the coolant for the high-temperature side coolant circuit by waste heat from the engine 61, and creating the coolant for the low-temperature side coolant circuit by the refrigeration cycle 31.

When the coolant temperature Twe of the engine cooling circuit 60 is determined to be lower than the target coolant temperature Twho of the heater core 17 in step S141, the operation proceeds to step S143. In step S143, it is determined whether or not the coolant temperature Twm of the high-temperature side coolant circuit (high-temperature side coolant temperature) is higher than the target coolant temperature Twho of the heater core 17 (target heater coolant temperature).

When the coolant temperature Twm of the high-temperature side coolant circuit is determined to be higher than the target coolant temperature Twho of the heater core 17, the operation proceeds to step S144, in which a device-waste-heat direct-use dehumidification air-heating mode is executed.

The device-waste-heat direct-use dehumidification air-heating mode is an operation mode of creating the coolant for the high-temperature side coolant circuit by waste heat from the heat-generating device, such as the inverter 19, and creating the coolant for the low-temperature side coolant circuit by the refrigeration cycle 31.

When the coolant temperature Twm of the high-temperature side coolant circuit is determined to be lower than the target coolant temperature Twho of the heater core 17 in step S143, the operation proceeds to step S145. In step S145, it is determined whether or not the coolant temperature Twe (engine coolant temperature) of the engine cooling circuit 60 reaches the target coolant temperature Tweo of the engine cooling circuit 60 when the air-conditioning is not requested (target engine coolant temperature when the air-conditioning is not requested).

The target engine coolant temperature Tweo when the air-conditioning is not requested is lower than the target coolant temperature of the engine cooling circuit 60 obtained when the air-conditioning is requested (target engine coolant temperature when the air-conditioning is requested). That is, when the air-conditioning is not requested, the waste heat from the engine 61 is not used in the heater core 17, so that the temperature of the engine coolant does not need to be increased to the temperature or higher at which the engine 61 can achieve the excellent efficiency. For example, when the air-conditioning is not requested, the target engine coolant temperature Tweo is 40° C., whereas when the air-conditioning is requested, the target engine coolant temperature is 60° C.

If the engine coolant temperature Twe is determined not to reach the target engine coolant temperature Tweo when the air-conditioning is not requested, the operation proceeds to step S146, in which an outside-air heat-absorption heat pump dehumidification air-heating mode is executed.

The outside-air heat-absorption heat pump dehumidification air-heating mode is an operation mode of creating the coolant for the high-temperature side coolant circuit and the coolant for the low-temperature side coolant circuit by the refrigeration cycle 31 to thereby absorb the heat from the outside air.

If the coolant temperature Twe in the engine cooling circuit 60 is determined to reach the target engine coolant temperature Tweo when the air-conditioning is not requested in step S145, the operation proceeds to step S147, in which an engine-heat-absorption heat pump dehumidification air-heating mode is executed.

The engine-heat-absorption heat pump dehumidification air-heating mode is an operation mode of creating the coolant for the high-temperature side coolant circuit and the coolant for the low-temperature side coolant circuit by the refrigeration cycle 31, like the outside-air heat-absorption heat pump dehumidification air-heating mode, while absorbing waste heat from the engine 61 without absorbing heat from the outside air.

Figure 6:
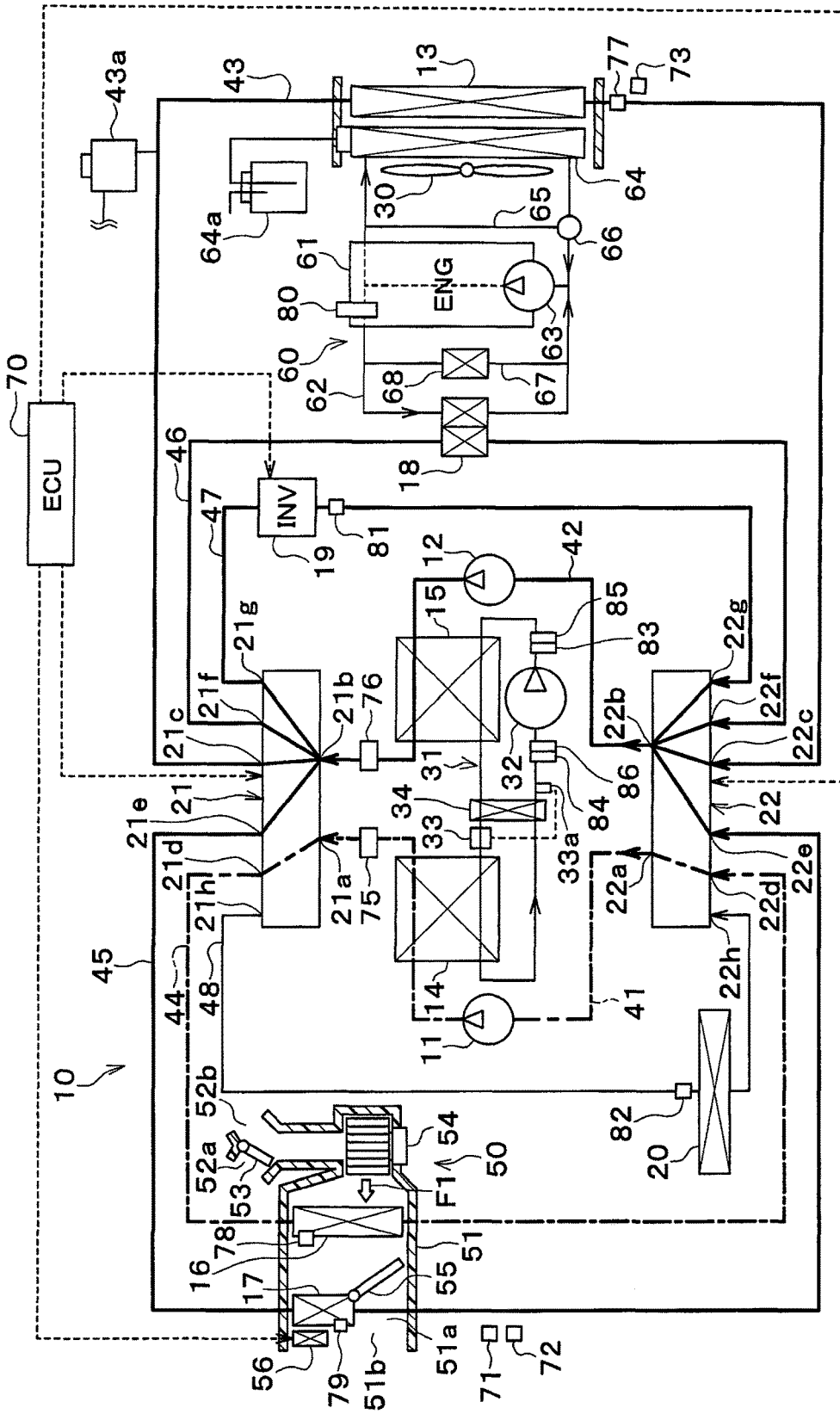
FIG. 6 is a diagram showing the flow of the coolant in an engine-waste-heat direct-use dehumidification air-heating mode of the first embodiment.

FIG. 6 shows the flow of the coolant in the engine-waste-heat direct-use dehumidification air-heating mode at step S142. In the engine-waste-heat direct-use dehumidification air-heating mode, the controller 70 controls the operations of the first switching valve 21 and the second switching valve 22 such that the coolant cooler 14 and the cooler core 16 are connected together to form a low-temperature side coolant circuit, while the coolant heater 15, the radiator 13, the heater core 17, the coolant-to-coolant heat exchanger 18, and the inverter 19 are connected together to form the high-temperature side coolant circuit.

In the low-temperature side coolant circuit, as indicated by a thick alternate long and short dash line of FIG. 6, the coolant cooled by the coolant cooler 14 is allowed to flow through the cooler core 16, whereby the ventilation air into the vehicle interior is dehumidified (cooled) by the cooler core 16. In the high-temperature side coolant circuit, as indicated by a thick solid line of FIG. 6, the coolant heated by the coolant-to-coolant heat exchanger 18 is allowed to flow through the heater core 17, whereby the ventilation air into the vehicle interior is heated by the heater core 17.

Therefore, in the engine-waste-heat direct-use dehumidification air-heating mode, the controller 70 performs the following control for the low-temperature side coolant circuit, the refrigeration cycle 31, and the high-temperature side coolant circuit.

In the low-temperature side coolant circuit, the flow rate of the coolant that can transfer the necessary amount of heat is calculated based on a cooling capacity required for the cooler core 16, and a coolant discharge capacity (the number of revolutions) of the first pump 11 is controlled to attain the calculated flow rate of the coolant.

In the refrigeration cycle 31, the temperature of the coolant cooled by the coolant cooler 14 is adjusted such that the temperature of the coolant flowing through the cooler core 16 becomes a target temperature. Specifically, the refrigerant discharge capacity (the number of revolutions) of the compressor 32 is controlled. The temperature of the coolant flowing through the cooler core 16 can be estimated from the surface temperature of the cooler core detected by the cooler-core temperature sensor 78.

In the high-temperature side coolant circuit, the coolant discharge capacity (the number of revolutions) of the second pump 12 is controlled to satisfy the flow rates of coolants required for the radiator 13, heater core 17, coolant-to-coolant heat exchanger 18, and inverter 19.

Figure 7:
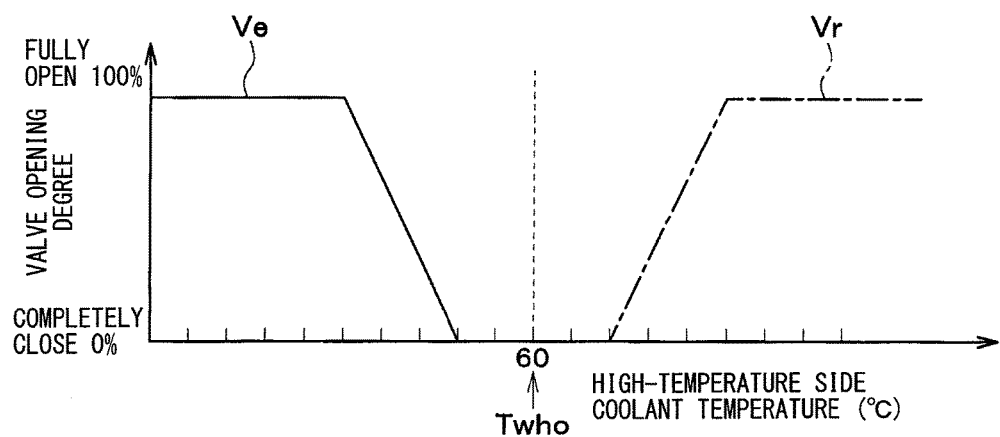
FIG. 7 is a control characteristic diagram of a first switching valve and a second switching valve in the engine-waste-heat direct-use dehumidification air-heating mode of the first embodiment.

FIG. 7 shows a control characteristic diagram of the first switching valve 21 and the second switching valve 22 in the engine-waste-heat direct-use dehumidification air-heating mode. Referring to FIG. 7, a solid line Ve indicates the valve opening degrees on the coolant-to-coolant heat exchanger 18 side of the first and second switching valves 21 and 22, and an alternate long and short dash line Vr indicates the valve opening degrees on the radiator 13 side of the first and second switching valves 21 and 22.

In general, the coolant temperature in the engine cooling circuit 60 is sometimes equal to or higher than 100° C. If all waste heat from the engine 61 is transferred to the coolant in the high-temperature side coolant circuit, the coolant temperature could exceed the heat-resistant temperature of the device, such as the inverter 19.

For this reason, a difference between the target coolant temperature Twho of the heater core 17 and the coolant temperature (high-temperature side coolant temperature) in the high-temperature side coolant circuit is calculated, thereby adjusting the valve opening degrees on the coolant-to-coolant heat exchanger 18 side of the first and second switching valves 21 and 22. Thus, the flow rate of the coolant in the coolant-to-coolant heat exchanger 18 is adjusted.

When the target coolant temperature Twho of the heater core 17 is reached only by the waste heat from the heat-generating device, such as the inverter 19, disposed in the high-temperature side coolant circuit, the valves on the radiator 13 side of the first and second switching valves 21 and 22 are opened to allow the coolant to flow through the radiator 13. Thus, the coolant temperature is controlled by dissipating heat at the radiator 13 not to exceed the heat-resistant temperature of the heat-generating device, such as the inverter 19.

Figure 8:
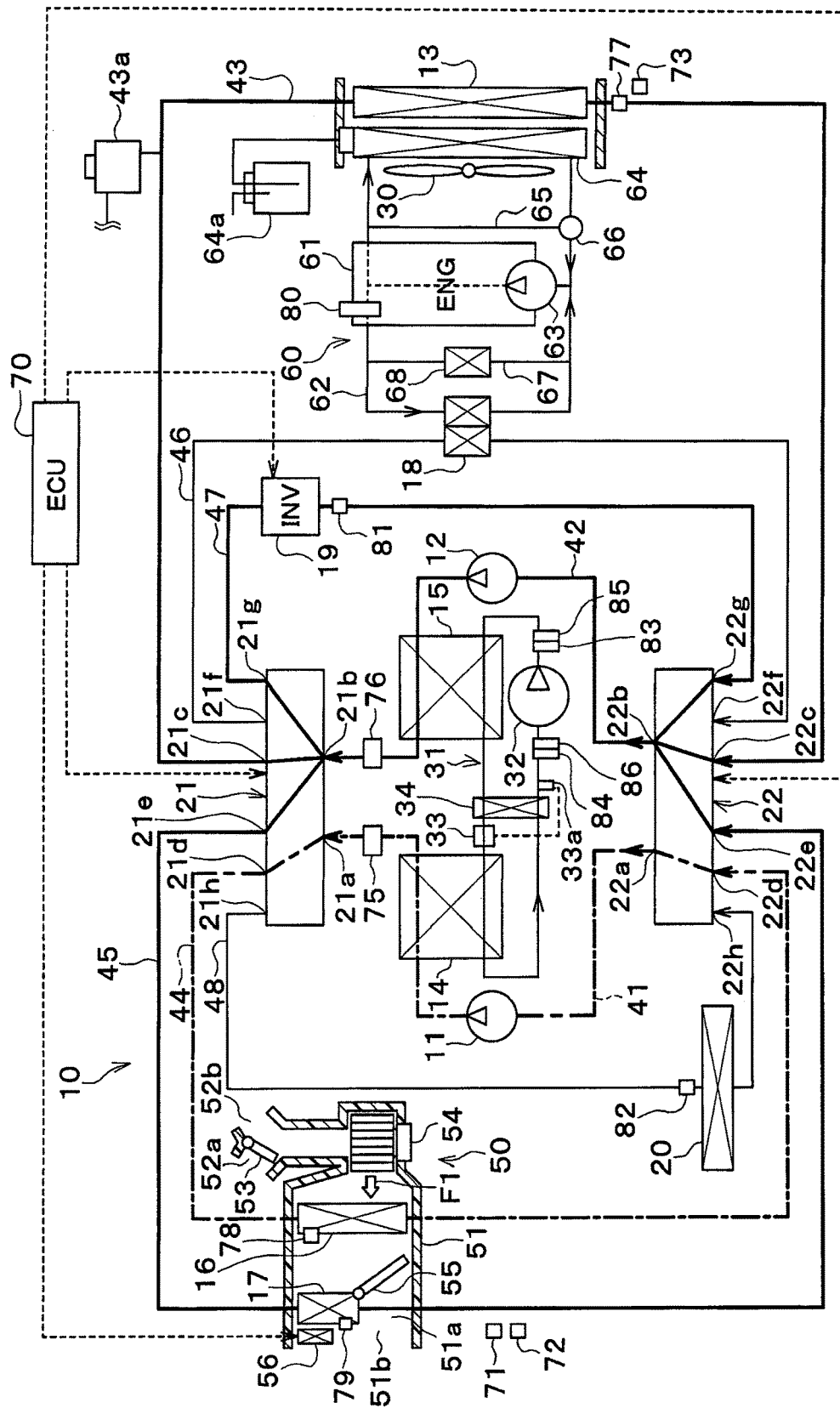
FIG. 8 is a diagram showing the flow of the coolant in a device-waste-heat direct-use dehumidification air-heating mode of the first embodiment.

FIG. 8 shows the flow of the coolant in the device-waste-heat direct-use dehumidification air-heating mode at step S144. In the device-waste-heat direct-use dehumidification air-heating mode, the controller 70 controls the operations of the first switching valve 21 and the second switching valve 22 such that the coolant cooler 14 and the cooler core 16 are connected together to form a low-temperature side coolant circuit, while the coolant heater 15, the radiator 13, the heater core 17, and the inverter 19 are connected together to form the high-temperature side coolant circuit.

In the low-temperature side coolant circuit, as indicated by a thick alternate long and short dash line of FIG. 8, the coolant cooled by the coolant cooler 14 is allowed to flow through the cooler core 16, whereby the ventilation air into the vehicle interior is dehumidified (cooled) by the cooler core 16. In the high-temperature side coolant circuit, as indicated by a thick solid line of FIG. 8, the coolant heated by the inverter 19 is allowed to flow through the heater core 17, whereby the ventilation air into the vehicle interior is heated by the heater core 17.

Therefore, in the device-waste-heat direct-use dehumidification air-heating mode, the controller 70 performs the following control for the low-temperature side coolant circuit, the refrigeration cycle 31, and the high-temperature side coolant circuit.

In the low-temperature side coolant circuit, like the engine-waste-heat direct-use dehumidification air-heating mode, the flow rate of the coolant that can transfer the necessary amount of heat is calculated based on a cooling capacity required for the cooler core 16, and a coolant discharge capacity (the number of revolutions) of the first pump 11 is controlled to attain the calculated flow rate of the coolant.

In the refrigeration cycle 31, like the engine-waste-heat direct-use dehumidification air-heating mode, the temperature of the coolant cooled by the coolant cooler 14 is adjusted such that the temperature of the coolant flowing through the cooler core 16 becomes the target temperature. Specifically, the refrigerant discharge capacity (the number of revolutions) of the compressor 32 is controlled. The temperature of the coolant flowing through the cooler core 16 can be estimated from the surface temperature of the cooler core detected by the cooler-core temperature sensor 78.

In the high-temperature side coolant circuit, the coolant discharge capacity (the number of revolutions) of the second pump 12 is controlled to satisfy the flow rates of coolant required for the radiator 13, heater core 17, and inverter 19.

Figure 9:
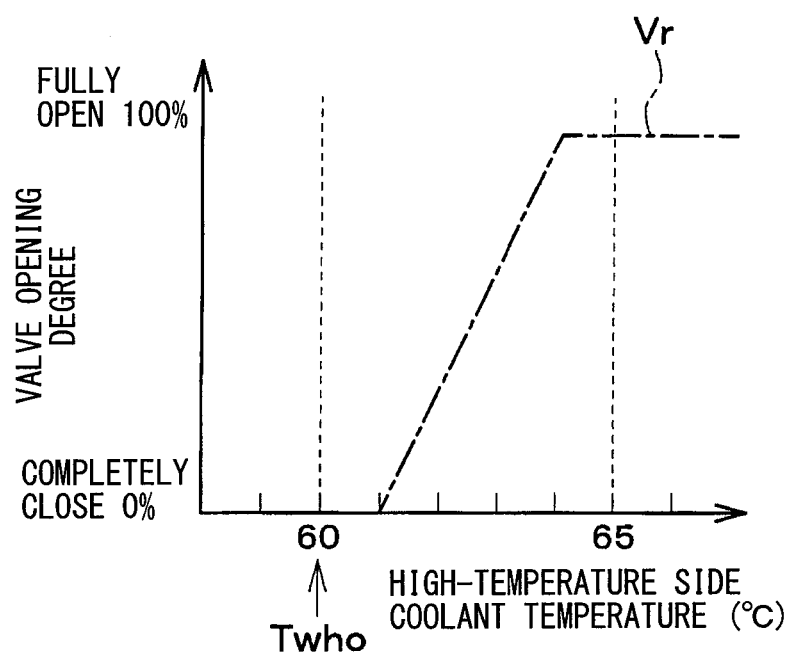
FIG. 9 is a control characteristic diagram of the first switching valve and the second switching valve in the device-waste-heat direct-use dehumidification air-heating mode of the first embodiment.

FIG. 9 shows a control characteristic diagram of the first switching valve 21 and the second switching valve 22 in the device-waste-heat direct-use dehumidification air-heating mode. In FIG. 9, the alternate long and short dash line Vr indicates the valve opening degrees on the radiator 13 side of the first and second switching valves 21 and 22.

The target coolant temperature Twho of the heater core 17 can be achieved by the waste heat from the heat-generating device, such as the inverter 19, disposed in the high-temperature side coolant circuit, as well as the heat dissipated from the refrigeration cycle 31. That is, the sum of the amount of waste heat from the heat-generating device, such as the inverter 19, and the heat dissipated from the refrigeration cycle 31 is larger than the amount of heat required for the heater core 17. In such a case, the coolant temperature in the high-temperature side coolant circuit could become excessively high, and the valves on the radiator 13 side of the first and second switching valves 21 and 22 are opened to allow the coolant to flow through the radiator 13. Thus, the coolant temperature is controlled by dissipating heat at the radiator 13 not to exceed the heat-resistant temperature of the heat-generating device, such as the inverter 19.

Figure 10:
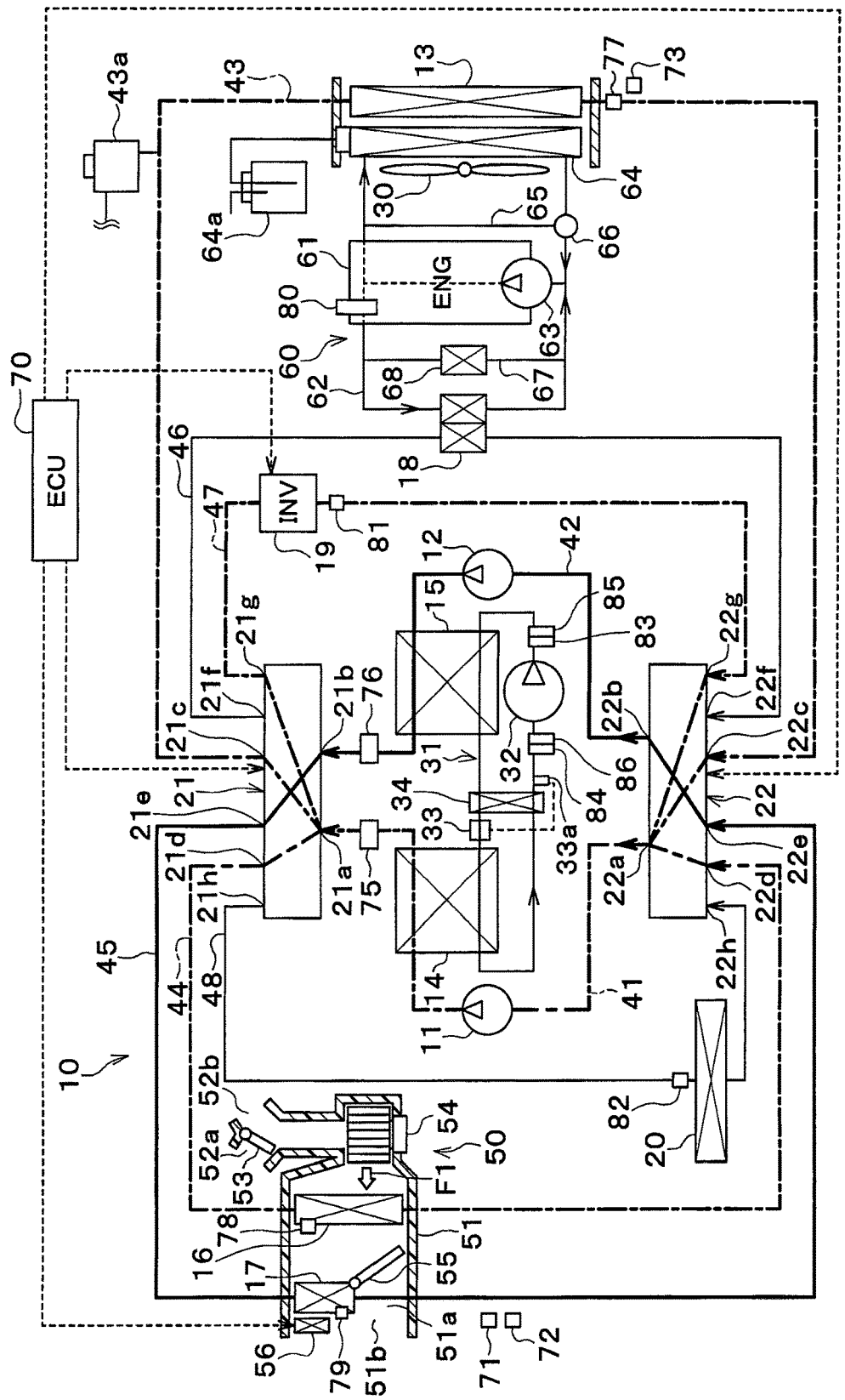
FIG. 10 is a diagram showing the flow of the coolant in an outside-air heat-absorption heat pump dehumidification air-heating mode of the first embodiment.

FIG. 10 shows the flow of the coolant in the outside-air heat-absorption heat pump dehumidification air-heating mode at step S146. In the outside-air heat-absorption heat pump dehumidification air-heating mode, the controller 70 controls the operations of the first switching valve 21 and the second switching valve 22 such that the coolant cooler 14, the radiator 13, the cooler core 16, and the inverter 19 are connected together to form a low-temperature side coolant circuit, while the coolant heater 15 and the heater core 17 are connected together to form the high-temperature side coolant circuit.

In the low-temperature side coolant circuit, as indicated by a thick alternate long and short dash line of FIG. 10, the coolant cooled by the coolant cooler 14 is allowed to flow through the cooler core 16 and the radiator 13, whereby the ventilation air into the vehicle interior is dehumidified (cooled) by the cooler core 16, and the coolant absorbs heat from the outside air at the radiator 13. In the high-temperature side coolant circuit, as indicated by a thick solid line of FIG. 10, the coolant heated by the coolant heater 15 is allowed to flow through the heater core 17, whereby the ventilation air into the vehicle interior is heated by the heater core 17.

That is, in the outside-air heat-absorption heat pump dehumidification air-heating mode, the refrigerant in the refrigeration cycle 31 absorbs heat from the outside air via the coolant at the coolant cooler 14, and dissipates heat into the coolant at the coolant heater 15. Therefore, a heat-pump operation for pumping up the heat from the outside air can be achieved.

The outside-air heat-absorption heat pump dehumidification air-heating mode is executed when the waste heat from the engine 61 or the heat-generating devices, including the inverter 19, cannot be used for air-heating, such as after leaving a vehicle over a long period of time. Thus, it is necessary to use the refrigeration cycle 31 to create the coolant for the low-temperature side coolant circuit (low-temperature coolant) and the coolant for the high-temperature side coolant circuit (high-temperature coolant).

To efficiently create heat at the refrigeration cycle 31, the heat absorption from the outside air is required. Thus, the low-temperature side coolant circuit is used as a circuit for heat absorption from the outside air, and the refrigeration cycle 31 is operated to quickly increase the temperature of the high-temperature side coolant circuit.

Further, the heat-generating device, such as the inverter 19, is disposed in the low-temperature side coolant circuit, whereby the waste heat from the heat-generating device, such as the inverter 19, is effectively utilized, and the coolant temperature of the coolant cooler 14 is increased to raise the low-pressure side pressure in the refrigeration cycle 31. Thus, the heating capacity and efficiency of the refrigeration cycle 31 are improved while increasing the workload of the compressor 32.

Thus, in the outside-air heat-absorption heat pump dehumidification air-heating mode, the controller 70 performs the following control for each of the low-temperature side coolant circuit, the refrigeration cycle 31, and the high-temperature side coolant circuit.

In the low-temperature side coolant circuit, the flow rate of the coolant that can transfer the necessary heat amount is calculated based on the amount of heat absorbed from the radiator 13 and the cooling capacity required for the cooler core 16 and the heat-generating device, such as the inverter 19. Furthermore, the coolant discharge capacity (the number of revolutions) of the first pump 11 is controlled to attain the calculated flow rate of the coolant.

When the temperature of the coolant flowing through the cooler core 16 is equal to or less than 0° C., condensed water attached onto the cooler core 16 can be frozen to generate frost (frost formation). For this reason, the adjustment of the coolant is performed, which includes decreasing the flow rate of the coolant flowing through the cooler core 16, or intermittently allowing the coolant to flow through the cooler core 16, thereby preventing the frost formation onto the cooler core 16.

In the refrigeration cycle 31, the temperature of the coolant heated by the coolant heater 15 is adjusted such that the temperature of the coolant flowing through the heater core 17 becomes the target temperature. Specifically, the refrigerant discharge capacity (the number of revolutions) of the compressor 32 is controlled. The temperature of the coolant flowing through the heater core 17 can be estimated from the surface temperature of the heater core detected by the heater-core temperature sensor 79.

In the high-temperature side coolant circuit, the device connected to the coolant heater 15 is only the heater core 17, whereby the thermal capacity of the high-temperature side coolant circuit is decreased to thereby quickly increase the coolant temperature.

Figure 11:
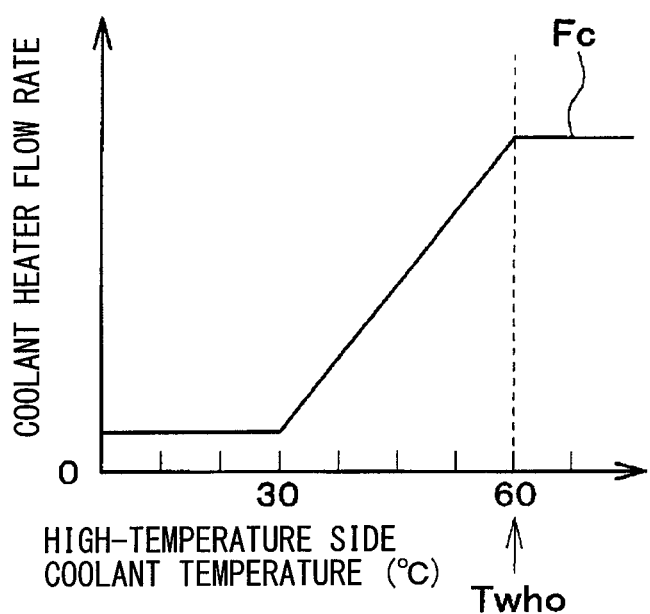
FIG. 11 is a control characteristic diagram of a second pump in the outside-air heat-absorption heat pump dehumidification air-heating mode of the first embodiment.

FIG. 11 is a control characteristic diagram of the second pump 12 in the outside-air heat-absorption heat pump dehumidification air-heating mode. In FIG. 11, the solid line Fc indicates the flow rate of the coolant in the coolant heater 15.

As the temperature of the coolant heater 15 becomes higher, the heating capacity of the refrigeration cycle 31 is increased. When the coolant temperature in the high-temperature side coolant circuit (high-temperature side coolant temperature) is low, the coolant discharge capacity (the number of revolutions) of the second pump 12 is reduced to decrease the flow rate of the coolant in the coolant heater 15, thereby increasing the temperature of the coolant heater 15. When the coolant temperature in the high-temperature side coolant circuit is high, the required flow rate of coolant is calculated based on the heating request for the heater core 17, thus controlling the coolant discharge capacity (the number of revolutions) of the second pump 12.

Figure 12:
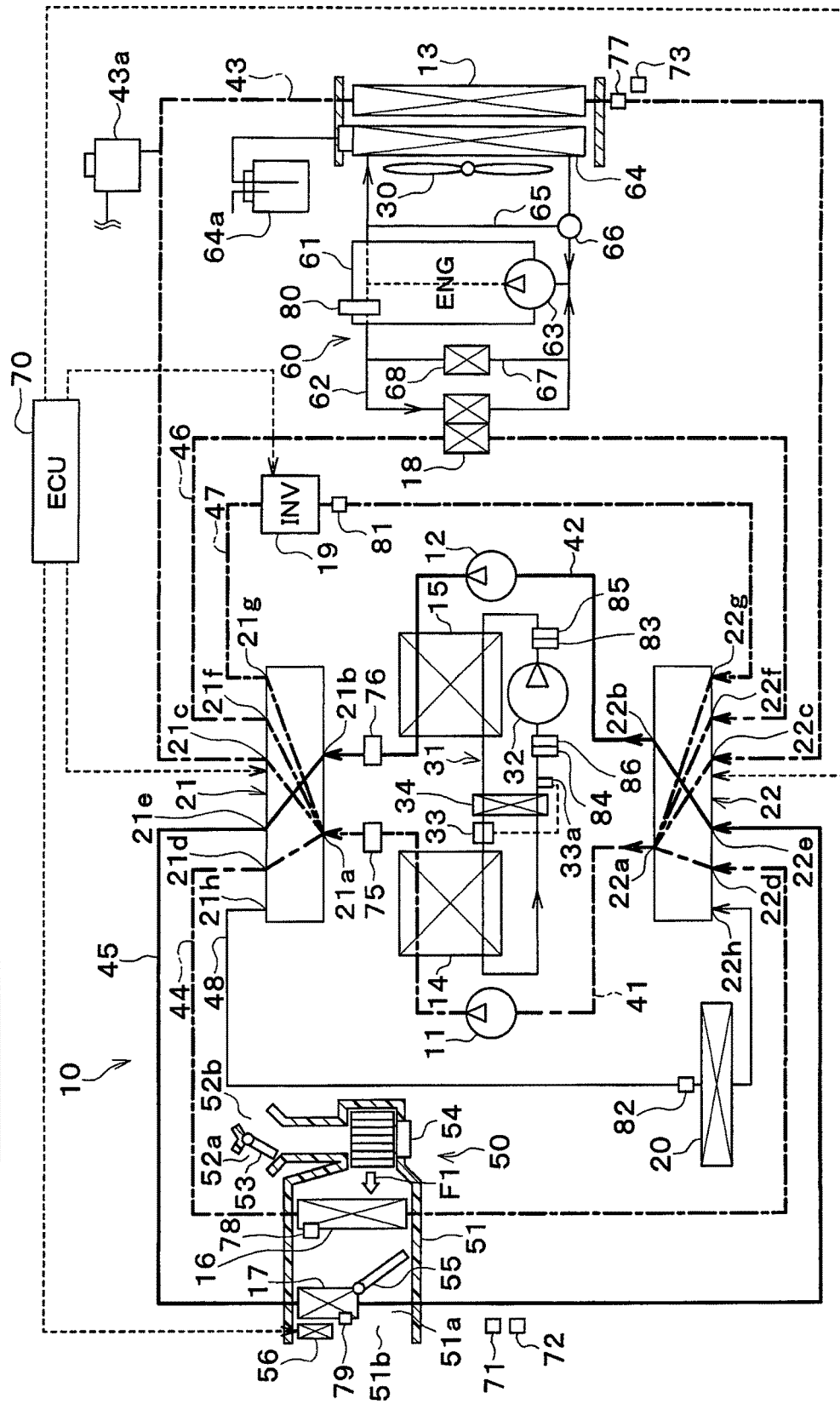
FIG. 12 is a diagram showing the flow of the coolant in an engine-heat-absorption heat pump dehumidification air-heating mode of the first embodiment.

FIG. 12 shows the flow of the coolant in the engine-heat-absorption heat pump dehumidification air-heating mode at step S147. In the engine-heat-absorption heat pump dehumidification air-heating mode, the controller 70 controls the operations of the first switching valve 21 and the second switching valve 22 such that the coolant cooler 14, the radiator 13, the cooler core 16, the coolant-to-coolant heat exchanger 18, and the inverter 19 are connected together to form a low-temperature side coolant circuit, while the coolant heater 15 and the heater core 17 are connected together to form the high-temperature side coolant circuit.

In the low-temperature side coolant circuit, as indicated by a thick alternate long and short dash line of FIG. 12, the coolant cooled by the coolant cooler 14 is allowed to flow through the cooler core 16 and the coolant-to-coolant heat exchanger 18, whereby the ventilation air into the vehicle interior is dehumidified (cooled) by the cooler core 16, and the coolant absorbs heat from the engine coolant at the coolant-to-coolant heat exchanger 18. In the high-temperature side coolant circuit, as indicated by a thick solid line of FIG. 12, the coolant heated by the coolant heater 15 is allowed to flow through the heater core 17, whereby the ventilation air into the vehicle interior is heated by the heater core 17.

That is, in the engine-heat-absorption heat pump dehumidification air-heating mode, the refrigerant in the refrigeration cycle 31 absorbs waste heat from the engine 61 via the engine coolant and the coolant at the coolant cooler 14, thereby dissipating heat into the coolant at the coolant heater 15. Therefore, a heat-pump operation for pumping up the waste heat from the engine 61 can be achieved.

The outside-air heat-absorption heat pump dehumidification air-heating mode is executed, for example, when the engine 61 is warmed after some time has elapsed since starting to travel, which had been parked before with the engine left cold for a long time.

In this case, the engine coolant temperature does not reach a temperature range that can be directly used by the heater core 17, but the amount of waste heat from the engine 61 of about 2 to 3 kW is usable.

Thus, the refrigeration cycle 31 needs to be used to create the coolant for the low-temperature side coolant circuit (low-temperature coolant) and the coolant for the high-temperature side coolant circuit (high-temperature coolant). The use of the waste heat from the engine 61 at a temperature higher than that of the outside air is more effective for the refrigeration cycle 31 than the use of the outside air. Because of this, the waste heat from the engine 61 is absorbed without absorbing heat from the outside air.

In the engine-heat-absorption heat pump dehumidification air-heating mode, the controller 70 performs the following control for each of the low-temperature side coolant circuit, the refrigeration cycle 31, and the high-temperature side coolant circuit.

In the low-temperature side coolant circuit, the flow rate of the coolant that can transfer the necessary heat amount is calculated based on the amount of heat absorbed from the coolant-to-coolant heat exchanger 18 (the amount of heat absorbed from the engine cooling circuit 60) and the cooling capacity required for the cooler core 16 and the heat-generating device, such as the inverter 19. Furthermore, the coolant discharge capacity (the number of revolutions) of the first pump 11 is controlled to attain the calculated flow rate of the coolant.

Figure 13:
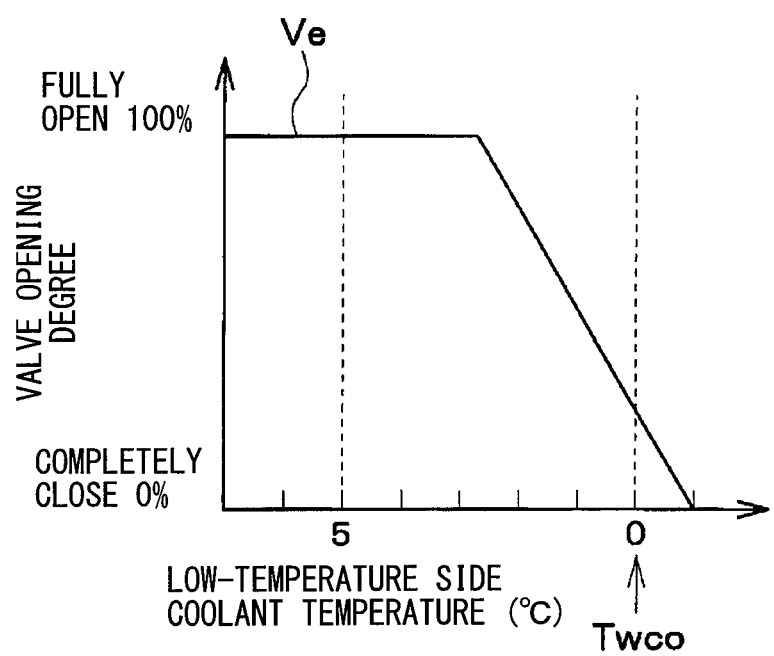
FIG. 13 is a control characteristic diagram of the first switching valve and the second switching valve in the engine-heat-absorption heat pump dehumidification air-heating mode of the first embodiment.

FIG. 13 shows a control characteristic diagram of the first switching valve 21 and the second switching valve 22 in the engine-heat-absorption heat pump dehumidification air-heating mode. In FIG. 13, the solid line Ve indicates the valve opening degrees on the coolant-to-coolant heat exchanger 18 side of the first and second switching valves 21 and 22.

In the engine-heat-absorption heat pump dehumidification air-heating mode, the ventilation air into the vehicle interior needs to be dehumidified, which requires the cooler core 16 to maintain the target temperature. Thus, when the coolant temperature in the low-temperature side coolant circuit (low-temperature side coolant temperature) is equal to or less than the target temperature Twco of the cooler core 16, the valves on the coolant-to-coolant heat exchanger 18 side of the first and second switching valves 21 and 22 are opened to allow the coolant to flow through the coolant-to-coolant heat exchanger 18. Thus, the heat is absorbed from the engine cooling circuit 60. On the other hand, when the coolant temperature in the low-temperature side coolant circuit (low-temperature side coolant temperature) is equal to or more than the target temperature Twco of the cooler core 16, the valves on the coolant-to-coolant heat exchanger 18 side of the first and second switching valves 21 and 22 are closed to prevent the coolant from flowing to the coolant-to-coolant heat exchanger 18. Thus, the engine cooling circuit 60 is interrupted from the low-temperature side coolant circuit.

In the refrigeration cycle 31, the temperature of the coolant heated by the coolant heater 15 is adjusted such that the temperature of the coolant flowing through the heater core 17 becomes the target temperature. Specifically, the refrigerant discharge capacity (the number of revolutions) of the compressor 32 is controlled. The temperature of the coolant flowing through the heater core 17 can be estimated from the surface temperature of the heater core detected by the heater-core temperature sensor 79.

In the high-temperature side coolant circuit, the device connected to the coolant heater 15 is only the heater core 17, which decreases the thermal capacity of the high-temperature side coolant circuit, thereby quickly increasing the coolant temperature.

The control characteristic diagram of the second pump 12 in the engine-heat-absorption heat pump dehumidification air-heating mode is the same as that in the control characteristic diagram of the second pump 12 in the outside-air heat-absorption heat pump dehumidification air-heating mode shown in FIG. 11.

That is, like the outside-air heat-absorption heat pump dehumidification air-heating mode, as the temperature of the coolant heater 15 becomes higher, the heating capacity of the refrigeration cycle 31 is enhanced. When the coolant temperature in the high-temperature side coolant circuit (high-temperature side coolant temperature) is low, the coolant discharge capacity (the number of revolutions) of the second pump 12 is reduced to decrease the flow rate of the coolant in the coolant heater 15, thereby increasing the temperature of the coolant heater 15. When the coolant temperature in the high-temperature side coolant circuit is high, the required flow rate of coolant is calculated based on the heating request for the heater core 17, thus controlling the coolant discharge capacity (the number of revolutions) of the second pump 12.

Figure 14:
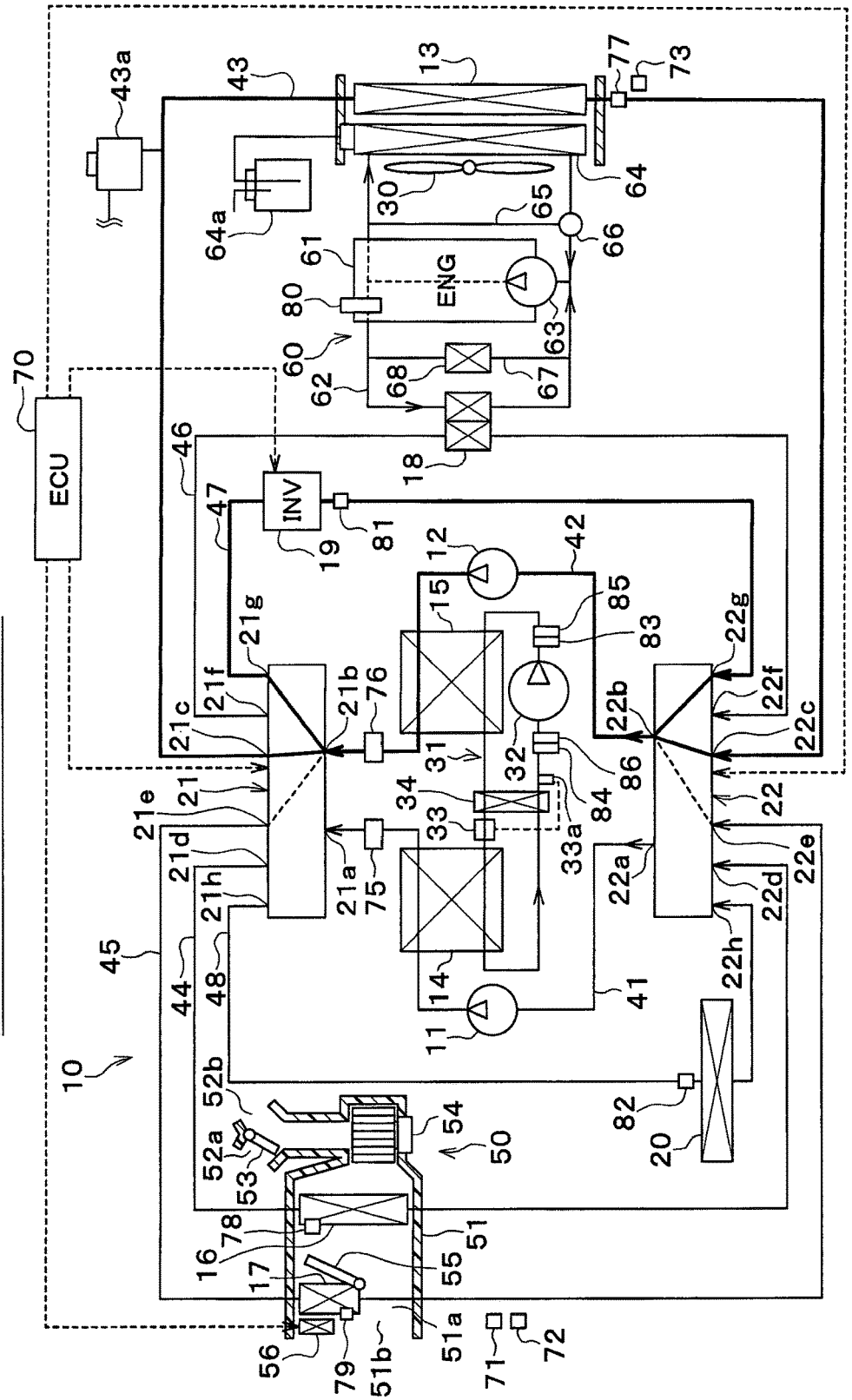
FIG. 14 is a diagram showing the flow of a coolant in an air-conditioning stopping mode of the first embodiment.

FIG. 14 shows the flow of the coolant in the air-conditioning stopping mode at step S160. In the air-conditioning stopping mode, the controller 70 controls the operations of the first switching valve 21 and the second switching valve 22 such that the coolant heater 15, the radiator 13, and the inverter 19 are connected together to form the high-temperature side coolant circuit.

In the high-temperature side coolant circuit, as indicated by a thick solid line of FIG. 14, the coolant heated by the inverter 19 is allowed to flow through the radiator 13, whereby the heat is dissipated from the coolant into the outside air at the radiator 13.

In the air-conditioning stopping mode, the heat-generating device, such as the inverter 19, may be cooled as the air-conditioning request is not made. Thus, the heat-generating device, such as the inverter 19, is disposed in the high-temperature side coolant circuit to allow the coolant to circulate between the radiator 13 and the heat-generating device of the inverter 19 and the like. In this way, the heat-generating device, such as the inverter 19 is cooled.

In the air-conditioning stopping mode, the controller 70 performs the following control for the low-temperature side coolant circuit, the refrigeration cycle 31, and the high-temperature side coolant circuit.

In the low-temperature side coolant circuit, the heat-generating device, such as the inverter 19, is not disposed, and there is no cooling request made for the cooler core 16, thereby bringing the first pump 11 into a stopped state.

In the refrigeration cycle 31, the low-temperature coolant does not need to be made, and the heat-generating device of the inverter 19 and the like can be cooled by dissipating heat therefrom into the outside air at the radiator 13, thereby bringing the compressor 32 into the stopped state.

In the high-temperature side coolant circuit, the coolant discharge capacity (the number of revolutions) of the second pump 12 is controlled to allow the flow rate of the coolant required for respective heat-generating devices, such as the inverter 19, by taking into consideration valve opening degrees of the first and second switching valves 21 and 22 for the respective heat-generating devices.

The valve opening degrees on the radiator 13 side of the first and second switching valves 21 and 22 are fully opened, thereby reducing the pressure loss of the coolant and further saving the power consumption at the second pump 12.

Since in the air-conditioning stopping mode, the waste heat from the engine 61 is not required, the engine cooling circuit 60 is separated from the low-temperature side coolant circuit and the high-temperature side coolant circuit. Specifically, the valve opening degrees on the coolant-to-coolant heat exchanger 18 side of the first and second switching valves 21 and 22 are completely closed, thus preventing the coolant from flowing to the coolant-to-coolant heat exchanger 18.

Figure 15:
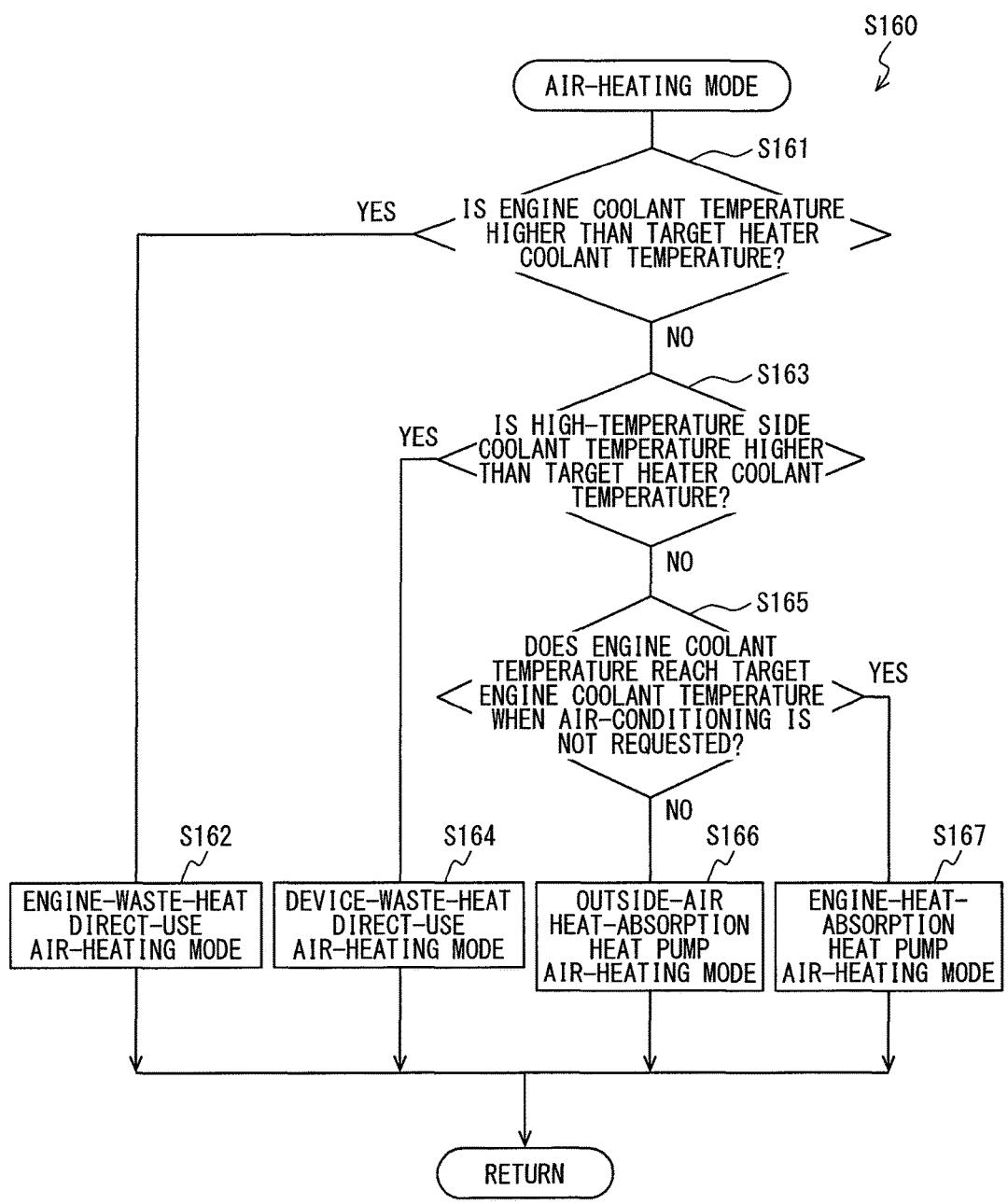
FIG. 15 is a flowchart showing the control processing in a dehumidification air-heating mode of the first embodiment.

FIG. 15 is a flowchart showing control processing in the air-heating mode at step S160.

Since the air-heating mode needs to heat the ventilation air into the interior, the high-temperature side coolant circuit is required to maintain the temperature of the coolant flowing through the heater core 17 at about 55 to 65° C. However, in this case, there is no request to cool the ventilation air into the interior, and thus the low-temperature side coolant circuit is not required to maintain the coolant at a low temperature.

Thus, the air-heating mode is the state in which the target coolant temperature of the cooler core 16 is not set, compared to the above-mentioned dehumidification air-heating mode. In order to make the coolant temperature in the high-temperature side coolant circuit quickly reach the target temperature, the controller 70 performs the following control.

In step S161, it is determined whether or not a coolant temperature Twe (engine coolant temperature) of the engine cooling circuit 60 is higher than a target coolant temperature Twho (target heater coolant temperature) of the heater core 17. When the coolant temperature Twe of the engine cooling circuit 60 is determined to be higher than the target coolant temperature Twho of the heater core 17, the operation proceeds to step S162, in which an engine-waste-heat direct-use air-heating mode is executed.

The engine-waste-heat direct-use air-heating mode is an operation mode in which the coolant in the high-temperature side coolant circuit is created with waste heat from the engine 61.

When the coolant temperature Twe of the engine cooling circuit 60 is determined to be lower than the target coolant temperature Twho of the heater core 17 in step S161, the operation proceeds to step S163. In step S163, it is determined whether or not the coolant temperature Twm of the high-temperature side coolant circuit (high-temperature side coolant temperature) is higher than the target coolant temperature Twho of the heater core 17 (target heater coolant temperature).

When the coolant temperature Twm of the high-temperature side coolant circuit is determined to be higher than the target coolant temperature Twho of the heater core 17, the operation proceeds to step S164, in which a device-waste-heat direct-use air-heating mode is executed.

The device-waste-heat direct-use dehumidification air-heating mode is an operation mode in which the coolant in the high-temperature side coolant circuit is created with waste heat from the heat-generating device, such as the inverter 19.

When the coolant temperature Twm of the high-temperature side coolant circuit is determined to be lower than the target coolant temperature Twho of the heater core 17 in step S163, the operation proceeds to step S165. In step S165, it is determined whether or not the coolant temperature Twe (engine coolant temperature) of the engine cooling circuit 60 reaches the target coolant temperature Tweo of the engine cooling circuit 60 when the air-conditioning is not requested (target engine coolant temperature when the air-conditioning is not requested).

If the coolant temperature Twe of the engine cooling circuit 60 is determined not to reach the target engine coolant temperature Tweo when the air-conditioning is not requested, the operation proceeds to step S166, in which an outside-air heat-absorption heat pump air-heating mode is executed.

The outside-air heat-absorption heat pump air-heating mode is an operation mode in which the coolant for the high-temperature side coolant circuit is created by the refrigeration cycle 31, thus absorbing heat from the outside air.

If the coolant temperature Twe in the engine cooling circuit 60 is determined to reach the target engine coolant temperature Tweo when the air-conditioning is not requested in step S165, the operation proceeds to step S167, in which an engine-heat-absorption heat pump air-heating mode is executed.

The engine-heat-absorption heat pump air-heating mode is an operation mode of creating the coolant for the high-temperature side coolant circuit by the refrigeration cycle 31, like the outside-air heat-absorption heat pump air-heating mode, while absorbing heat from the engine 61 without absorbing heat from the outside air.

Figure 16:
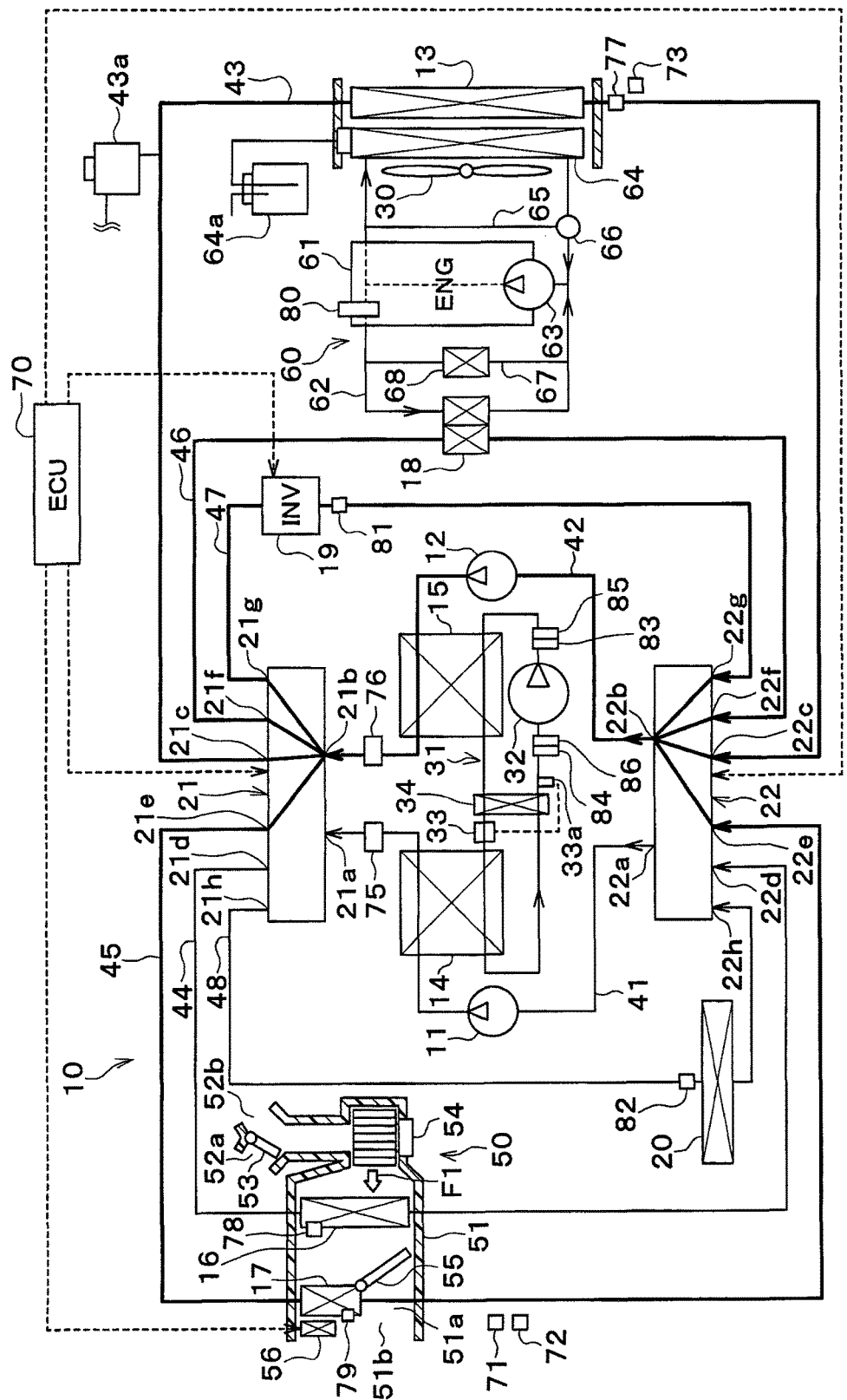
FIG. 16 is a diagram showing the flow of the coolant in an engine-waste-heat direct-use air-heating mode of the first embodiment.

FIG. 16 shows the flow of the coolant in the engine-waste-heat direct-use air-heating mode at step S162. In the engine-waste-heat direct-use air-heating mode, the controller 70 controls the operations of the first switching valve 21 and the second switching valve 22 such that the coolant heater 15, the radiator 13, the heater core 17, the coolant-to-coolant heat exchanger 18, and the inverter 19 are connected together to form a high-temperature side coolant circuit.

In the high-temperature side coolant circuit, as indicated by a thick solid line of FIG. 16, the coolant heated by the coolant-to-coolant heat exchanger 18 is allowed to flow through the heater core 17, whereby the ventilation air into the vehicle interior is heated by the heater core 17.

Therefore, in the engine-waste-heat direct-use air-heating mode, the controller 70 performs the following control for the low-temperature side coolant circuit, the refrigeration cycle 31, and the high-temperature side coolant circuit.

In the low-temperature side coolant circuit, as there is no cooling request for the cooler core 16, the first pump 11 is brought into the stopped state.

In the refrigeration cycle 31, as the coolant temperature in the high-temperature side coolant circuit is adjusted with the waste heat from the engine 61, the compressor 32 is brought into the stopped state.

In the high-temperature side coolant circuit, the coolant discharge capacity (the number of revolutions) of the second pump 12 is controlled to satisfy the flow rates of coolant required for the radiator 13, heater core 17, coolant-to-coolant heat exchanger 18, and inverter 19.

The control characteristic diagram of the first and second switching valves 21 and 22 in the engine-waste-heat direct-use air-heating mode is substantially the same as that of the first and second switching valves 21 and 22 in the engine-waste-heat direct-use dehumidification air-heating mode shown in FIG. 7.

In general, the coolant temperature in the engine cooling circuit 60 is sometimes equal to or higher than 100° C. If all waste heat from the engine 61 is transferred to the coolant in the high-temperature side coolant circuit, the coolant temperature could exceed the heat-resistant temperature of the devices, including the inverter 19.

For this reason, a difference between the target coolant temperature Twho of the heater core 17 and the coolant temperature (high-temperature side coolant temperature) in the high-temperature side coolant circuit is calculated, thereby adjusting the valve opening degrees on the coolant-to-coolant heat exchanger 18 side of the first and second switching valves 21 and 22. Thus, the flow rate of the coolant in the coolant-to-coolant heat exchanger 18 is adjusted.

When the target coolant temperature Twho of the heater core 17 can be reached by the waste heat from the heat-generating device only, such as the inverter 19, disposed in the high-temperature side coolant circuit, the valves on the radiator 13 side of the first and second switching valves 21 and 22 are opened to allow the coolant to flow through the radiator 13. Thus, the coolant temperature is controlled by dissipating heat at the radiator 13 not to exceed the heat-resistant temperature of the heat-generating device, such as the inverter 19.

Figure 17:
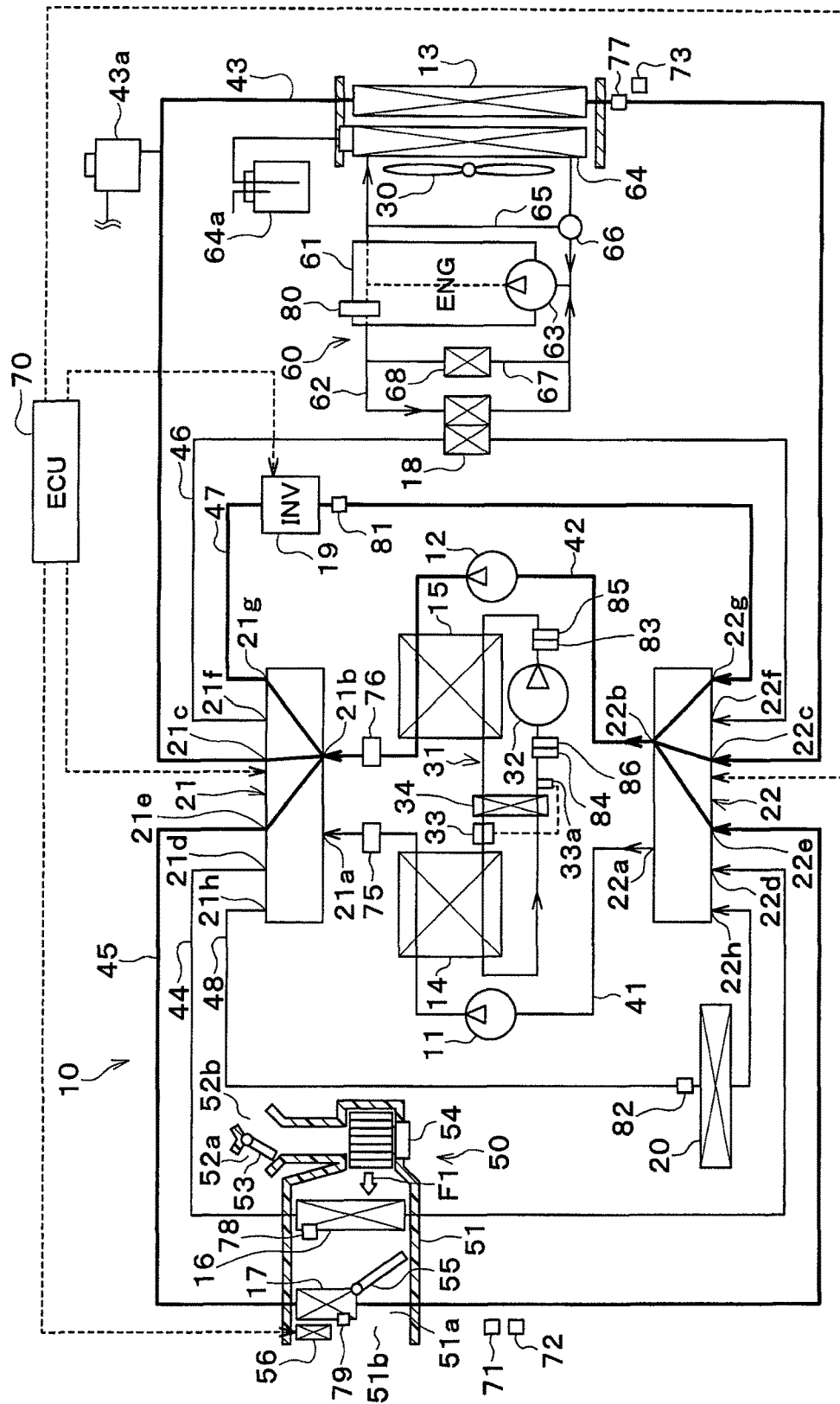
FIG. 17 is a diagram showing the flow of the coolant in a device-waste-heat direct-use air-heating mode of the first embodiment.

FIG. 17 shows the flow of the coolant in the device-waste-heat direct-use air-heating mode at step S164. In the device-waste-heat direct-use air-heating mode, the controller 70 controls the operations of the first switching valve 21 and the second switching valve 22 such that the coolant heater 15, the radiator 13, the heater core 17, and the inverter 19 are connected together to form a high-temperature side coolant circuit.

In the high-temperature side coolant circuit, as indicated by a thick solid line of FIG. 17, the coolant heated by the inverter 19 is allowed to flow through the heater core 17, whereby the ventilation air into the vehicle interior is heated by the heater core 17.

Therefore, in the device-waste-heat direct-use air-heating mode, the controller 70 performs the following control for the low-temperature side coolant circuit, the refrigeration cycle 31, and the high-temperature side coolant circuit.

In the low-temperature side coolant circuit, as there is no cooling request for the cooler core 16, the first pump 11 is brought into the stopped state.

In the refrigeration cycle 31, as the coolant temperature in the high-temperature side coolant circuit is adjusted with the waste heat from the heat-generating devices, including the inverter 19, the compressor 32 is brought into the stopped state.

In the high-temperature side coolant circuit, the coolant discharge capacity (the number of revolutions) of the second pump 12 is controlled to satisfy the flow rates of coolant required for the radiator 13, heater core 17, and inverter 19.

The control characteristic diagram of the first and second switching valves 21 and 22 in the device-waste-heat direct-use air-heating mode is substantially the same as that of the first and second switching valves 21 and 22 in the device-waste-heat direct-use dehumidification air-heating mode shown in FIG. 9.

The target coolant temperature Twho of the heater core 17 can be achieved by the waste heat from the heat-generating device, such as the inverter 19, disposed in the high-temperature side coolant circuit, as well as the heat dissipated from the refrigeration cycle 31. That is, the sum of the amount of waste heat from the heat-generating device, such as the inverter 19, and the amount of heat dissipated from the refrigeration cycle 31 is larger than the amount of heat required for the heater core 17. In such a case, the coolant temperature in the high-temperature side coolant circuit could become excessively high; thus the valves on the radiator 13 side of the first and second switching valves 21 and 22 are opened to allow the coolant to flow through the radiator 13. Thus, the coolant temperature is controlled by dissipating heat at the radiator 13 not to exceed the heat-resistant temperature of the heat-generating device, such as the inverter 19.

Figure 18:
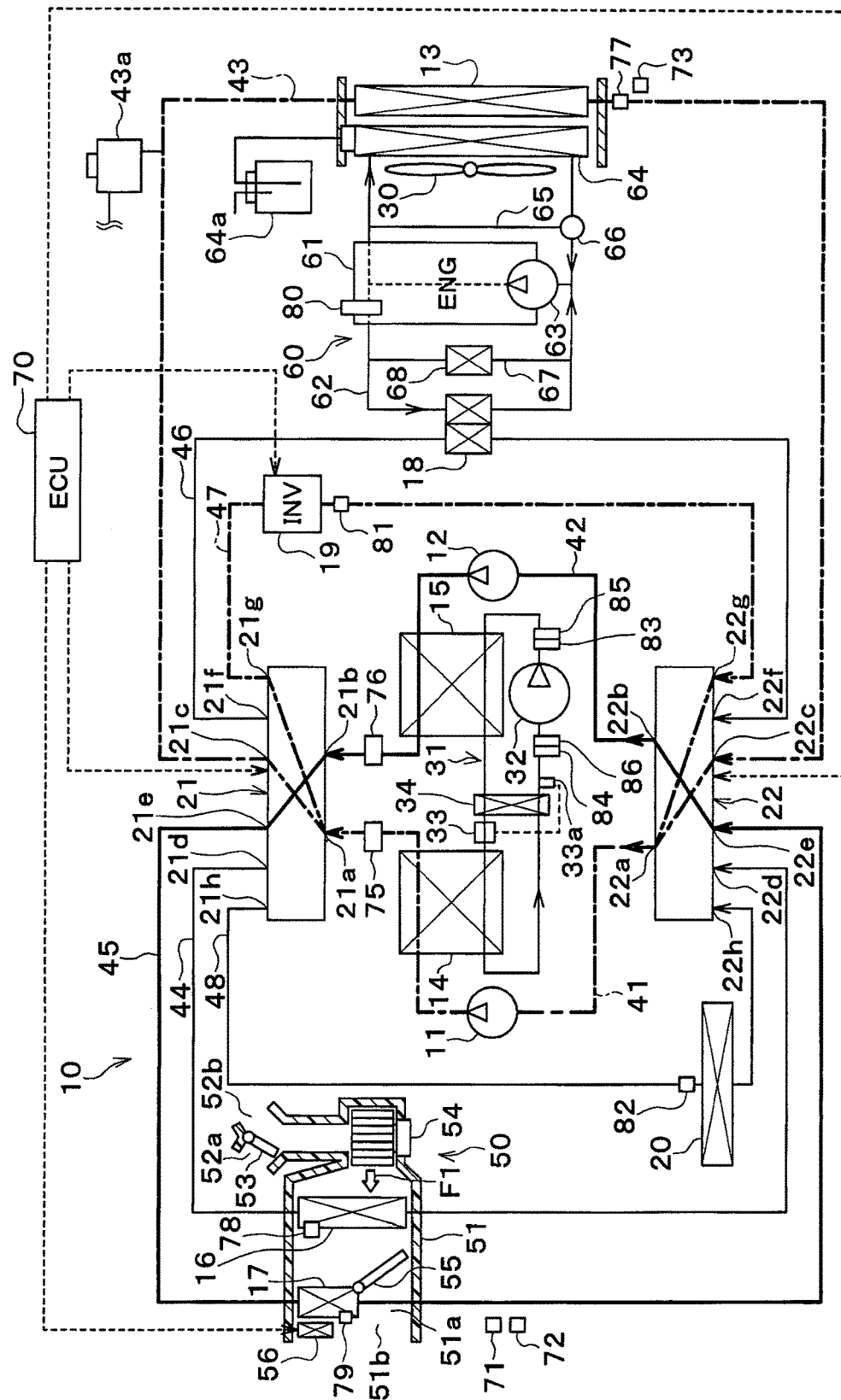
FIG. 18 is a diagram showing the flow of the coolant in an outside-air heat-absorption heat pump air-heating mode of the first embodiment.

FIG. 18 shows the flow of the coolant in the outside-air heat-absorption heat pump air-heating mode at step S166. In the outside-air heat-absorption heat pump air-heating mode, the controller 70 controls the operations of the first switching valve 21 and the second switching valve 22 such that the coolant cooler 14, the radiator 13, and the inverter 19 are connected together to form a low-temperature side coolant circuit, while the coolant heater 15 and the heater core 17 are connected together to form the high-temperature side coolant circuit.

In the low-temperature side coolant circuit, as indicated by a thick alternate long and short dash line of FIG. 18, the coolant cooled by the coolant cooler 14 is allowed to flow through the radiator 13, whereby the coolant absorbs heat from the outside air at the radiator 13. In the high-temperature side coolant circuit, as indicated by a thick solid line of FIG. 18, the coolant heated by the coolant heater 15 is allowed to flow through the heater core 17, thereby heating the ventilation air into the vehicle interior by the heater core 17.

That is, in the outside-air heat-absorption air-heating mode, the refrigerant in the refrigeration cycle 31 absorbs heat from the outside air via the coolant at the coolant cooler 14, and dissipates heat into the coolant at the coolant heater 15. Therefore, a heat-pump operation for pumping up the heat from the outside air can be achieved.

The outside-air heat-absorption heat pump air-heating mode is executed when the waste heat from the engine 61 or the heat-generating devices, including the inverter 19, cannot be used for air-heating, such as after leaving a vehicle over a long period of time. Thus, it is necessary to use the refrigeration cycle 31 to create the coolant for the low-temperature side coolant circuit (low-temperature coolant) and the coolant for the high-temperature side coolant circuit (high-temperature coolant).

To efficiently create heat at the refrigeration cycle 31, the heat absorption from the outside air is required. Thus, the low-temperature side coolant circuit is used as a circuit for heat absorption from the outside air, and the refrigeration cycle 31 is operated to quickly increase the temperature of the high-temperature side coolant circuit.

Further, the heat-generating device, such as the inverter 19, is disposed in the low-temperature side coolant circuit, whereby the waste heat from the heat-generating device, such as the inverter 19, is effectively utilized, and the coolant temperature of the coolant cooler 14 is increased to raise the low-pressure side pressure in the refrigeration cycle 31. Thus, the heating capacity and efficiency of the refrigeration cycle 31 is improved while increasing the workload of the compressor 32.

Accordingly, in the outside-air heat-absorption heat pump air-heating mode, the controller 70 performs the following control for the low-temperature side coolant circuit, the refrigeration cycle 31, and the high-temperature side coolant circuit.

In the low-temperature side coolant circuit, the flow rate of the coolant that can transfer the necessary heat amount is calculated based on the amount of heat absorbed from the radiator 13 and the cooling capacity required for the heat-generating device, such as the inverter 19. Furthermore, the coolant discharge capacity (the number of revolutions) of the first pump 11 is controlled to attain the calculated flow rate of the coolant.

To increase the amount of heat absorbed from the outside air as much as possible, the valves on the radiator 13 side of the first and second switching valves 21 and 22 are fully opened to make the flow rate of coolant at the radiator 13 more.

In the refrigeration cycle 31, the temperature of the coolant heated by the coolant heater 15 is adjusted such that the temperature of the coolant flowing through the heater core 17 becomes the target temperature. Specifically, the refrigerant discharge capacity (the number of revolutions) of the compressor 32 is controlled. The temperature of the coolant flowing through the heater core 17 can be estimated from the surface temperature of the heater core detected by the heater-core temperature sensor 79.

In the high-temperature side coolant circuit, the device connected to the coolant heater 15 is only the heater core 17, which decreases the thermal capacity of the high-temperature side coolant circuit, thereby quickly increasing the coolant temperature.

The control characteristic diagram of the second pump 12 in the outside-air heat-absorption heat pump air-heating mode is substantially the same as that in the control characteristic diagram of the second pump 12 in the outside-air heat-absorption heat pump dehumidification air-heating mode shown in FIG. 11.

As the temperature of the coolant heater 15 becomes higher, the heating capacity of the refrigeration cycle 31 is enhanced. When the coolant temperature in the high-temperature side coolant circuit (high-temperature side coolant temperature) is low, the coolant discharge capacity (the number of revolutions) of the second pump 12 is reduced to decrease the flow rate of the coolant in the coolant heater 15, thereby increasing the temperature of the coolant heater 15. When the coolant temperature in the high-temperature side coolant circuit is high, the required flow rate of coolant is calculated based on the heating request for the heater core 17, thus controlling the coolant discharge capacity (the number of revolutions) of the second pump 12.

Figure 19:
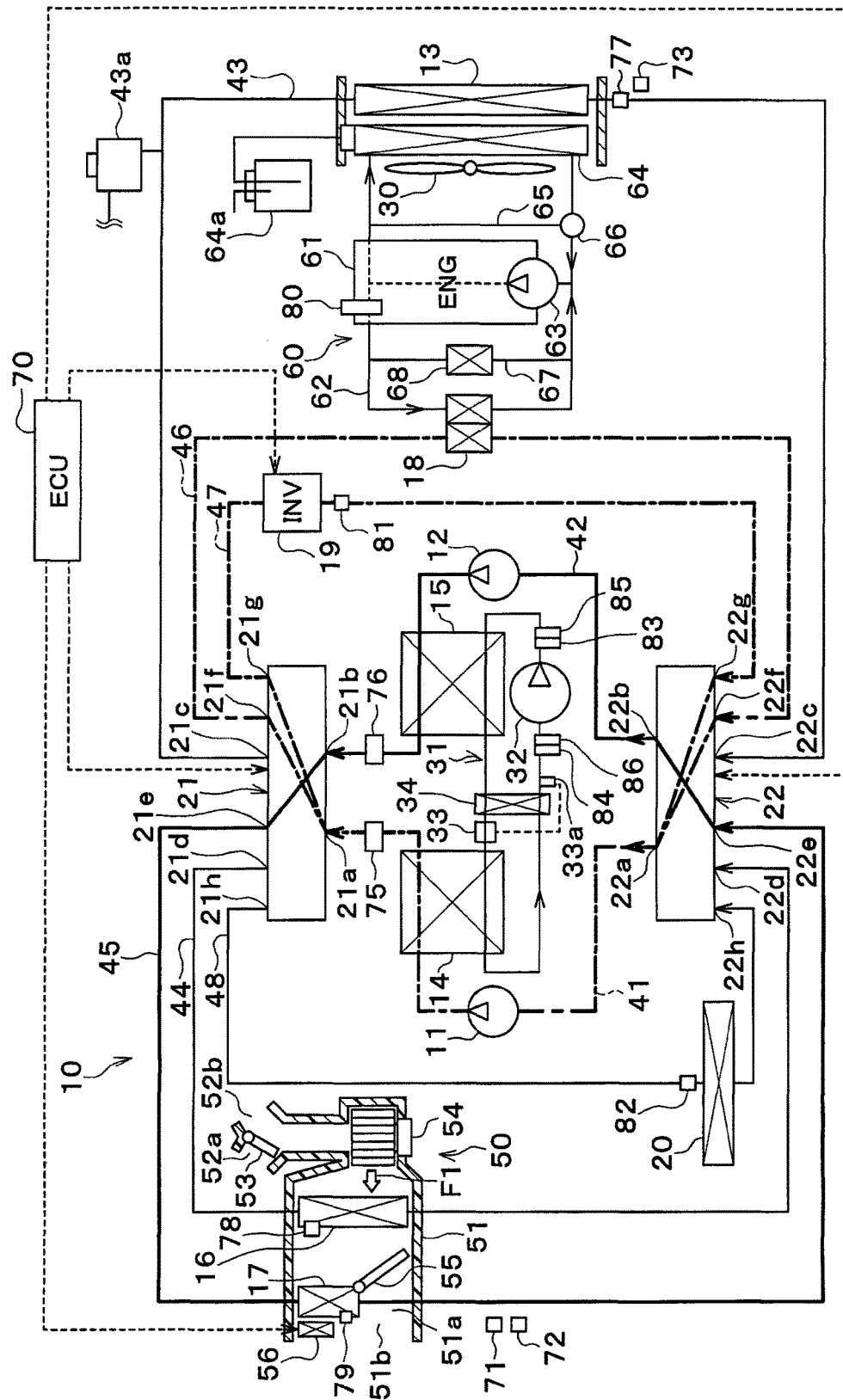
FIG. 19 is a diagram showing the flow of the coolant in an engine-heat-absorption heat pump air-heating mode of the first embodiment.

FIG. 19 shows the flow of the coolant in the engine-heat-absorption heat pump air-heating mode at step S167. In the engine-heat-absorption heat pump air-heating mode, the controller 70 controls the operations of the first switching valve 21 and the second switching valve 22 such that the coolant cooler 14, the radiator 13, the coolant-to-coolant heat exchanger 18, and the inverter 19 are connected together to form a low-temperature side coolant circuit, while the coolant heater 15 and the heater core 17 are connected together to form the high-temperature side coolant circuit.

In the low-temperature side coolant circuit, as indicated by a thick alternate long and short dash line of FIG. 19, the coolant cooled by the coolant cooler 14 is allowed to flow through the coolant-to-coolant heat exchanger 18, whereby the coolant absorbs heat from the engine coolant at the coolant-to-coolant heat exchanger 18. In the high-temperature side coolant circuit, as indicated by a thick solid line of FIG. 19, the coolant heated by the coolant heater 15 is allowed to flow through the heater core 17, thereby heating the ventilation air into the vehicle interior at the heater core 17.

That is, in the outside-air heat-absorption heat pump air-heating mode, the refrigerant in the refrigeration cycle 31 absorbs waste heat from the engine 61 via the engine coolant and the coolant at the coolant cooler 14, thereby dissipating heat into the coolant at the coolant heater 15. Therefore, a heat-pump operation for pumping up the waste heat from the engine 61 can be achieved.

The outside-air heat-absorption heat pump air-heating mode is executed, for example, when the engine 61 is warmed after some time has elapsed since starting to travel, which had been parked with the engine left cold for a long time.

In this case, the engine coolant temperature does not reach a temperature range that can be directly used by the heater core 17, but the amount of waste heat from the engine 61 of about 2 to 3 kW is usable.

Thus, the refrigeration cycle 31 needs to be used to create the coolant for the low-temperature side coolant circuit (low-temperature coolant) and the coolant for the high-temperature side coolant circuit (high-temperature coolant). The use of the waste heat from the engine 61 at a temperature higher than that of the outside air is more effective for the refrigeration cycle 31 than the use of the outside air. Because of this, the waste heat from the engine 61 is absorbed without absorbing heat from the outside air.

In the engine-heat-absorption heat pump air-heating mode, the controller 70 performs the following control for the low-temperature side coolant circuit, the refrigeration cycle 31, and the high-temperature side coolant circuit.

In the low-temperature side coolant circuit, the flow rate of the coolant that can transfer the necessary heat amount is calculated based on the amount of heat absorbed from the coolant-to-coolant heat exchanger 18 (the amount of heat absorbed from the engine cooling circuit 60) and the cooling capacity required for the heat-generating device, such as the inverter 19. Furthermore, the coolant discharge capacity (the number of revolutions) of the first pump 11 is controlled to attain the calculated flow rate of the coolant.

Figure 20:
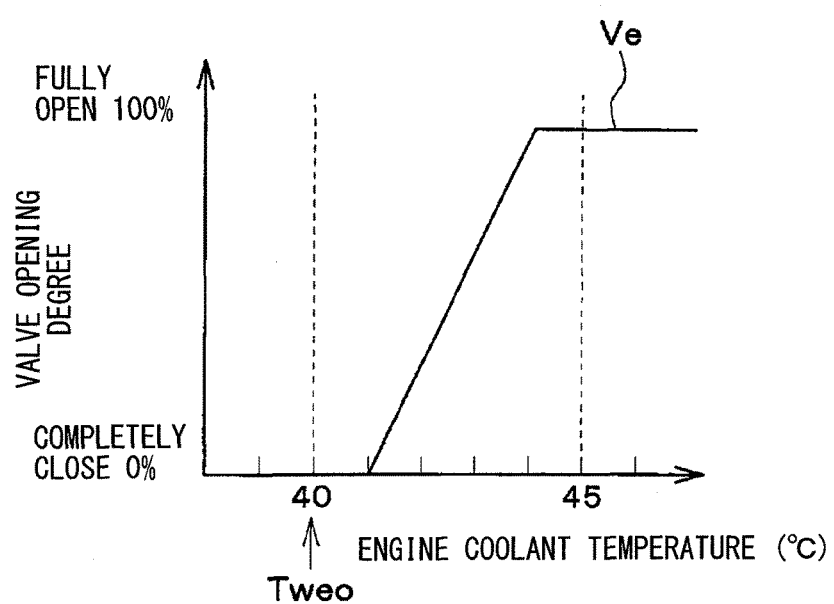
FIG. 20 is a control characteristic diagram of the first switching valve and the second switching valve in the engine-heat-absorption heat pump air-heating mode of the first embodiment.

FIG. 20 shows a control characteristic diagram of the first switching valve 21 and the second switching valve 22 in the engine-heat-absorption heat pump air-heating mode. In FIG. 20, the solid line Ve indicates the valve opening degrees on the coolant-to-coolant heat exchanger 18 side of the first and second switching valves 21 and 22.

In the engine-heat-absorption heat pump air-heating mode, as there is no request to cool the cooler core 16, the coolant temperature (low-temperature side coolant temperature) in the low-temperature side coolant circuit may be high. Thus, to maximize the amount of heat absorbed from the engine cooling circuit 60, the valve opening degrees on the coolant-to-coolant heat exchanger 18 side of the first and second switching valves 21 and 22 are controlled based on a difference between the temperature of the engine coolant (engine coolant temperature) and the target engine coolant temperature Tweo when the air conditioning is not requested.

That is, the flow rate of the coolant in the coolant-to-coolant heat exchanger 18 is adjusted to control the amount of heat absorbed from the engine 61, thus maintaining the engine coolant at a certain temperature or higher.

In the refrigeration cycle 31, the temperature of the coolant heated by the coolant heater 15 is adjusted such that the temperature of the coolant flowing through the heater core 17 becomes the target temperature. Specifically, the refrigerant discharge capacity (the number of revolutions) of the compressor 32 is controlled. The temperature of the coolant flowing through the heater core 17 can be estimated from the surface temperature of the heater core detected by the cooler-core temperature sensor 79.

In the high-temperature side coolant circuit, the device connected to the coolant heater 15 is only the heater core 17, which decreases the thermal capacity of the high-temperature side coolant circuit, thereby quickly increasing the coolant temperature.

The control characteristic diagram of the second pump 12 in the engine-heat-absorption heat pump air-heating mode is the same as that in the control characteristic diagram of the second pump 12 in the outside-air heat-absorption heat pump dehumidification air-heating mode shown in FIG. 11.

That is, like the outside-air heat-absorption heat-pump dehumidification air-heating mode, as the temperature of the coolant heater 15 becomes higher, the heating capacity of the refrigeration cycle 31 is enhanced. When the coolant temperature in the high-temperature side coolant circuit (high-temperature side coolant temperature) is low, the coolant discharge capacity (the number of revolutions) of the second pump 12 is reduced to decrease the flow rate of the coolant in the coolant heater 15, thereby increasing the temperature of the coolant heater 15. When the coolant temperature in the high-temperature side coolant circuit is high, the required flow rate of coolant is calculated based on the heating request for the heater core 17, thus controlling the coolant discharge capacity (the number of revolutions) of the second pump 12.

Figure 21:
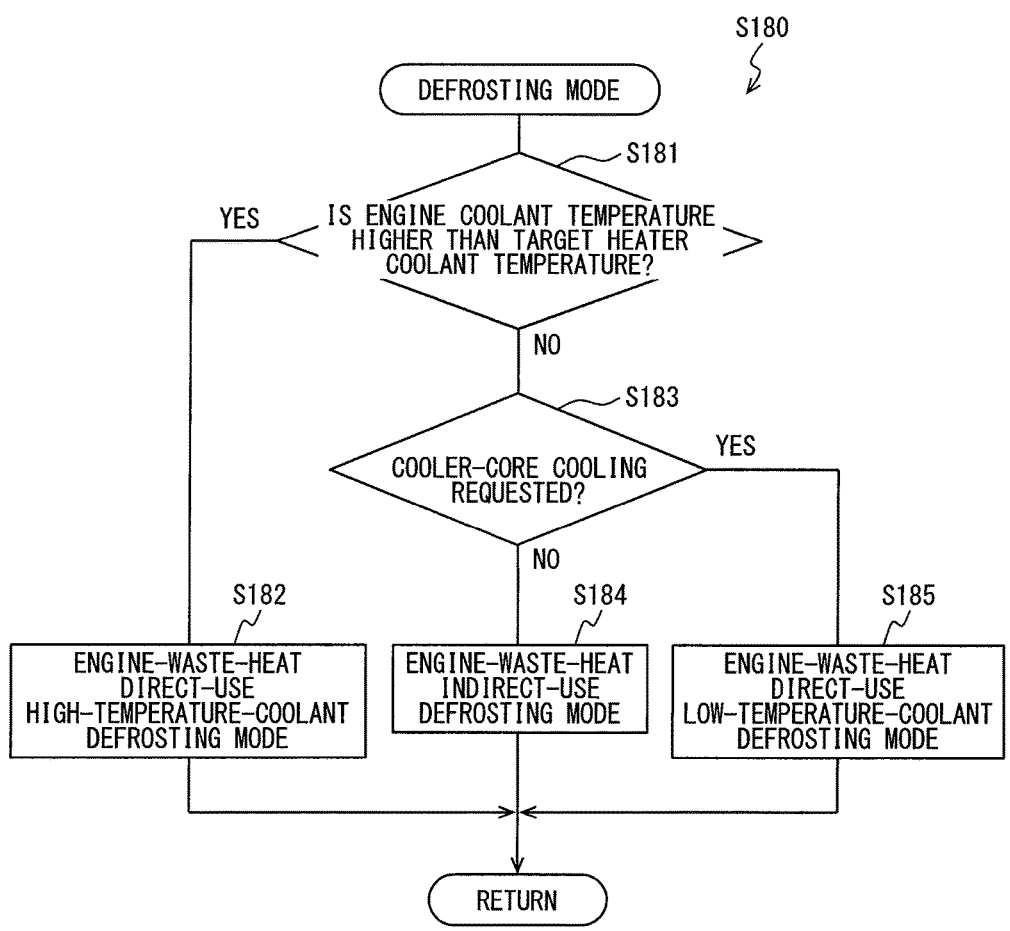
FIG. 21 is a flowchart showing the control processing in a defrosting mode of the first embodiment.

FIG. 21 is a flowchart showing control processing in the defrosting mode at step S180.

When ensuring a heat source for air-heating by the heat absorbed from the outside air, frost is formed on the radiator 13, thus reducing the volume of outside air flowing through the radiator 13. As a result, the heat exchange performance of the radiator 13 is degraded. For this reason, when executing the above-mentioned outside-air heat-absorption heat pump dehumidification air-heating mode and the outside-air heat-absorption heat pump air-heating mode, the defrosting operation needs to be performed on a regular basis to remove the frost from the radiator 13.

Thus, when the defrosting request is made, the controller 70 performs the following control to execute the defrosting operation depending on the situation.

In step S181, it is determined whether or not a coolant temperature Twe (engine coolant temperature) of the engine cooling circuit 60 is higher than a target coolant temperature Twho (target heater coolant temperature) of the heater core 17. When the coolant temperature Twe of the engine cooling circuit 60 is determined to be higher than the target coolant temperature Twho of the heater core 17, the operation proceeds to step S182, in which an engine-waste-heat direct-use high-temperature-coolant defrosting mode is executed.

The engine-waste-heat direct-use high-temperature-coolant defrosting mode is a mode in which the high-temperature coolant created by being heated with waste heat from the engine 61 is guided to the radiator 13 to defrost.

When the coolant temperature Twe of the engine cooling circuit 60 is determined to be lower than the target coolant temperature Twho of the heater core 17 in step S181, the operation proceeds to step S183. In step S183, it is determined whether or not there is a request (cooler-core cooling request) for the cooler core 16 to cool the ventilation air into the vehicle interior. For example, when the air conditioner switch installed on the operation panel 88 is turned on by the occupant's operation, the cooler-core cooling request is determined to be made.

When the cooler-core cooling request is determined not to be made, the operation proceeds to step S184, in which the engine-waste-heat indirect-use defrosting mode is executed.

The engine-waste-heat indirect-use defrosting mode is a mode in which the high-temperature coolant created by pumping up the waste heat from the engine 61 by the refrigeration cycle 31 is guided to the radiator 13 to defrost.

When the cooler-core cooling request is determined to be made in step S183, the operation proceeds to step S185, in which the engine-waste-heat direct-use low-temperature-coolant defrosting mode is executed.

The engine-waste-heat direct-use low-temperature-coolant defrosting mode is a mode in which the low-temperature coolant created by being heated with waste heat from the engine 61 is guided to the radiator 13 to defrost.

Figure 22:
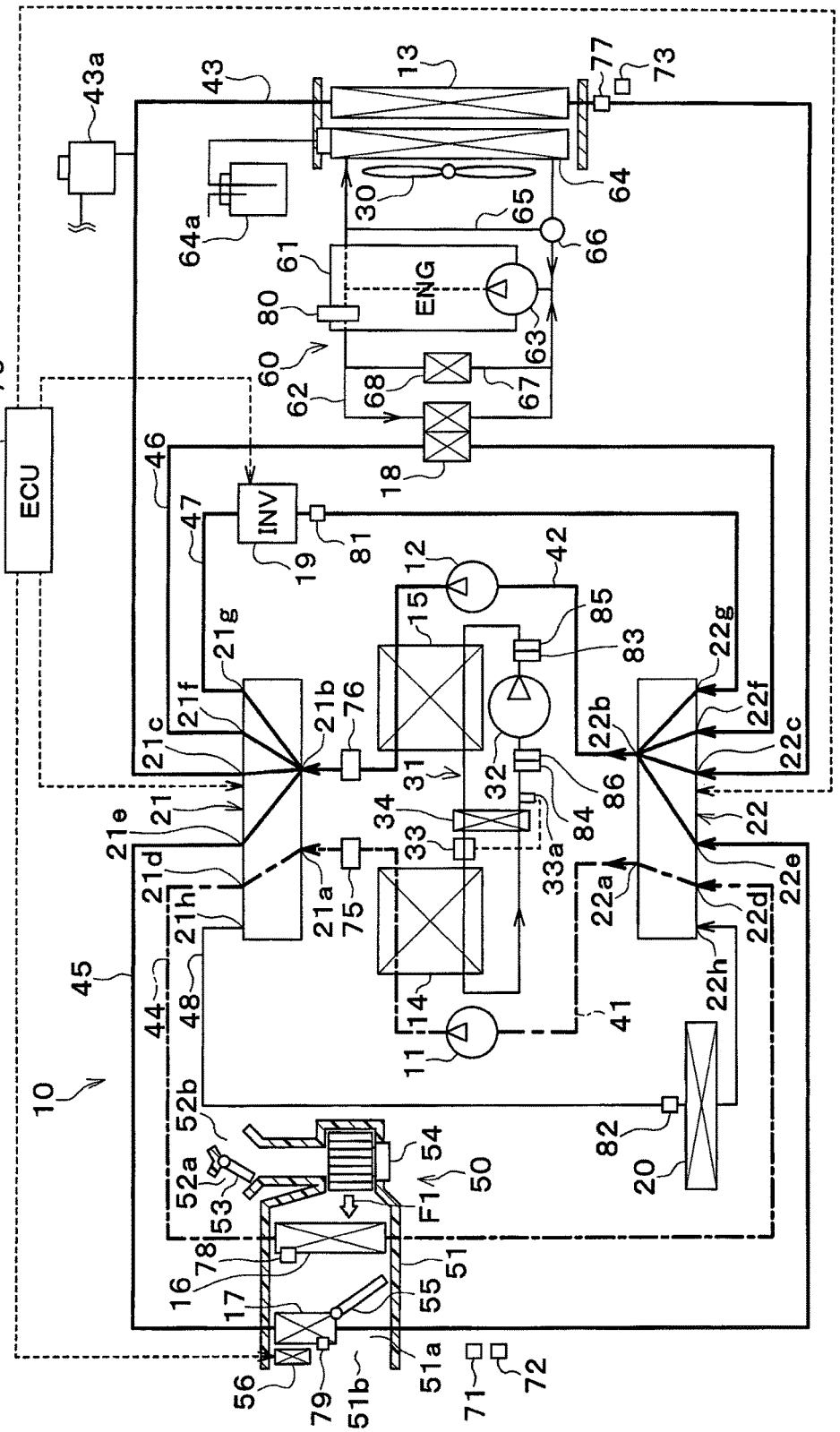
FIG. 22 is a diagram showing the flow of the coolant in an engine-waste-heat direct-use high-temperature-coolant defrosting mode of the first embodiment.

FIG. 22 shows the flow of the coolant in an engine-waste-heat direct-use high-temperature-coolant defrosting mode at step S182. In the engine-waste-heat direct-use high-temperature-coolant defrosting mode, the controller 70 controls the operations of the first switching valve 21 and the second switching valve 22 such that the coolant cooler 14 and the cooler core 16 are connected together to form a low-temperature side coolant circuit, while the coolant heater 15, the radiator 13, the heater core 17, the coolant-to-coolant heat exchanger 18, and the inverter 19 are connected together to form the high-temperature side coolant circuit.

In the low-temperature side coolant circuit, as indicated by a thick alternate long and short dash line of FIG. 22, the coolant cooled by the coolant cooler 14 is allowed to flow through the cooler core 16, whereby the ventilation air into the vehicle interior is dehumidified (cooled) by the cooler core 16. In the high-temperature side coolant circuit, as indicated by a thick solid line of FIG. 22, the coolant heated by the coolant-to-coolant heat exchanger 18 is allowed to flow through the heater core 17 and the radiator 13, whereby the ventilation air into the vehicle interior is heated by the heater core 17, melting the frost attached to the radiator 13, thereby performing the defrosting.

Thus, in the engine-waste-heat direct-use high-temperature-coolant defrosting mode, the controller 70 performs the following control for the low-temperature side coolant circuit, the refrigeration cycle 31, and the high-temperature side coolant circuit.

In the low-temperature side coolant circuit, the request made immediately before switching to the defrosting mode is maintained. Specifically, when there is a cooling request for the cooler core 16, the flow rate of the coolant that can transfer the necessary amount of heat is calculated based on a cooling capacity required for the cooler core 16, and a coolant discharge capacity (the number of revolutions) of the first pump 11 is controlled to attain the calculated flow rate of the coolant. When there is no cooling request for the cooler core 16, the first pump 11 is brought into the stopped state.

In the refrigeration cycle 31, the request made immediately before switching to the defrosting mode is maintained. Specifically, when there is a cooling request for the cooler core 16, the refrigerant discharge capacity (the number of revolutions) of the compressor 32 is controlled such that the temperature of the coolant flowing through the cooler core 16 becomes the target temperature, thereby adjusting the temperature of the coolant cooled by the coolant cooler 14.

Specifically, in the high-temperature side coolant circuit, the valve opening degrees on the coolant-to-coolant heat exchanger 18 side of the first and second switching valves 21 and 22 are controlled to adjust the flow rate of the coolant flowing through the coolant-to-coolant heat exchanger 18. Thus, the amount of heat given from the engine 61 is adjusted to thereby adjust the coolant temperature in the high-temperature side coolant circuit.

Figure 23:
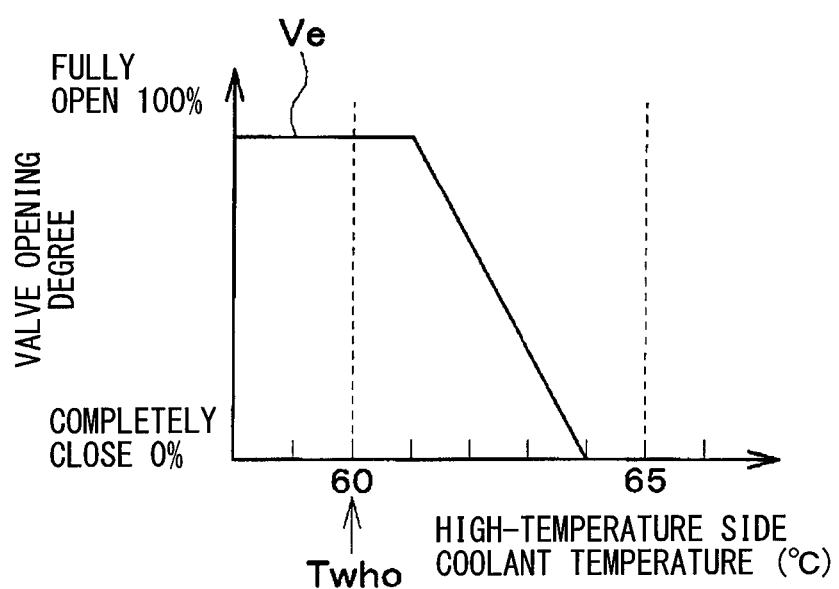
FIG. 23 is a control characteristic diagram of the first switching valve and the second switching valve in the engine-waste-heat direct-use high-temperature-coolant defrosting mode of the first embodiment.

FIG. 23 shows a control characteristic diagram of the first switching valve 21 and the second switching valve 22 in the engine-waste-heat direct-use high-temperature-coolant defrosting mode. In FIG. 23, the solid line Ve indicates the valve opening degrees on the coolant-to-coolant heat exchanger 18 side of the first and second switching valves 21 and 22.

In general, the coolant temperature in the engine cooling circuit 60 is sometimes equal to or higher than 100° C. If all waste heat from the engine 61 is transferred to the coolant in the high-temperature side coolant circuit, the coolant temperature could exceed the heat-resistant temperature of the devices, including the inverter 19.

For this reason, a difference between the target coolant temperature Twho of the heater core 17 and the coolant temperature (high-temperature side coolant temperature) in the high-temperature side coolant circuit is calculated, thereby adjusting the valve opening degrees on the coolant-to-coolant heat exchanger 18 side of the first and second switching valves 21 and 22. Thus, the flow rate of the coolant in the coolant-to-coolant heat exchanger 18 is adjusted to maintain the coolant temperature at the target coolant temperature Twho of the heater core 17 or higher, and at the heat-resistant temperature of the heat-generating device such as the inverter 19 or lower (e.g., not less than 60° C. nor more than 65° C.).

Figure 24:
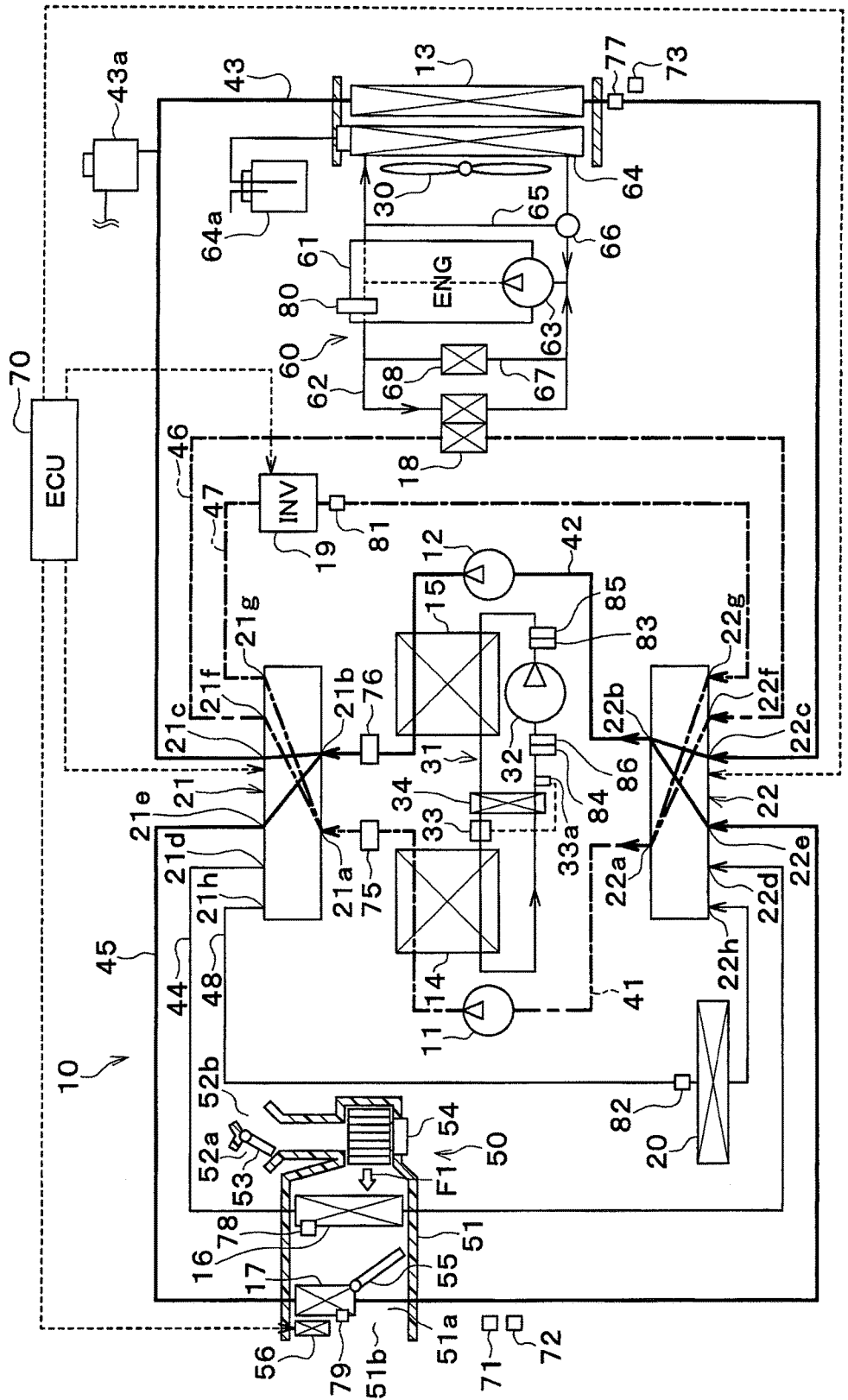
FIG. 24 is a diagram showing the flow of the coolant in the engine-waste-heat indirect-use defrosting mode of the first embodiment.

FIG. 24 shows the flow of the coolant in the engine-waste-heat indirect-use defrosting mode at step S184. In the engine-waste-heat indirect-use defrosting mode, the controller 70 controls the operations of the first switching valve 21 and the second switching valve 22 such that the coolant cooler 14, the coolant-to-coolant heat exchanger 18, and the inverter 19 are connected together to form a low-temperature side coolant circuit, while the coolant heater 15, the radiator 13, and the heater core 17 are connected together to form the high-temperature side coolant circuit.

In the low-temperature side coolant circuit, as indicated by a thick alternate long and short dash line of FIG. 24, the coolant cooled by the coolant cooler 14 is allowed to flow through the coolant-to-coolant heat exchanger 18, whereby the coolant absorbs heat from the engine coolant at the coolant-to-coolant heat exchanger 18. In the high-temperature side coolant circuit, as indicated by a thick solid line of FIG. 24, the coolant heated by the coolant heater 15 is allowed to flow through the heater core 17 and the radiator 13, whereby the ventilation air into the vehicle interior is heated by the heater core 17, melting the frost attached to the radiator 13, thereby performing the defrosting.

That is, in the engine-waste-heat indirect-use defrosting mode, the refrigerant in the refrigeration cycle 31 absorbs waste heat from the engine 61 via the engine coolant and the coolant at the coolant cooler 14, thereby dissipating heat into the coolant at the coolant heater 15. Therefore, a heat-pump operation for pumping up the waste heat from the engine 61 can be achieved.

The engine-waste-heat indirect-use defrosting mode is performed when the temperature of the engine coolant is not so high even though waste heat from the engine 61 is present. In this case, if the coolant-to-coolant heat exchanger 18 is disposed in the high-temperature side coolant circuit, the coolant temperature in the high-temperature side coolant circuit might be decreased. Thus, the coolant-to-coolant heat exchanger 18 cannot be disposed in the high-temperature side coolant circuit.

For this reason, the coolant-to-coolant heat exchanger 18 is disposed in the low-temperature side coolant circuit, whereby the high-temperature coolant required for defrosting is created by the heat pump operation of the refrigeration cycle 31, thereby defrosting the radiator 13 in a short time.

In the engine-waste-heat indirect-use defrosting mode, the controller 70 performs the following control for the low-temperature side coolant circuit, the refrigeration cycle 31, and the high-temperature side coolant circuit.

In the low-temperature side coolant circuit, the coolant is allowed to circulate by the first pump 11.

In the refrigeration cycle 31, no temperature control request is made for the coolant in the low-temperature side coolant circuit, and thus the refrigerant discharge capacity (the number of revolutions) of the compressor 32 is controlled such that the coolant temperature in the high-temperature side coolant circuit becomes the target temperature. At this time, it is necessary to supply the heat in the amount required by the heater core 17 as well as the heat in the amount required for defrosting the radiator 13.

In the high-temperature side coolant circuit, the required flow rate of coolant is calculated based on the heating request for the heater core 17, and thereby the coolant discharge capacity (the number of revolutions) of the second pump 12 is controlled.

Figure 25:
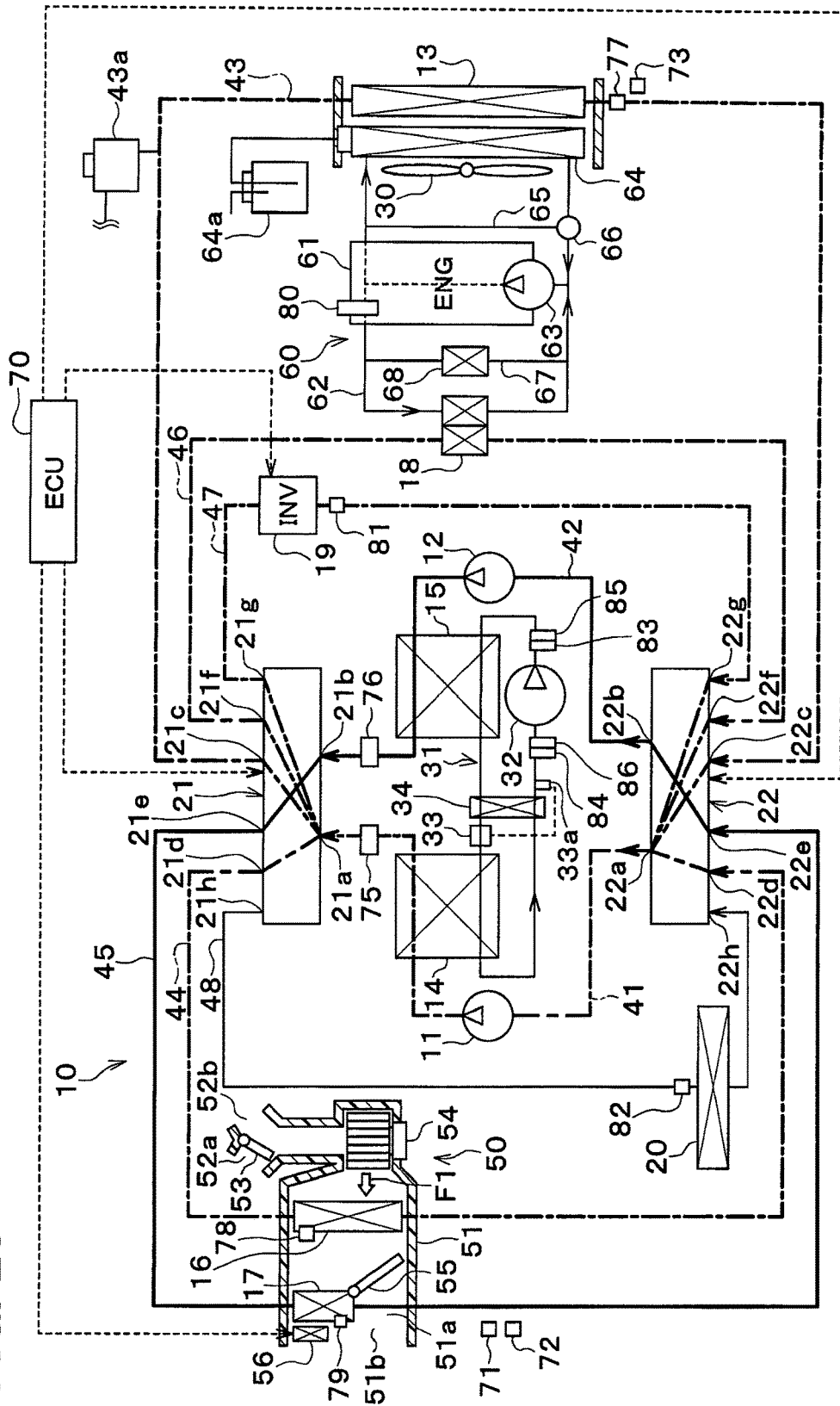
FIG. 25 is a diagram showing the flow of the coolant in an engine-waste-heat direct-use low-temperature-coolant defrosting mode of the first embodiment.

FIG. 25 shows the flow of the coolant in the engine-waste-heat direct-use low-temperature-coolant defrosting mode at step S185. In the engine-waste-heat direct-use low-temperature-coolant defrosting mode, the controller 70 controls the operations of the first switching valve 21 and the second switching valve 22 such that the coolant cooler 14, the cooler core 16, the radiator 13, the coolant-to-coolant heat exchanger 18, and the inverter 19 are connected together to form a low-temperature side coolant circuit, while the coolant heater 15 and the heater core 17 are connected together to form the high-temperature side coolant circuit.

In the low-temperature side coolant circuit, as indicated by a thick alternate long and short dash line of FIG. 25, the coolant cooled by the coolant cooler 14 is allowed to flow through the cooler core 16 and the coolant-to-coolant heat exchanger 18, whereby the ventilation air into the vehicle interior is dehumidified (cooled) by the cooler core 16, and the coolant absorbs heat from the engine coolant at the coolant-to-coolant heat exchanger 18.

Further, the coolant in the low-temperature side coolant circuit flows through the radiator 13, thus melting the frost attached on the radiator 13 slowly to defrost.

In the high-temperature side coolant circuit, as indicated by a thick solid line of FIG. 25, the coolant heated by the coolant heater 15 is allowed to flow through the heater core 17, thereby heating the ventilation air into the vehicle interior by the heater core 17.

The engine-waste-heat direct-use low-temperature-coolant defrosting mode is performed when the temperature of the engine coolant is not so high even though waste heat from the engine 61 is present. In this case, if the coolant-to-coolant heat exchanger 18 is disposed in the high-temperature side coolant circuit, the coolant temperature in the high-temperature side coolant circuit might be decreased. Thus, the coolant-to-coolant heat exchanger 18 cannot be disposed in the high-temperature side coolant circuit. The engine-waste-heat direct-use low-temperature-coolant defrosting mode is executed when there is a cooling request for the cooler core 16. In this case, the coolant temperature in the low-temperature side coolant circuit needs to be maintained at 0 to 10° C. In the engine-waste-heat direct-use low-temperature-coolant defrosting mode, the radiator 13 is slowly defrosted with the low-temperature coolant (at a temperature of 0 to 10° C.) in the low-temperature side coolant circuit.

Thus, in the outside-air heat-absorption heat pump dehumidification air-heating mode, the controller 70 performs the following control for each of the low-temperature side coolant circuit, the refrigeration cycle 31, and the high-temperature side coolant circuit.

In the low-temperature side coolant circuit, the valve opening degrees on the coolant-to-coolant heat exchanger 18 side of the first and second switching valves 21 and 22 are controlled such that the coolant temperature becomes the temperature requested for the cooler core 16 (ranging from 0 to 10° C.).

Figure 26:
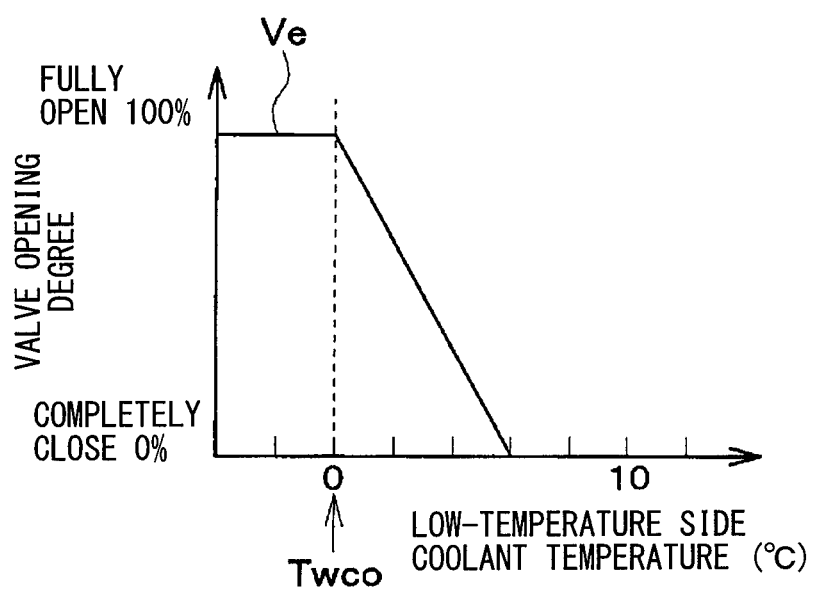
FIG. 26 is a control characteristic diagram of the first switching valve and the second switching valve in the engine-waste-heat direct-use low-temperature-coolant defrosting mode of the first embodiment.

FIG. 26 shows a control characteristic diagram of the first switching valve 21 and the second switching valve 22 in the engine-waste-heat direct-use low-temperature-coolant defrosting mode. In FIG. 26, the solid line Ve indicates the valve opening degrees on the coolant-to-coolant heat exchanger 18 side of the first and second switching valves 21 and 22.

In the engine-waste-heat direct-use low-temperature-coolant defrosting mode, the ventilation air into the vehicle interior needs to be dehumidified, which requires the cooler core 16 to maintain its target temperature. Thus, when the coolant temperature in the low-temperature side coolant circuit (low-temperature side coolant temperature) is equal to or less than the target temperature Twco of the cooler core 16, the valves on the coolant-to-coolant heat exchanger 18 side of the first and second switching valves 21 and 22 are opened to allow the coolant to flow through the coolant-to-coolant heat exchanger 18. Thus, the heat is absorbed from the engine cooling circuit 60. On the other hand, when the coolant temperature in the low-temperature side coolant circuit (low-temperature side coolant temperature) is equal to or more than the target temperature Twco of the cooler core 16, the valve opening degrees on the coolant-to-coolant heat exchanger 18 side of the first and second switching valves 21 and 22 are decreased to reduce the flow rate of the coolant flowing through the coolant-to-coolant heat exchanger 18. Thus, the amount of heat absorbed from the engine cooling circuit 60 is lessened.

In the refrigeration cycle 31, the temperature of the coolant heated by the coolant heater 15 is adjusted such that the temperature of the coolant flowing through the heater core 17 becomes the target temperature. Specifically, the refrigerant discharge capacity (the number of revolutions) of the compressor 32 is controlled. The temperature of the coolant flowing through the heater core 17 can be estimated from the surface temperature of the heater core detected by the heater-core temperature sensor 79.

In the high-temperature side coolant circuit, the required flow rate of coolant is calculated based on the heating request for the heater core 17, and thereby the coolant discharge capacity (the number of revolutions) of the second pump 12 is controlled.

Next, a description will be given of the control of the battery-temperature-adjustment heat exchanger 20 performed by the controller 70 in the above-mentioned respective operation modes.

In the temperature adjustment of the battery, the temperature of the battery itself and variations in the temperature within a battery pack need to be managed.

The battery worsens its input and output characteristics at a low temperature and degrades in quality at an excessively high temperature. To prevent these drawbacks, the battery should be controlled to limit its input and output. In general, the battery should be managed at a temperature of 0° C. to 40° C.

When the non-uniform temperature distribution is caused within a plurality of cells in a battery pack, the uneven current flow occurs to accelerate the degradation of a part where a large amount of current flows. In general, variations in temperature of the battery pack should be suppressed to 5 to 10° C. or lower.

Figure 27:
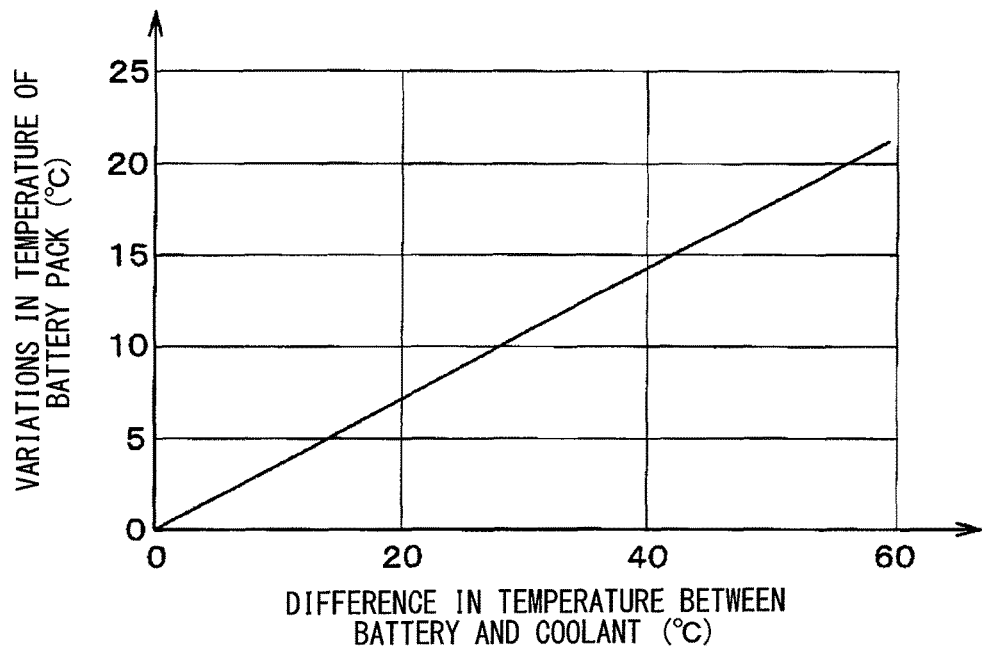
FIG. 27 is a graph showing the relationship between variations in temperature inside a battery pack and differences in temperature between a battery and the coolant in the first embodiment.

As mentioned above, by comparison, the battery differs from other temperature-adjustment target devices in the way of the temperature management. When the low-temperature or high-temperature coolant created by the refrigeration cycle 31 is allowed to directly flow through the battery-temperature-adjustment heat exchanger 20, the battery can deviate from its management temperature range for the battery, or the non-uniformity of the temperature distribution of the battery pack can be increased due to a drastic change in temperature, thereby accelerating the degradation in the battery. That is, as shown in FIG. 27, variations in temperature within the battery pack becomes larger in proportion to the difference in temperature between the battery and the coolant.

Figure 28:
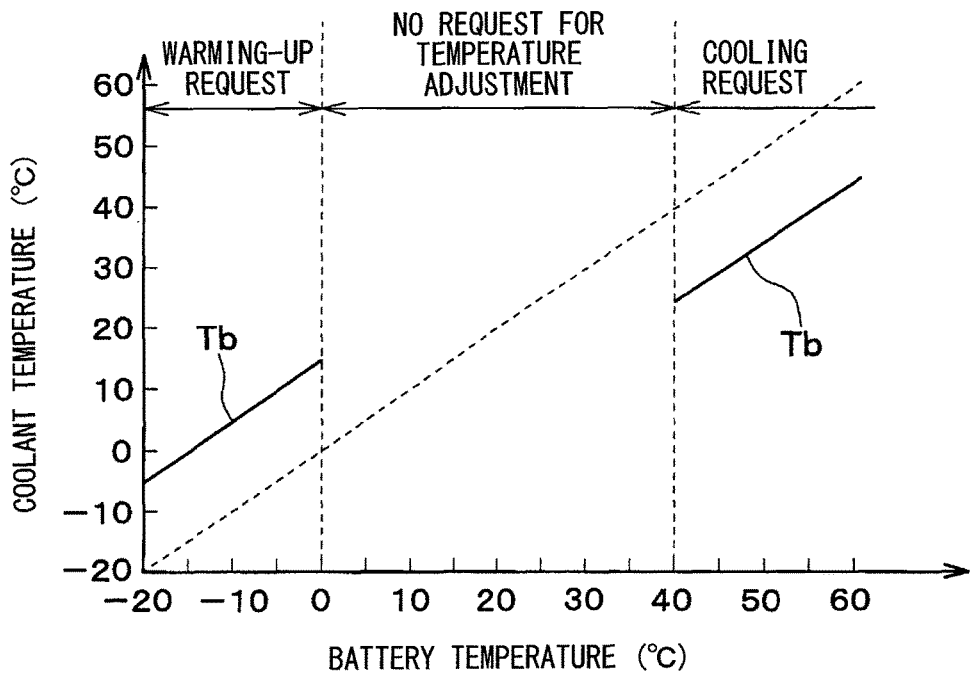
FIG. 28 is a graph showing the relationship between the temperature of the battery and the temperature of the coolant flowing into a battery-temperature-adjustment heat exchanger in the first embodiment.

As shown in FIG. 28, the operations of the first and second switching valves 21 and 22 are controlled based on the battery-temperature-adjustment request and the result of measurement of the battery temperature at that time such that the coolant at the optimal temperature flows through the battery-temperature-adjustment heat exchanger 20. In FIG. 28, the solid line Tb indicates the temperature of the coolant flowing into the battery-temperature-adjustment heat exchanger 20.

That is, when a battery cooling request is made, the valve opening degrees on the battery-temperature-adjustment heat exchanger 20 side of the first and second switching valves 21 and 22 are controlled such that the coolant at a lower temperature by about 10 to 20° C. than the battery temperature flows through the battery-temperature-adjustment heat exchanger 20. Thus, the coolant in the low-temperature coolant circuit and the coolant in the high-temperature coolant circuit are mixed together and allowed to flow into the battery-temperature-adjustment heat exchanger 20.

That is, when a battery-warming-up request is made, the valve opening degrees on the battery-temperature-adjustment heat exchanger 20 side of the first and second switching valves 21 and 22 are controlled such that the coolant at a higher temperature by about 10 to 20° C. than the battery temperature flows through the battery-temperature-adjustment heat exchanger 20. Thus, the coolant in the low-temperature coolant circuit and the coolant in the high-temperature coolant circuit are mixed together and allowed to flow into the battery-temperature-adjustment heat exchanger 20.

When there is no battery-temperature-adjustment request, the valves on the battery-temperature-adjustment heat exchanger 20 side of the first and second switching valves 21 and 22 are closed to thereby stop the supply of the coolant to the battery-temperature-adjustment heat exchanger 20.

In this embodiment, the controller 70 controls at least one of the circulation state of the coolant, the operation of the compressor 32, the flow rate of the coolant in the radiator 13, and the flow rate of the coolant in the coolant-to-coolant heat exchanger 18 based on the presence or absence of the cooling request to cool the ventilation air at the cooler core 16 and the presence or absence of the heating request to heat the ventilation air at the heater core 17.

Thus, the vehicle thermal management system 10 can be appropriately controlled in response to the cooling request for the cooler core 16 as well as the heating request for the heater core 17.

In this embodiment, when there is the cooling request for the cooler core 16, the controller 70 controls at least one of the circulation state of the coolant, the operation of the compressor 32, the flow rate of the coolant in the radiator 13, and the flow rate of the coolant in the coolant-to-coolant heat exchanger 18 such that the temperature of the coolant flowing to the cooler core 16 is within the cooling temperature range.

Thus, when there is the cooling request for the cooler core 16, the ventilation air can be appropriately cooled and dehumidified by the cooler core 16.

In this embodiment, when there is the heating request for the heater core 17, the controller 70 controls at least one of the circulation state of the coolant, the operation of the compressor 32, the flow rate of the coolant in the radiator 13, and the flow rate of the coolant in the coolant-to-coolant heat exchanger 18 such that the temperature of the coolant flowing to the heater core 17 is within the heating temperature range.

Thus, when there is the heating request for the heater core 17, the ventilation air can be appropriately heated by the heater core 17.

In this embodiment, the controller 70 controls at least one of the circulation state of the coolant, the operation of the compressor 32, the flow rate of the coolant in the radiator 13, and the flow rate of the coolant in the coolant-to-coolant heat exchanger 18 based on at least one of the engine coolant temperature, the temperature of the coolant flowing to the cooler core 16, and the temperature of the coolant flowing to the heater core 17.

Thus, the vehicle thermal management system 10 can be appropriately controlled in response to the cooling request for the cooler core 16 as well as the heating request for the heater core 17.

In this embodiment, when there is the heating request for the cooler core 16, and the engine coolant temperature Twe is higher than the target temperature Twho of the coolant flowing to the heater core 17, the controller 70 controls the operations of the first switching valve 21 and the second switching valve 22 to allow the coolant to circulate between the heater core 17 and the coolant-to-coolant heat exchanger 18.

Thus, the coolant heated with the waste heat from the engine 61 is guided directly to the heater core 17, so that the ventilation air can be heated by the heater core 17 (in the engine-waste-heat direct-use dehumidification air-heating mode, and the engine-waste-heat direct-use air-heating mode).

In this embodiment, when there is the heating request for the heater core 17, the engine coolant temperature Twe is lower than the target temperature Twho of the coolant flowing to the heater core 17, and the temperature Twm of the coolant flowing to the heater core 17 is higher than its target temperature Twho, the controller 70 controls the operations of the first switching valve 21 and the second switching valve 22 to allow the coolant to circulate between the heater core 17 and the heat-generating device, such as the inverter 19.

Thus, the coolant heated by the heat-generating device, such as the inverter 19, is guided directly to the heater core 17, so that the ventilation air can be heated by the heater core 17 (in the device-waste-heat direct-use dehumidification air-heating mode, and the device-waste-heat direct-use air-heating mode).

In this embodiment, the controller 70 controls the operations of the first and second switching valves 21 and 22 such that the coolant circulates between the coolant-cooling heat exchanger 14 and the coolant-to-coolant heat exchanger 18 when there is the heating request for the heater core 17, the engine coolant temperature Twe is lower than the target temperature Twho of the coolant flowing to the heater core 17, the temperature Twm of the coolant flowing to the heater core 17 is lower than its target temperature Twho, and the engine coolant temperature Twe is higher than its target temperature Tweo.

Thus, the waste heat from the engine 61 is pumped up by the heat pump operation of the refrigeration cycle 31 to enable heating of the ventilation air by the heater core 17 (in the engine-heat-absorption heat pump dehumidification air-heating mode, and the engine heat-absorption heat pump air-heating mode).

In this embodiment, the controller 70 controls the operations of the first and second switching valves 21 and 22 such that the coolant circulates between the coolant-cooling heat exchanger 14 and the radiator 13 when there is the heating request for the heater core 17, the engine coolant temperature Twe is lower than the target temperature Twho of the coolant flowing to the heater core 17, the temperature Twm of the coolant flowing to the heater core 17 is lower than its target temperature Twho, and the engine coolant temperature Twe is lower than its target temperature Tweo.

Thus, the heat of the outside air is pumped up by the heat pump operation of the refrigeration cycle 31 to enable heating of the ventilation air by the heater core 17 (in the outside-air heat-absorption heat pump dehumidification air-heating mode, and the outside-air heat-absorption heat pump air-heating mode).

In this embodiment, the controller 70 controls at least one of the flow rate of the coolant in the radiator 13 and the flow rate of the coolant in the coolant-to-coolant heat exchanger 18 such that the temperature Twm of the coolant flowing to the heater core 17 does not exceed the heat-resistant temperature of the heat-generating device, such as the inverter 19.

Thus, the heat-generating device, such as the inverter 19, can be prevented from being broken due to the excessive heated with the coolant.

In this embodiment, the controller 70 controls at least one of the circulation state of the coolant, the operation of the compressor 32, the flow rate of the coolant in the radiator 13, and the flow rate of the coolant in the coolant-to-coolant heat exchanger 18 based on the engine coolant temperature Twe and the presence or absence of the cooling request for the cooler core 16 when the defrosting of the radiator 13 is required.

Thus, when the defrosting of the radiator 13 is required, the vehicle thermal management system 10 can be appropriately controlled based on the engine coolant temperature and the presence or absence of the cooling request for the cooler core 16.

In this embodiment, when the engine coolant temperature Twe is higher than the target temperature Twho of the coolant flowing to the heater core 17, the controller 70 controls the operations of the first switching valve 21 and the second switching valve 22 to allow the coolant to circulate between the radiator 13 and the coolant-to-coolant heat exchanger 18.

Thus, the coolant heated with the waste heat from the engine 61 is guided directly to the radiator 13, thereby enabling the defrosting of the radiator 13 (in the engine-waste-heat direct-use high-temperature-coolant defrosting mode).

In this embodiment, when the engine coolant temperature Twe is lower than the target temperature Twho of the coolant flowing to the heater core 17, and there is no cooling request for the cooler core 16, the controller 70 controls the operations of the first switching valve 21 and the second switching valve 22 to allow the coolant to circulate between the coolant-cooling heat exchanger 14 and the coolant-to-coolant heat exchanger 18 and to allow the coolant to circulate between the coolant-heating heat exchanger 15 and the radiator 13.

Thus, the waste heat from the engine 61 is pumped up by the heat pump operation of the refrigeration cycle 31, thereby enabling the defrosting of the radiator 13 (in the engine-waste-heat indirect-use defrosting mode).

In this embodiment, when the engine coolant temperature Twe is lower than the target temperature Twho of the coolant flowing to the heater core 17, and there is a cooling request for the cooler core 16, the controller 70 controls the operations of the first switching valve 21 and the second switching valve 22 to allow the coolant to circulate among the coolant-cooling heat exchanger 14, the radiator 13, and the coolant-to-coolant heat exchanger 18.

Thus, the coolant heated with the waste heat from the engine 61 is guided directly to the radiator 13, thereby enabling the cooling and dehumidification of the ventilation air by the cooler core 16 as well as the defrosting of the radiator 13 (in the engine-waste-heat direct-use low-temperature-coolant defrosting mode).

In this embodiment, the controller 70 uses the first and second switching valves 21 and 22 to adjust the ratio of the flow rate of the coolant cooled by the coolant-cooling heat exchanger 14 to that heated by the coolant-heating heat exchanger 15 in the coolant flowing through the battery-temperature-adjustment heat exchanger 20 such that a difference in temperature between the coolant flowing through the battery-temperature-adjustment heat exchanger 20 and the battery is equal to or less than a predetermined value.

This embodiment can appropriately adjust the temperature of the battery to suppress the degradation in the battery.

Second Embodiment

Figure 29:
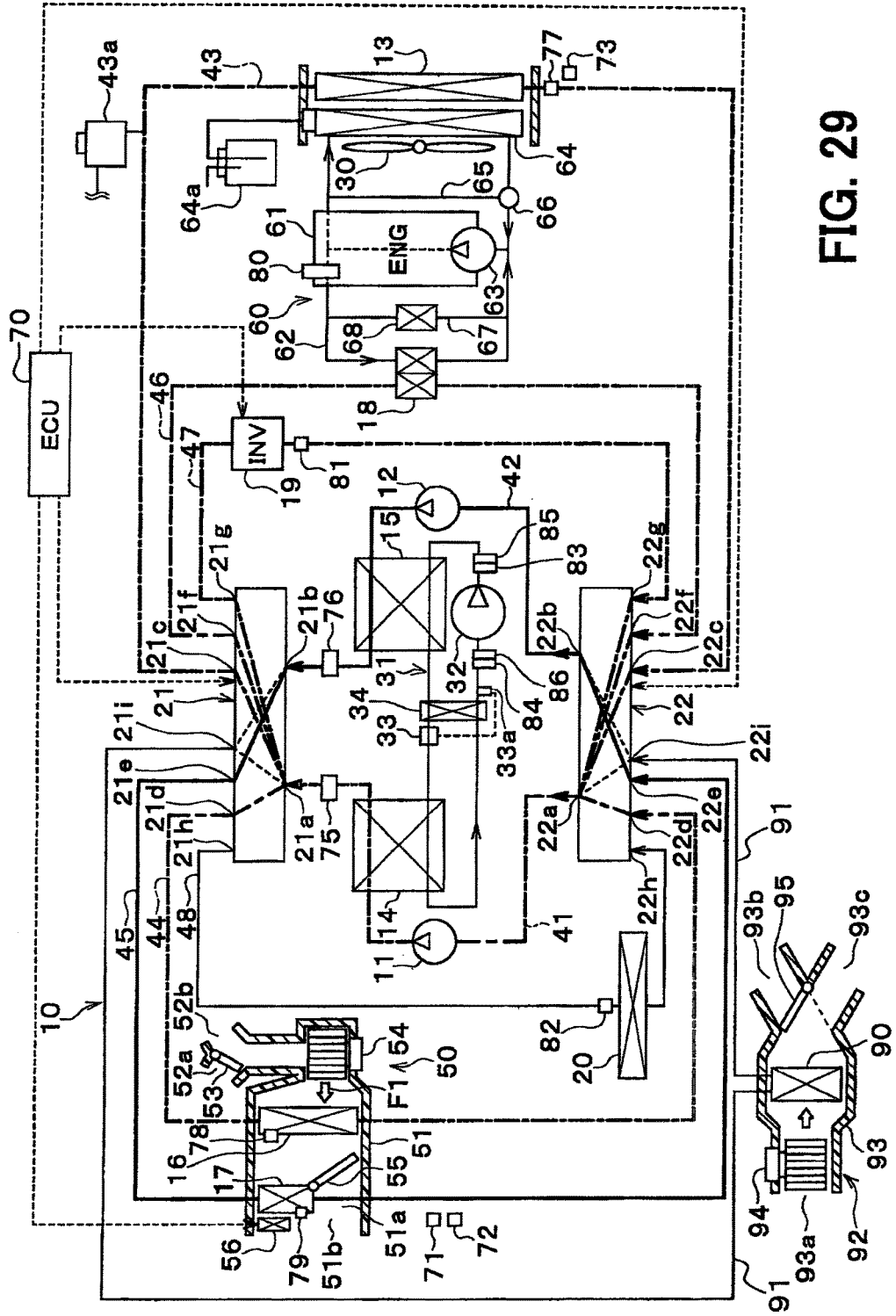
FIG. 29 is an entire configuration diagram of a vehicle thermal management system according to a second embodiment.

As shown in FIG. 29, in this embodiment, a rear-seat air-conditioning heat exchanger 90 is added to the structure of the first embodiment. The rear-seat air-conditioning heat exchanger 90 is a rear-seat heat-medium air heat exchanger that exchanges heat between the coolant having its temperature adjusted by the coolant cooler 14 and the coolant heater 15 and the ventilation air blown toward the occupant on the rear seat, thereby adjusting the temperature of the ventilation air.

The rear-seat air-conditioning heat exchanger 90 is disposed in a rear-seat air-conditioning coolant flow path 91. One end of the rear-seat air-conditioning coolant flow path 91 is connected to a seventh outlet 21i of the first switching valve 21. The other end of the rear-seat air-conditioning coolant flow path 91 is connected to a seventh inlet 22i of the second switching valve 22.

The first switching valve 21 switches among a state in which the coolant discharged from the first pump 11 flows, a state in which the coolant discharged from the second pump 12 flows, and a state in which the coolants discharged from the first pump 11 and the second pump 12 do not flow, with respect to the rear-seat air-conditioning coolant flow path 91.

The second switching valve 22 switches among a state in which the coolant flows to the first pump 11, a state in which the coolant flows out to the second pump 12, and a state in which the coolant flows to neither the first pump 11 nor the second pump 12, with respect to the rear-seat air-conditioning coolant flow path 91.

The first switching valve 21 and the second switching valve 22 can be configured to adjust the flow rate of the coolant flowing through the rear-seat air-conditioning coolant flow path 91.

The first and second switching valves 21 and 22 can mix the coolant discharged from the first pump 11 and the coolant discharged from the second pump 12 at any flow-rate ratio and enables the mixture to flow into the rear-seat air-conditioning coolant flow path 91.

That is, the first and second switching valves 21 and 22 are rear-seat flow-rate ratio adjustment portions that adjust the flow-rate ratio of the coolant cooled by the coolant cooler 14 to that heated by the coolant heater 15 in the coolant flowing through the rear-seat air-conditioning heat exchanger 90.

The rear-seat air-conditioning heat exchanger 90 is accommodated in a casing 93 of a rear-seat interior air-conditioning unit 92 in the vehicle air conditioner. The rear-seat interior air-conditioning unit 92 is an auxiliary air conditioner that reinforces the function of the interior air-conditioning unit 50. In order to improve the comfort to the occupant on the rear seat in the vehicle interior, the rear-seat interior air-conditioning unit 92 serves to uniformize the temperature across the entire vehicle interior and to set the vehicle interior temperature based on the request from the occupant on the rear seat. Note that the rear-seat interior air-conditioning unit 92 does not need a dehumidification air-heating function for prevention of the window fogging.

The casing 93 forms an air passage for the ventilation air to be blown into the vehicle interior. The casing 93 is formed of resin (for example, polypropylene) with some elasticity and excellent strength. An inside air suction port 93a is formed on the most upstream side of the air flow in the casing 93 to introduce the inside air into the casing 93.

An interior blower (blower) 94 is disposed on the downstream side of the air flow with respect to the inside air suction port 93a. An interior blower 94 is a blower that blows the inside air drawn from the inside air suction port 93a, into the vehicle interior. The interior blower 94 is an electric blower that includes a centrifugal multiblade fan (sirocco fan) to be driven by an electric motor.

The rear-seat air-conditioning heat exchanger 90 is disposed on the downstream side of the air flow of the interior blower 94 in the casing 93. Air outlets for blowing the ventilation air into the vehicle interior as a space to be air-conditioned are disposed at the most downstream part of the air flow of the casing 93. A rear face air outlet 93b and a rear foot air outlet 93c are provided as the air outlets.

The rear face air outlet 93b is to blow out the conditioned air toward the upper half body of the occupant on the rear seat in the vehicle interior. The rear foot air outlet 93c is to blow out the conditioned air toward the foot of the occupant on the rear seat in the vehicle interior.

An air-outlet mode door 95 is disposed on the air-flow upstream side of the air outlets 93b and 93c. The air-outlet mode door 95 serves as an air-outlet mode switch for switching the air outlet mode. The air-outlet mode door is driven by the electric actuator (not shown).

The air outlet modes switched by the air-outlet mode door 95 include, for example, a rear face mode, a rear bi-level mode, and a rear foot mode.

The rear face mode is an air outlet mode in which the rear foot air outlet 93c is fully opened to blow the air from the rear foot air outlet 93c toward the upper body of the occupant on the rear seat in the vehicle compartment. The rear bi-level mode is an air outlet mode in which both the rear face air outlet 93b and the rear foot air outlet 93c are opened to blow air toward the upper body and feet of the occupant on the rear seat in the vehicle compartment.

The rear foot mode is an air outlet mode in which the rear foot air outlet 93c is fully opened to blow the air toward the feet of the occupant on the rear seat in the vehicle compartment.

The controller 70 controls the operations of the first switching valve 21 and the second switching valve 22 in such a manner as to adjust the temperature of the coolant flowing through the rear-seat air-conditioning heat exchanger 90 in response to the air-conditioning request from the occupant.

Specially, when there is the air-cooling request, the low-temperature coolant in the low-temperature coolant circuit is allowed to flow through the rear-seat air-conditioning heat exchanger 90. Thus, the ventilation air cooled by the rear-seat air-conditioning heat exchanger 90 is blown out toward the occupant on the rear seat.

When there is the air-heating request, the high-temperature coolant in the high-temperature coolant circuit is allowed to flow through the rear-seat air-conditioning heat exchanger 90. Thus, the ventilation air heated by the rear-seat air-conditioning heat exchanger 90 is blown out toward the occupant on the rear seat.

The low-temperature coolant in the low-temperature coolant circuit and the high-temperature coolant in the high-temperature coolant circuit may be mixed together and allowed to flow into the rear-seat air-conditioning heat exchanger 90.

In this embodiment, the first switching valve 21 and the second switching valve 22 adjust the flow-rate ratio of the coolant cooled by the coolant cooler 14 to that heated by the coolant heater 15 in the coolant flowing through the rear-seat air-conditioning heat exchanger 90.

Thus, one heat exchanger 90 can create the desired blown-air temperature in accordance with both the air-cooling request and the air-heating request. This embodiment can drastically simplify the structure and can also significantly reduce the size of the body of the rear-seat interior air-conditioning unit 92, compared to the case in which a heat exchanger for air-cooling and a heat exchanger for air-heating are disposed and further an air mix door is disposed in the rear-seat interior air-conditioning unit 92.

Other Embodiments

The above-mentioned embodiments can be appropriately combined together. Further, various modifications and changes can be made to these embodiments described above, for example, as follows.

(1) Although in each of the above-mentioned embodiments, the coolant is used as the heat medium for adjusting the temperature of a temperature-adjustment target device, various kinds of mediums, such as oil, may be used as the heat medium.

Alternatively, nanofluid may be used as the heat medium. The nanofluid is a fluid containing nanoparticles having a diameter of the order of nanometer. By mixing the nanoparticles into the heat medium, the following functions and effects can be obtained, in addition to the function and effect of decreasing a freezing point, like a coolant (so-called antifreeze) using ethylene glycol.

That is, the use of the nanoparticles can exhibit the functions and effects of improving the thermal conductivity in a specific temperature range, increasing the thermal capacity of the heat medium, preventing the corrosion of a metal pipe and the degradation of a rubber pipe, and enhancing the fluidity of the heat medium at an ultralow temperature.

These functions and effects are varied depending on the configuration, shape, and blending ratio of the nanoparticles, and additive material.

Thus, the mixture of nanoparticles in the heat medium can improve its thermal conductivity, and even in a small amount of the heat medium, can exhibit the substantially same cooling efficiency as that of the coolant using ethylene glycol.

Further, such a heat medium can also improve its thermal capacity and increase a cold storage amount (cold storage heat due to its sensible heat) of the heat medium itself.

By increasing the cold storage amount, the temperature adjustment, including cooling and heating, of the device can be performed using the cold storage heat for some period of time even though the compressor 32 is not operated, which can save the power of the vehicle thermal management system.

An aspect ratio of the nanoparticle is preferably 50 or more. This is because such an aspect ratio can provide the adequate thermal conductivity. Note that the aspect ratio of the nanoparticle is a shape index indicating the ratio of the width to the height of the nanoparticle.

Nanoparticles suitable for use can include any one of Au, Ag, Cu, and C. Specifically, atoms configuring the nanoparticles can include an Au nanoparticle, an Ag nanowire, a carbon nanotube (CNT), a graphene, a graphite core-shell nanoparticle (a particle body with the above-mentioned atom surrounded by a structure, such as a carbon nanotube), an Au nanoparticle-containing CNT, and the like.

(2) In the refrigeration cycle 31 of each of the above-mentioned embodiments, fluorocarbon refrigerant is used as the refrigerant. However, the kind of refrigerant is not limited thereto, and alternatively natural refrigerant, such as carbon dioxide, a hydrocarbon refrigerant, and the like may be used.

The refrigeration cycle 31 in each of the above-mentioned embodiments constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

(3) In each of the above-mentioned embodiments, the operating efficiency of the heat-generating device, such as the inverter 19, may be changed to thereby adjust the amount of heat generated from the heat-generating device, including the inverter 19.

For example, the inverter 19 increases the amount of generated heat at a high load, such as the acceleration and deceleration or high-speed traveling. However, for example, the inverter 19 barely generates heat at a low load, such as the low-speed traveling or during stopping the vehicle. Thus, when the amount of heat generated from the heat-generating devices, such as the inverter 19, drastically changes, the coolant temperature in the low-temperature side coolant circuit or the high-temperature side coolant circuit changes, which leads to the necessity to frequently switch among the above-mentioned operation modes.

As a result, variations in the coolant temperature in the cooler core 16 or the coolant temperature in the heater core 17 might worsen the comfort of the air conditioning.

While the vehicle is traveling at a high speed, the controller 70 (inverter control unit 70h) intentionally enhances the operating efficiency of the heat-generating device, such as the inverter 19, to reduce the amount of generated heat. On the other hand, while the vehicle is traveling at a low speed or stopping, the controller 70 (inverter control unit

70h) intentionally reduces the operating efficiency of the heat-generating device, such as the inverter 19, to increase the amount of generated heat.

That is, the operating efficiency of the heat-generating device, such as the inverter 19, is adjusted based on the traveling state of the vehicle, thereby adjusting the amount of heat generated from the heat-generating devices, including the inverter 19.

Thus, the amount of heat generated from the heat-generating devices, such as the inverter 19, can approach a certain level, thereby stabilizing the thermal balance therebetween, whereby the frequency of switching the operation mode can be decreased, thereby maintaining the comfort to the occupant.

For example, suppose the vehicle was cold as it had been parked over a long period of time. Upon start-up of the vehicle, the quick response of the air-heating is required. In such a case, the operating efficiency of the heat-generating device, such as the inverter 19, is intentionally reduced, thereby increasing the amount of heat generated from the heat-generating devices, including the inverter 19, which results in an increase in the amount of heat absorbed by the refrigeration cycle 31 to improve the efficiency of the heat pump. In this way, the quick response of the air-heating can be improved.

Further, the air-heating is started up quickly, thereby making it possible to abolish an auxiliary heating portion, such as the auxiliary heater 56.

Alternatively, the controller 70 may adjust the operating efficiency of the heat-generating device, such as the inverter 19, based on the amount of heat generated by the cooler heater 15 (amount of heat generated from the refrigeration cycle 31), and the amount of heat transferred from the heat-generating device, such as the inverter 19, to the coolant (amount of heat generated from the heat-generating device, such as the inverter 19).

(4) In the above-mentioned embodiments, the controller 70 switches the operation mode (coolant circulation state) based on the coolant temperature detected by the coolant temperature sensor. Meanwhile, the coolant temperature can be estimated based on the measured value or estimated value of the amount of heat generated from the heat-generating device, such as the inverter 19. Thus, the operation mode (coolant circulation state) may be switched based on such a measured value or estimated value of the amount of heat generated from the heat-generating device, such as the inverter 19.

(5) Although in the above-mentioned embodiments, the coolant discharged from the first pump 11 or second pump 12 exchanges heat with the engine coolant in the engine cooling circuit 60 via the coolant-to-coolant heat exchanger 18, the coolant discharged from the first pump 11 or second pump 12 may circulate through the engine cooling circuit 60 via a flow-path switching valve.

In this embodiment, the coolant flow path of the engine 61 constitutes an engine heat transfer portion that transfers heat between the engine 61 and the coolant.

The flow-path switching valve is a switching portion that switches the coolant discharged from the first pump 11 or second pump 12 between a state in which the coolant circulates through the engine cooling circuit 60 and a state in which the coolant does not circulate therethrough.

What is claimed is:

1. A thermal management system for a vehicle, comprising:
    a first pump and a second pump that draw and discharge a heat medium;
    a compressor that draws and discharges a refrigerant;
    a heat-medium heating heat exchanger that exchanges heat between the refrigerant discharged from the compressor and the heat medium drawn into and discharged from the second pump, to heat the heat medium;
    an expansion valve that decompresses and expands the refrigerant flowing out of the heat-medium heating heat exchanger;
    a heat-medium cooling heat exchanger that exchanges heat between the refrigerant decompressed and expanded by the expansion valve and the heat medium drawn into and discharged from the first pump, to cool the heat medium;
    a heat-medium outside-air heat exchanger that exchanges heat between the heat medium and outside air;
    an air cooling heat exchanger that exchanges sensible heat between the heat medium cooled by the heat-medium cooling heat exchanger and ventilation air blowing into a vehicle interior, to cool the ventilation air;
    an air heating heat exchanger that exchanges sensible heat between the heat medium heated by the heat-medium heating heat exchanger and ventilation air blowing into the vehicle interior, to heat the ventilation air;
    an engine heat exchanger that transfers heat between an engine and the heat medium via an engine heat medium;
    a vehicle component that generates heat according to operation of the vehicle component and has a flow path through which the heat medium circulates, the vehicle component being adapted to transfer heat with the heat medium;
    a switching valve that switches between
        a state in which the heat medium circulates between the heat-medium cooling heat exchanger and the heat-medium outside-air heat exchanger, between the heat-medium cooling heat exchanger and the engine heat exchanger, and between the heat-medium cooling heat exchanger and the vehicle component, and
        a state in which the heat medium circulates through between the heat-medium heating heat exchanger and the heat-medium outside-air heat exchanger, between the heat-medium heating heat exchanger and the engine heat exchanger, and between the heat-medium heating heat exchanger and the vehicle component,
    the switching valve being configured to adjust a flow rate of the heat medium flowing to the heat-medium outside-air heat exchanger and a flow rate of the heat medium flowing to the engine heat exchanger;
    an operation switch that makes a cooling request for the air cooling heat exchanger to cool the ventilation air, and a heating request for the air heating heat exchanger to heat the ventilation air;
    a controller coupled to the operation switch and that is programmed to control an operation of at least one of the switching valve and the compressor based on presence or absence of the cooling request and presence or absence of the heating request from the operation switch;
    an engine heat medium temperature sensor coupled to the controller, the engine heat medium temperature sensor being configured to detect a temperature of the engine heat medium;
    an air cooling heat exchanger temperature sensor coupled to the controller, the air cooling heat exchanger temperature sensor being configured to detect a temperature of the heat medium flowing to the air cooling heat exchanger; and
    an air heating heat exchanger temperature sensor coupled to the controller, the air heating heat exchanger temperature sensor being configured to detect a temperature of the heat medium flowing to the air heating heat exchanger, wherein the controller is programmed to compare the temperature of the engine heat medium with a target temperature of the heat medium flowing to the air heating heat exchanger, the controller is programmed to compare the temperature of the heat medium flowing to the air heating heat exchanger with the target temperature of the heat medium flowing to the heating heat exchanger, when the cooling request is made from the operation switch, the controller controls the operation of at least one of the switching valve and the compressor, such that the temperature of the heat medium flowing to the air cooling heat exchanger is within a cooling temperature range, the controller is programmed to control the operation of at least one of the switching valve and the compressor based on at least one of the temperature of the engine heat medium, the temperature of the heat medium flowing to the air cooling heat exchanger, and the temperature of the heat medium flowing to the air heating heat exchanger, the controller is programmed to control the operation of the switching valve such that the heat medium circulates between the air heating heat exchanger and the engine heat exchanger when the heating request is made from the operation switch, and the temperature of the engine heat medium is higher than the target temperature of the heat medium flowing to the air heating heat exchanger, and the controller is programmed to control the operation of the switching valve to allow the heat medium to circulate between the air heating heat exchanger and the vehicle component when the heating request is made from the operation switch, the temperature of the engine heat medium is lower than the target temperature of the heat medium flowing to the air heating heat exchanger, and the temperature of the heat medium flowing to the air heating heat exchanger is higher than the target temperature.

2. The thermal management system for the vehicle according to claim 1, wherein, when the heating request is made from the operation switch, the controller is programmed to control the operation of at least one of the switching valve and the compressor, such that the temperature of the heat medium flowing to the air heating heat exchanger is within a heating temperature range.

3. The thermal management system for the vehicle according to claim 1, wherein the controller is programmed to control the operation of the switching valve such that the heat medium circulates between the heat-medium cooling heat exchanger and the engine heat exchanger when the heating request is made from the operation switch, a temperature of the engine heat medium is lower than a target temperature of the heat medium flowing to the air heating heat exchanger, the temperature of the heat medium flowing to the air heating heat exchanger is lower than the target temperature, and the temperature of the engine heat medium is higher than a target temperature of the engine heat medium.

4. The thermal management system for the vehicle according to claim 1, wherein the controller is programmed to control the operation of the switching valve such that the heat medium circulates between the heat-medium cooling heat exchanger and the heat-medium outside-air heat exchanger when the heating request is made from the operation switch, a temperature of the engine heat medium is lower than a target temperature of the heat medium flowing to the air heating heat exchanger, the temperature of the heat medium flowing to the air heating heat exchanger is lower than the target temperature, and the temperature of the engine heat medium is lower than a target temperature of the engine heat medium.

5. The thermal management system for the vehicle according to claim 1, wherein the controller is programmed to control the operation of the expansion valve such that the temperature of the heat medium flowing to the air heating heat exchanger does not exceed an upper limit of a temperature range.

6. The thermal management system for a vehicle according to claim 1, wherein the controller is programmed to control the operation of the switching valve to interrupt the flow of the heat medium between the air heating heat exchanger and the engine heat exchanger when the heating request is made from the operation switch, the temperature of the engine heat medium is lower than the target temperature of the heat medium flowing to the air heating heat exchanger, and the temperature of the heat medium flowing to the air heating heat exchanger is higher than the target temperature.

* * * * *